US012809998B2

(12) United States Patent
DeBellis

(10) Patent No.: US 12,809,998 B2
(45) Date of Patent: Nov. 24, 2026

(54) METHOD AND SYSTEM FOR PROVIDING MULTI-LAYER IDENTIFICATION, VERIFICATION, TRACKING AND LOCATION INFORMATION FOR PEOPLE AND OBJECTS

(71) Applicant: Regina DeBellis, Long Beach, NY (US)

(72) Inventor: Regina DeBellis, Long Beach, NY (US)

( * ) Notice: Subject to any disclaimer, the term of this patent is extended or adjusted under 35 U.S.C. 154(b) by 68 days.

(21) Appl. No.: 19/013,389

(22) Filed: Jan. 8, 2025

(65) Prior Publication Data

US 2025/0148098 A1 May 8, 2025

Related U.S. Application Data

(60) Provisional application No. 63/619,941, filed on Jan. 11, 2024.

(51) Int. Cl.
*G06F 21/60* (2013.01)
*G06F 21/62* (2013.01)
*H04L 9/40* (2022.01)

(52) U.S. Cl.
CPC .......... *G06F 21/604* (2013.01); *G06F 21/629* (2013.01); *H04L 63/0861* (2013.01); *H04L 63/105* (2013.01)

(58) Field of Classification Search
CPC . G06F 21/604; G06F 21/629; H04L 63/0861; H04L 63/105
See application file for complete search history.

(56) References Cited

U.S. PATENT DOCUMENTS 7,269,277 B2 9/2007 Davida et al.
7,961,915 B2 6/2011 Davida
8,325,994 B2 12/2012 Davida
8,463,765 B2 6/2013 Lesavich
8,742,919 B2 6/2014 Choi
(Continued)

FOREIGN PATENT DOCUMENTS

CN 111444804 A 7/2020
JP 2008005854 A 2/2010
KR 20090011127 U 10/2009

OTHER PUBLICATIONS

USPTO Notice of Imported Citations: Notification Date: Jul. 14, 2026, for U.S. Appl. No. 19/704,002, Inventor: Regina DeBillis.

*Primary Examiner* — Techane Gergiso

(74) *Attorney, Agent, or Firm* — Lesavich High-Tech Law Group, S.C.; Stephen Lesavich

(57) ABSTRACT

A method and system for providing multi-layer identification, tracking, verification and location information for people and events is presented. Multi-layer security permissions and multi-layer security functionality is provided. An identity and a physical location of a person or an object is verified in real-time as the person or object engages in current habits, actions and events and with analysis of previous habits, actions and events. Summary identification, verification, tracking and location information and comprehensive identification, verification and location information is provided in real-time for a desired person or an object. Feedback and adaptive learning with artificial intelligence (AI) and using blockchains and other methods provide comprehensive identification, tracking and verification information, adaptable across various different situations and circumstances.

22 Claims, 17 Drawing Sheets

(56) References Cited

U.S. PATENT DOCUMENTS

| | | | | |
|---|---|---|---|---|
| 8,850,535 | B2 | 9/2014 | Liberman et al. | |
| 9,037,564 | B2 | 5/2015 | Lesavich et al. | |
| 9,137,250 | B2 | 9/2015 | Lesavich et al. | |
| 9,141,844 | B2 | 9/2015 | Yalla et al. | |
| 9,292,886 | B2 | 3/2016 | Astore | |
| 9,348,916 | B2 | 5/2016 | Astore | |
| 9,361,479 | B2 | 6/2016 | Lesavich et al. | |
| 9,544,308 | B2 | 1/2017 | Minter et al. | |
| 9,569,771 | B2 | 2/2017 | Lesavich et al. | |
| 9,811,730 | B2 | 11/2017 | Komogortsev | |
| 9,824,404 | B2 | 11/2017 | Astore | |
| 11,074,495 | B2 | 7/2021 | Zadeh et al. | |
| 11,089,441 | B2 * | 8/2021 | Eisner | H04W 4/029 |
| 11,329,998 | B1 * | 5/2022 | Shahidzadeh | G06F 21/57 |
| 11,694,695 | B2 | 7/2023 | Lesso | |
| 2005/0220326 | A1 | 10/2005 | Sim | |
| 2008/0209543 | A1 * | 8/2008 | Aaron | H04L 63/126 726/17 |
| 2009/0224889 | A1 * | 9/2009 | Aggarwal | H04L 63/08 340/10.4 |
| 2010/0194530 | A1 | 8/2010 | Davida | |
| 2011/0208710 | A1 | 8/2011 | Lesavich | |
| 2011/0302420 | A1 | 12/2011 | Davida | |
| 2012/0167188 | A1 | 6/2012 | Poornachandran et al. | |
| 2012/0278622 | A1 | 11/2012 | Lesavich et al. | |
| 2013/0129164 | A1 | 5/2013 | Gu et al. | |
| 2014/0189792 | A1 | 7/2014 | Lesavich et al. | |
| 2014/0233855 | A1 * | 8/2014 | Clarke | G06F 16/583 707/769 |
| 2014/0359722 | A1 * | 12/2014 | Schultz | H04L 63/0861 726/5 |
| 2015/0109126 | A1 | 4/2015 | Crawford | |
| 2015/0123766 | A1 * | 5/2015 | St. John | G07C 9/25 340/5.82 |
| 2015/0379301 | A1 | 12/2015 | Lesavich et al. | |
| 2016/0080943 | A1 * | 3/2016 | Ives-Halperin | G06Q 10/02 713/168 |
| 2016/0212125 | A1 * | 7/2016 | Pender | H04L 63/0861 |
| 2016/0321654 | A1 | 11/2016 | Lesavich et al. | |
| 2019/0108699 | A1 * | 4/2019 | Ashok | H04W 4/029 |
| 2020/0193005 | A1 | 6/2020 | Babala et al. | |
| 2022/0029987 | A1 * | 1/2022 | Salter | H04L 63/0861 |
| 2024/0020370 | A1 * | 1/2024 | Sims | G06F 21/32 |
| 2024/0053975 | A1 * | 2/2024 | Bouchard | G06F 16/2379 |
| 2025/0112907 | A1 * | 4/2025 | McGuinness | H04L 63/0815 |
| 2025/0148098 | A1 | 5/2025 | DeBellis | |
| 2025/0173707 | A1 | 5/2025 | Mohankumar | |
| 2025/0233857 | A1 | 7/2025 | DeBellis | |
| 2026/0081925 | A1 | 3/2026 | DeBellis | |

* cited by examiner

106

METHOD AND SYSTEM FOR PROVIDING MULTI-LAYER IDENTIFICATION, VERIFICATION, TRACKING AND LOCATION INFORMATION FOR PEOPLE AND OBJECTS

CROSS REFERENCES TO RELATED APPLICATIONS

This U.S. utility patent application claims priority to U.S. Provisional patent applications No. 63/619,941 filed on Jan. 11, 2024, the content of which is incorporated by reference.

FIELD OF INVENTION

This invention relates to identification, verification and location information. More specifically, it relates to a method and system for providing multi-layer identification, verification, tracking and location information for people and objects.

BACKGROUND OF THE INVENTION

There are many circumstances in which an identity of a person must be verified and the location of the person determined.

For example, a law enforcement person may be tracking, pursuing and/or watching a criminal, a person is applying for employment, a person is applying for a security clearance, a person is taking a test for college and/or a professional license, a person is picking up tickets for an event, a person is using a dating application to meet another person, a person has entered a secure area, a courier is arriving to pick up currency and/or other valuables, rideshare drivers, contractors for home repair, babysitters, a person purchasing a home, property, a person withdrawing money from a financial institution, etc.

There are several problems associated with determining and verifying an identity and a physical location of a person.

One problem is that it is difficult to determining and verifying an identity and a physical location of a person in the multiple different circumstances just described.

Another problem is that it is difficult to provide multi-layer security permissions for determining and verifying an identity and a physical location of a person.

Another problem is that it is difficult to provide multi-layer security functionalities for determining and verifying an identity and a physical location of a person.

Another problem is that is it difficult to provide accurate facial recognition, eye scans and biometric identifications in real-time.

Another problem is that it is difficult to provide accurate location tracking of a person in real-time.

Another problem is that it is difficult to provide accurate proximity detection of a person to other people and other devices such as smart phones, etc. in real-time.

Another problem is that it is difficult to provide accurate geofencing information of a person in real-time.

Another problem is that it is difficult to provide accurate pattern recognition of habits and actions of a desire person in real-time.

Another problem is that it is difficult to provide accurate event recording determining and verifying an identity and a physical location of a person in real-time.

Another problem is that it is difficult to provide evidence chain of custody records for a desired person who commits a crime.

Another problem is that is it difficult to provide access to a variety of law enforcement records for a desired person in real-time.

Another problem is that it is difficult to determine and verify an identity and a physical location of a person across many different situations and circumstances.

Another problem is that it is difficult to determine and verify an identity and a physical location of a person with feedback and adaptive learning.

Another problem is that is difficult to verify an identity and a physical location of a person for school, busing and testing operations.

Another problem is that is difficult to verify an identity and a physical location of a valuable or dangerous objects.

Another problem is that is difficult to verify an identity and a physical location of tickets for an event or people holding tickets for an event.

Thus, it is desirable to solve some of the problems associated with providing identification, verification, tracking and location information for people and objects.

SUMMARY OF THE INVENTION

In accordance with preferred embodiments of the present invention, some of the problems associated with are overcome. A method and system for providing multi-layer identification, verification, tracking and location information for people and objects is presented.

Multi-layer security permissions and multi-layer security functionality is provided. An identity and a physical location of a person or an object is verified in real-time as the person or object engages in current habits, actions and events and with analysis of previous habits, actions and events. Summary identification, verification, tracking and location information and comprehensive identification, verification and location information is provided in real-time for a desired person or an object. Feedback and adaptive learning with artificial intelligence (AI) and using blockchains and other methods provide comprehensive identification, tracking and verification information, adaptable across various different situations and circumstances.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein.

DETAILED DESCRIPTION OF THE INVENTION

Figure 1:
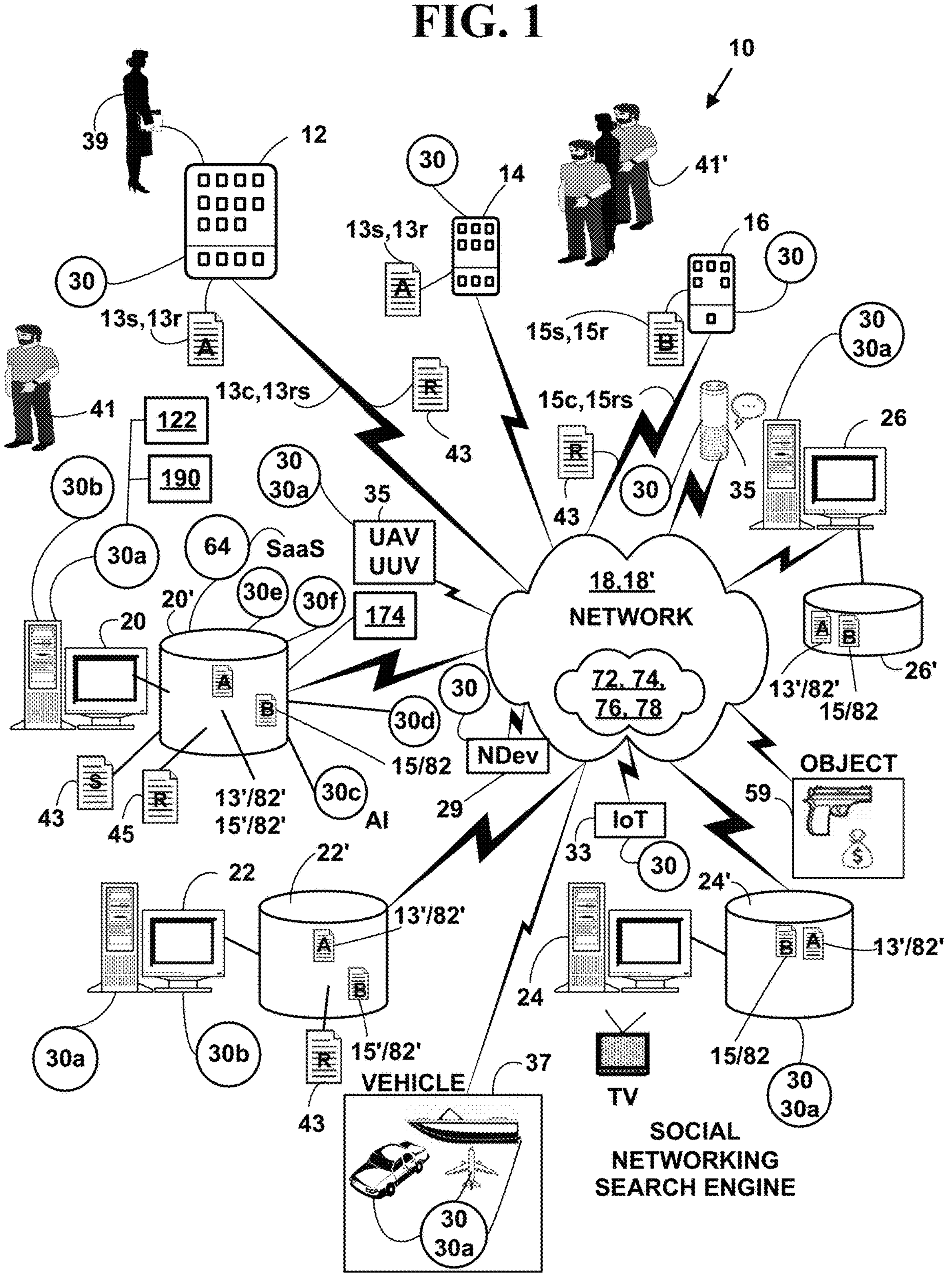
FIG. 1 is a block diagram illustrating an exemplary identification, verification and location processing and display system.

Exemplary Identification, Verification and Location Processing and Display System FIG. 1 is a block diagram illustrating an exemplary identification, verification and location processing and display system 10 for sending and receiving electronic messages. The exemplary system 10 includes, but is not limited to, one or more target network devices 12, 14, 16, etc. each with one or more processors and each with a non-transitory computer readable medium, connected to a communications network 18, 18'. A network device is any device that can be connected to the communications network 18, 18' with a wireless and/or wired connection.

The one or more target network devices 12, 14, 16 (illustrated in FIG. 1 only as a tablet and two smart phones for simplicity) include, but are not limited to, (desktop and laptop computers, tablet computers, mobile phones, non-mobile phones with displays, smart phones, Internet phones, Internet appliances, personal digital/data assistants (PDA), portable, handheld and desktop video game devices, cable television (CATV), satellite television (SATV) and Internet television set-top boxes, digital televisions including high definition television (HDTV), three-dimensional (3DTV) televisions, collectively, network devices (NDev) 29, smart speakers 31, Internet of Things (IoT) devices 33, Unmanned Ariel Vehicles (UAVs) 35, vehicles 37, wearable network devices 106-112 (FIG. 6), and/or other types of network devices.

A "smart phone" is a mobile phone 14 that offers more advanced computing ability and connectivity than a contemporary basic feature phone. Smart phones and feature phones may be thought of as handheld computers integrated with a mobile telephone, but while most feature phones are able to run applications based on platforms such as JAVA ME, a smart phone usually allows the user to install and run more advanced applications. Smart phones and/or tablet computers run complete operating system software providing a platform for application developers.

The tablet computers 12 include, but are not limited to, tablet computers such as the IPAD, by APPLE, Inc., the HP Tablet, by HEWLETT PACKARD, Inc., the PLAYBOOK, by RIM, Inc., the TABLET, by SONY, Inc., etc.

A "smart speaker" 31 includes but is not limited to, a type of wireless speaker and voice command device with an integrated virtual assistant that offers interactive actions and hands-free activation with the help of one "hot word" (or several "hot words"). Some smart speakers can also act as a smart device that utilizes Wi-Fi, BLUETOOTH and other wireless protocol standards to extend usage beyond audio playback, such as to control home automation devices. This can include, but is not be limited to, features such as compatibility across a number of services and platforms, peer-to-peer connection through mesh networking, virtual assistants, and others. Each can have its own designated interface and features in-house, usually launched or controlled via application or home automation software. Some smart speakers also include a screen to show the user a visual response.

The IoT network devices 33, include but are not limited to, cameras, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), gun-shot detection monitors and/or other types of IoT network devices.

Unmanned aerial vehicles (UAV) 35, commonly known as "drones" and also referred to as Remotely Piloted Aircraft (RPA), included but are not limited to, are aircraft and watercraft guided autonomously, by remote control, or both and that carry sensors and cameras to collect information and display the collected information to an operator.

Unmanned underwater vehicles 35 (UUV), also known as uncrewed underwater vehicles and underwater drones, are submersible vehicles that can operate underwater without a human occupant. These vehicles may be divided into two categories: remotely operated underwater vehicles (ROUVs) and autonomous underwater vehicles (AUVs).

Vehicles 37, include, but are not limited to, vehicles with and/or without a driver including, land vehicles (e.g., automobiles, trucks, buses, motorcycles, locomotives, snow machines, etc.), air vehicles (e.g., drones, UAVs, airplanes, helicopter, hot air balloon, blimp, etc.), water vehicles, (e.g., UUVs, ROUVs AUVs, ships, boats, barges, rafts, canoes, kayaks, personal water craft (PWC), etc.) and/or other types of vehicles with a wired and/or wireless network interface for connecting with the communications network 18, 18'.

The target network devices 12, 14, 16, 31, 33, 35, 37, 106-112 are in communications with a cloud communications network 18 or a non-cloud computing network 18' via one or more wired and/or wireless communications interfaces. The cloud communications network 18, is also called a "cloud computing network" herein and the terms may be used interchangeably.

The plural target network devices 12, 14, 16, 31, 33, 35, 37, 106-112 send and receive requests for electronic information 13, 15 including but not limited to, identification, verification and/or location information for a desired person 41 (e.g., criminal, terrorist, solider, missing person, professional (e.g., doctor, lawyer, nurse, etc.), student, ride share driver, etc.) via the cloud communications network 18 or non-cloud communications network 18'

The cloud communications network 18 and non-cloud communications network 18' includes, but is not limited to, communications over a wire connected to the target network devices, wireless communications, and other types of communications using one or more communications and/or networking protocols.

Plural server network devices 20, 22, 24, 26 (only four of which are illustrated) each with one or more processors and a non-transitory computer readable medium include one or more associated databases 20', 22', 24', 26'. The plural network devices 20, 22, 24, 26 are in communications with the one or more target devices 12, 14, 16, 31, 33, 35, 37, 106-112 via the cloud communications network 18 and/or the non-cloud communications network 18'.

Plural server network devices 20, 22, 24, 26 (only four of which are illustrated) are physically located on one more public networks 76 (See FIG. 4), private networks 72, community networks 74 and/or hybrid networks 78 comprising the cloud network 18.

In one embodiment, the one or more server network devices (e.g., 20, 22, 24, 26, etc.) store portions 13', 15' of the electronic information 13, 15 (e.g., identification, verification and/or location information, etc.) as cloud storage objects 82 (FIG. 5) as is described herein.

The plural server network devices 20, 22, 24 26, may be connected to, but are not limited to, World Wide Web servers, Internet servers, search engine servers, vertical search engine servers, social networking site servers, file servers, other types of electronic information servers, and other types of server network devices (e.g., edge servers, firewalls, routers, gateways, etc.).

The plural server network devices 20, 22, 24, 26 also include, but are not limited to, network servers used for cloud computing providers, etc.

The cloud communications network 18 and non-cloud communications network 18' includes, but is not limited to, a wired and/or wireless communications network comprising one or more portions of: the Internet, an intranet, a Local Area Network (LAN), a wireless LAN (WiLAN), a Wide Area Network (WAN), a Metropolitan Area Network (MAN), a Public Switched Telephone Network (PSTN), a Wireless Personal Area Network (WPAN) and other types of wired and/or wireless communications networks 18.

The cloud communications network 18 and non-cloud communications network 18' includes one or more gateways, routers, bridges and/or switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments based on some pre-determined sequence (e.g., timing, sequence number, etc.).

An operating environment for the network devices of the exemplary electronic information display system 10 include a processing system with one or more high speed Central Processing Unit(s) (CPU), processors, one or more memories and/or other types of non-transitory computer readable mediums. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical information by the CPU or processor. An electrical system represents data bits which cause a resulting transformation or reduction of the electrical information or biological information, and the maintenance of data bits at memory locations in a memory system to thereby reconfigure or otherwise alter the CPU's or processor's operation, as well as other processing of information. The memory locations where data bits are maintained are physical locations that have particular electrical, magnetic, optical, or organic properties corresponding to the data bits.

The data bits may also be maintained on a non-transitory computer readable medium including magnetic disks, optical disks, organic memory, and any other volatile (e.g., Random Access Memory (RAM)) or non-volatile (e.g., Read-Only Memory (ROM), flash memory, etc.) mass storage system readable by the CPU. The non-transitory computer readable medium includes cooperating or interconnected computer readable medium, which exist exclusively on the processing system or can be distributed among multiple interconnected processing systems that may be local or remote to the processing system.

Exemplary Identification, Verification Location Information Display System

Figure 2:
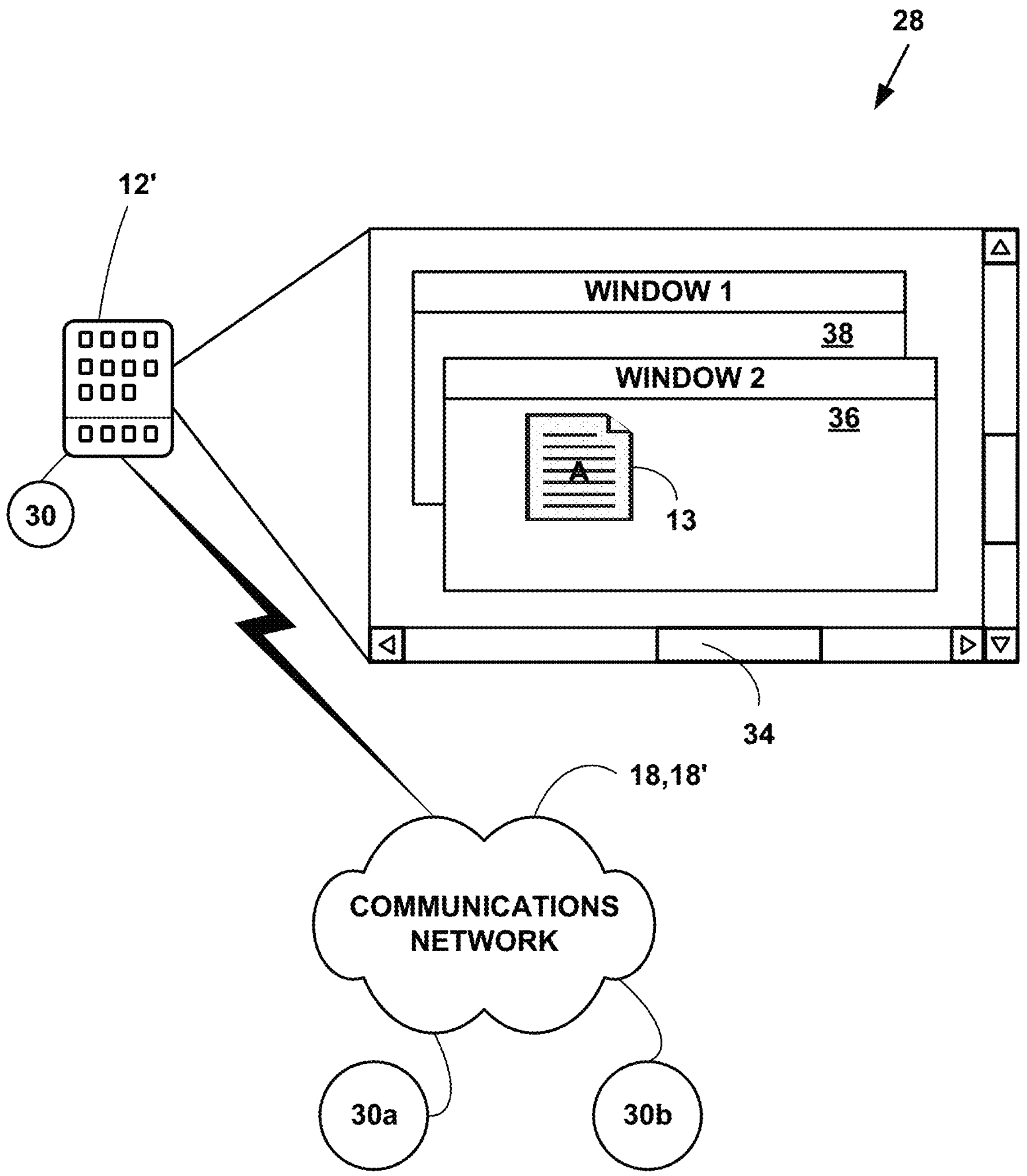
FIG. 2 is a block diagram illustrating an exemplary identification, verification and location information display system.

FIG. 2 is a block diagram illustrating an exemplary identification, verification and location information display system 28. The exemplary electronic message information display system 12' includes, but is not limited to a target network device (e.g., 12, etc.) with an application 30 and a display component 32. The application 30 presents a graphical user interface (GUI) 34 on the display 32 component. The GUI 32 presents a multi-window 36, 38, etc. (only two of which are illustrated) interface to a user.

In one embodiment of the invention, the application 30 is a software application. However, the present invention is not limited to this embodiment and the application 30 can be hardware, firmware, hardware and/or any combination thereof. In one embodiment, the application 30 includes a mobile application for a smart phone, electronic tablet and/or other network device. In one embodiment, the application 30 includes web-browser based application. In one embodiment, the application 30 includes a web-chat client application. In another embodiment, the application **30*a*, 30*b*, 30*c*, 30*d*, 30*e*, 30*f* includes a cloud application used on a cloud communications network 18. However, the present invention is not limited these embodiments and other embodiments can be used to practice the invention In another embodiment, a full application 30 and/or a portion of the application 30 is executing on the target network devices 12, 14, 16, 31, 33, 35, 37, 106-112 and another portion of the application 30*a*, 30*b*, 30*c*, 30*d*, 30*e*, 30*f* is executing on the server network devices 20, 22, 24, 26**. The applications also include one or more library applications. However, the present invention is not limited these embodiments and other embodiments can be used to practice the invention.

Exemplary Networking Protocol Stack

Figure 3:
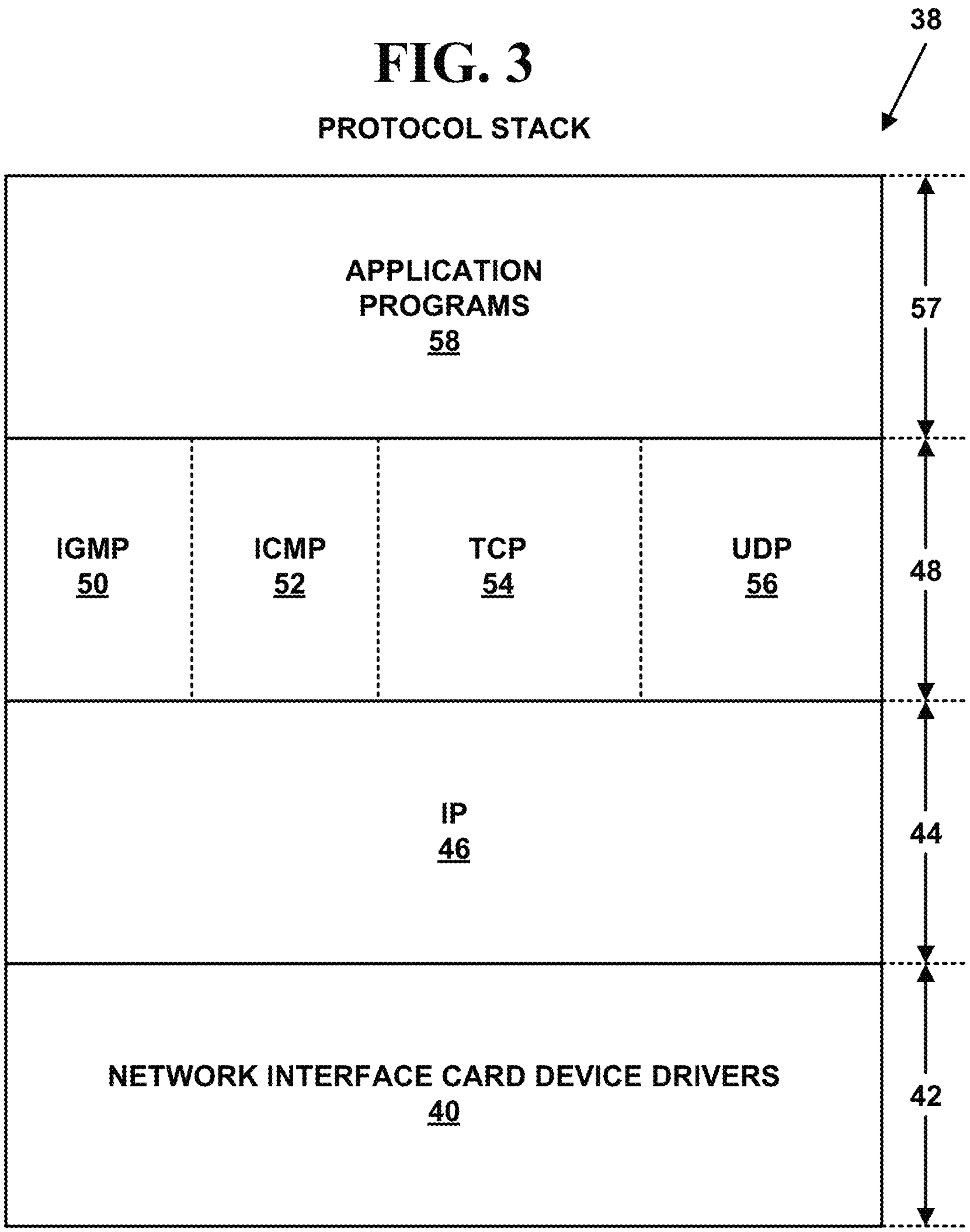
FIG. 3 is a block diagram illustrating an exemplary networking protocol stack.

FIG. 3 a block diagram illustrating a layered protocol stack 38 for network devices in the electronic message information display system 10. The layered protocol stack 38 is described with respect to Internet Protocol (IP) suites comprising in general from lowest-to-highest, a link 42, network 44, transport 48 and application 56 layers. However, more or fewer layers could also be used, and different layer designations could also be used for the layers in the protocol stack 38 (e.g., layering based on the Open Systems Interconnection (OSI) model including from lowest-to-highest, a physical, data-link, network, transport, session, presentation and application layer.).

The network devices 12, 14, 16, 31, 33, 35, 37, 106-112 are connected to the communication network 18 with Network Interface Card (NIC) cards including device drivers 40 in a link layer 42 for the actual hardware connecting the network devices 12, 14, 16, 31, 33, 35, 37, 106-112 to the communications network 18, 18'. For example, the NIC device drivers 40 may include a serial port device driver, a digital subscriber line (DSL) device driver, an Ethernet device driver, a wireless device driver, a wired device driver, etc. The device drivers interface with the actual hardware being used to connect the network devices to the communications network 18, 18'. The NIC cards have a Medium Access Control (MAC) address that is unique to each NIC and unique across the whole communications network 18, 18'. The Medium Access Control (MAC) protocol is used to provide a data link layer of an Ethernet LAN system and/or for other network systems.

Above the link layer 42 is a network layer 44 (also called the Internet Layer for Internet Protocol (IP) and IP related protocol suites). The network layer 44 includes, but is not limited to, an IP layer 46.

IP 46 is an addressing protocol designed to route traffic within a network or between networks. However, more, fewer or other protocols can also be used in the network layer 44, and the present invention is not limited to IP 46. For more information on IP 46 see IETF RFC-791, incorporated herein by reference.

Above network layer 44 is a transport layer 48. The transport layer 48 includes, but is not limited to, an optional Internet Group Management Protocol (IGMP) layer 50, a Internet Control Message Protocol (ICMP) layer 52, a Transmission Control Protocol (TCP) layer 52 and a User Datagram Protocol (UDP) layer 54. However, more, fewer or other protocols could also be used in the transport layer 48.

Optional IGMP layer 50, hereinafter IGMP 50, is responsible for multicasting. For more information on IGMP 50 see RFC-1112, incorporated herein by reference. ICMP layer 52, hereinafter ICMP 52 is used for IP 46 control. The main functions of ICMP 52 include error reporting, reachability testing (e.g., pinging, etc.), route-change notification, performance, subnet addressing and other maintenance. For more information on ICMP 52 see RFC-792, incorporated herein by reference. Both IGMP 50 and ICMP 52 are not required in the protocol stack 38. ICMP 52 can be used alone without optional IGMP layer 50.

TCP layer 54, hereinafter TCP 54, provides a connection-oriented, end-to-end reliable protocol designed to fit into a layered hierarchy of protocols which support multi-network applications. TCP 54 provides for reliable inter-process communication between pairs of processes in network devices attached to distinct but interconnected networks. For more information on TCP 54 see RFC-793, incorporated herein by reference.

UDP layer 56, hereinafter UDP 56, provides a connectionless mode of communications with datagrams in an interconnected set of computer networks. UDP 56 provides a transaction-oriented datagram protocol, where delivery and duplicate packet protection are not guaranteed. For more information on UDP 56 see RFC-768, incorporated herein by reference. Both TCP 54 and UDP 56 are not required in protocol stack 38. Either TCP 54 or UDP 56 can be used without the other.

Above transport layer 48 is an application layer 57 where application programs 58 (e.g., 30, 30*a*, 30*b*, 30*c*, 30*d*, 30*e*, 30*f*, etc.) to carry out desired functionality for a network device reside. For example, the application programs 58 for the client network devices 12, 14, 16, 31, 33, 35, 37, 106-112 may include web-browsers or other application programs, application program 30, while application programs for the server network devices 20, 22, 24, 26 may include other application programs (e.g., 30*a*, 30*b*, 30*c*, 30*d*, 30*e*, 30*f* etc.).

In one embodiment, application program 30 includes IVL application 30 including an identification, verification and location information application 30*a*, an identification, verification and location information application program interface (API) 30*b*, an Artificial Intelligence (AI) application 30*c* and/or other applications 30*d*, 30*e*, 30*f*. However, the present invention is not limited to such an embodiment and more, fewer and/or other applications can be used to practice the invention.

However, the protocol stack 38 is not limited to the protocol layers illustrated and more, fewer or other layers and protocols can also be used in protocol stack 38. In addition, other protocols from the Internet Protocol suites, including but not limited to, Simple Mail Transfer Protocol, (SMTP), Hyper Text Transfer Protocol (HTTP), File Transfer Protocol (FTP), Dynamic Host Configuration Protocol (DHCP), Domain Name System (DNS), Short Message Peer-to-Peer (SMPP), and/or other protocols from other protocol suites may also be used in protocol stack 38.

In addition, markup languages such as HyperText Markup Language (HTML), Extensible Markup Language (XML) and others are used.

HyperText Markup Language (HTML) is a markup language for creating web pages and other information that can be displayed in a web browser.

HTML is written in the form of HTML elements consisting of tags enclosed in angle brackets within the web page content. HTML tags most commonly come in pairs although some tags represent empty elements and so are unpaired. The first tag in a pair is the start tag, and the second tag is the end tag (they are also called opening tags and closing tags). In between these tags web designers can add text, further tags, comments and other types of text-based content.

The purpose of a web browser is to read HTML documents and compose them into visible or audible web pages. The browser does not display the HTML tags, but uses the tags to interpret the content of the page.

HTML elements form the building blocks of all websites. HTML allows images and objects to be embedded and can be used to create interactive forms. It provides a means to create structured documents by denoting structural semantics for text such as headings, paragraphs, lists, links, quotes and other items. It can embed scripts written in languages such as JavaScript which affect the behavior of HTML web pages.

Extensible Markup Language (XML) is another markup language that defines a set of rules for encoding documents in a format that is both human-readable and machine-readable. It is defined in the XML 1.0 Specification produced by the W3C, the contents of which are incorporated by reference and several other related specifications, all free open standards.

XML a textual data format with strong support via Unicode for the languages of the world. Although the design of XML focuses on documents, it is widely used for the representation of arbitrary data structures, for example in web services. The oldest schema language for XML is the Document Type Definition (DTD). DTDs within XML documents define entities, which are arbitrary fragments of text and/or markup tags that the XML processor inserts in the DTD itself and in the XML document wherever they are referenced, like character escapes.

The Short Message Peer-to-Peer (SMPP) protocol in the telecommunications industry is an open, industry standard protocol designed to provide a flexible data communication interface for the transfer of short message data between External Short Messaging Entities, Routing Entities (ESME) and Short Message Service Center (SMSC).

Preferred embodiments of the present invention include network devices and wired and wireless interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Bluetooth Forum, or the ADSL Forum.

Wireless Interfaces

In one embodiment of the present invention, the wireless interfaces on network devices 12, 14, 16, 31, 33, 35, 37, 106-112 include but are not limited to, IEEE 802.11a, 802.11b, 802.11g, 802.11n, 802.15.4 (ZigBee), “Wireless Fidelity” (Wi-Fi), “Worldwide Interoperability for Microwave Access” (WiMAX), ETSI High Performance Radio Metropolitan Area Network (HIPERMAN) or “RF Home” integral or separate Bluetooth and/or infra data association (IrDA) module for wireless BLUETOOTH and/or other types of wireless communications interfaces. However, the present invention is not limited to such an embodiment other types of wireless communications interfaces can also be used.

802.11b is a short-range wireless network standard. The IEEE 802.11b standard defines wireless interfaces that provide up to 11 Mbps wireless data transmission to and from wireless devices over short ranges. 802.11a is an extension of the 802.11b and can deliver speeds up to 54 Mbps. 802.11g deliver speeds on par with 802.11a. However, other 802.11XX interfaces can also be used and the present invention is not limited to the 802.11 protocols defined. The IEEE 802.11a, 802.11b and 802.11g standards are incorporated herein by reference.

Wi-Fi is a type of 802.11xx interface, whether 802.11b, 802.11a, dual-band, etc. Wi-Fi devices include an RFinterfaces such as 2.4 GHz for 802.11b or 802.11g and 5 GHz for 802.11a.

802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, a full handshake protocol for transfer reliability, power management to ensure low power consumption for multi-month to multi-year battery usage and up to 16 channels in the 2.4 GHz Industrial, Scientific and Medical (ISM) band (Worldwide), 10 channels in the 915 MHz (US) and one channel in the 868 MHz band (Europe). The IEEE 802.15.4-2003 standard is incorporated herein by reference.

WiMAX is an industry trade organization formed by leading communications component and equipment companies to promote and certify compatibility and interoperability of broadband wireless access equipment that conforms to the IEEE 802.16XX and ETSI HIPERMAN. HIPERMAN is the European standard for metropolitan area networks (MAN).

The IEEE The 802.16a and 802.16g standards are wireless MAN technology standard that provides a wireless alternative to cable, DSL and T1/E1 for last mile broadband access. It is also used as complimentary technology to connect IEEE 802.11XX hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16e and 802.16g standards are incorporated herein by reference. WiMAX can be used to provide a WLP.

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference. ETSI HIPERMAN can be used to provide a WLP.

In one embodiment, the plural server network devices 20, 22, 24, 26 include a connection to plural network interface cards (NICs) in a backplane connected to a communications bus. The NIC cards provide gigabit/second ($1 \times 10^9$ bits/second) communications speed of electronic information. This allows “scaling out” for fast electronic content retrieval. The NICs are connected to the plural server network devices 20, 22, 24, 26 and the cloud communications network 18. However, the present invention is not limited to the NICs described and other types of NICs in other configurations and connections with and/or without buses can also be used to practice the invention.

In one embodiment, of the invention, the wireless interfaces also include wireless personal area network (WPAN) interfaces. As is known in the art, a WPAN is a personal area network for interconnecting devices centered around an individual person's devices in which the connections are wireless. A WPAN interconnects all the ordinary computing and communicating devices that a person has on their desk (e.g. computer, etc.) or carry with them (e.g., PDA, mobile phone, smart phone, table computer two-way pager, etc.)

A key concept in WPAN technology is known as “plugging in.” In the ideal scenario, when any two WPAN-equipped devices come into close proximity (within several meters and/or feet of each other) or within a few miles and/or kilometers of a central server (not illustrated), they can communicate via wireless communications as if connected by a cable. WPAN devices can also lock out other devices selectively, preventing needless interference or unauthorized access to secure information. Zigbee is one wireless protocol used on WPAN networks such as cloud communications network 18 or non-cloud communications network 18'.

The one or more target network devices 12, 14, 16, 20, 22, 24, 26, 31, 98-104 and one or more server network devices 20, 22, 24, 26 communicate with each other and other network devices with near field communications (NFC) and/or machine-to-machine (M2M) communications.

"Near field communication (NFC)" is a set of standards for smartphones and similar network devices to establish radio communication with each other by touching them together or bringing them into close proximity, usually no more than a few centimeters. Present applications include contactless transactions, data exchange, and simplified setup of more complex communications such as Wi-Fi. Communication is also possible between an NFC device and an unpowered NFC chip, called a "tag" including radio frequency identifier (RFID) tags and/or RFID sensors and/or RFID network devices 99 including one or more RFID tags, RFID sensors and/or a combination thereof.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

An "RFID tag" is an object that can be applied to or incorporated into a product, animal, or person for the purpose of identification and/or tracking using RF signals.

An "RFID sensor" and/or RFID network device is a device that measures a physical quantity and converts it into an RF signal which can be read by an observer or by an instrument (e.g., target network devices 12, 14, 16, 20, 22, 24, 26, 31, 33, 35, 37, 98-104, server network devices 20, 22, 24, 26, etc.).

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

However, the present invention is not limited to such wireless interfaces and wireless networks and more, fewer and/or other wireless interfaces can be used to practice the invention.

Wired Interfaces

In one embodiment of the present invention, the wired interfaces include wired interfaces and corresponding networking protocols for wired connections to the Public Switched Telephone Network (PSTN) and/or a cable television network (CATV) and/or satellite television networks (SATV) and/or three-dimensional television (3DTV), including HDTV that connect the network devices 12, 14, 16, 31, 33, 35, 37, 106-112 via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, GTE, Sprint, MCI, SBC, Verizon and others. The CATV is any cable television network provided by the Comcast, Time Warner, etc. However, the present invention is not limited to such wired interfaces and more, fewer and/or other wired interfaces can be used to practice the invention.

Television Services

In one embodiment, the cloud applications 30, 30*a*, 30*b*, 30*c*, 30*d*, 30*e*, 30*f* provide cloud SaaS 64 services and/or non-cloud application services from television services over the cloud communications network 18 or application services over the non-cloud communications network 18'. The television services include digital television services, including, but not limited to, cable television, satellite television, high-definition television, three-dimensional, televisions and other types of network devices.

However, the present invention is not limited to such television services and more, fewer and/or other television services can be used to practice the invention.

Internet Television Services

In one embodiment, the cloud applications 30, 30*a*, 30*b*, 30*c*, 30*d*, 30*e*, 30*f* provide cloud SaaS 64 services and/or non-cloud application services from Internet television services over the cloud communications network 18 or non-cloud communications network 18' The television services include Internet television, Web-TV, and/or Internet Protocol Television (IPtv) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, or other network device.

"Web-TV" delivers digital content via broadband and mobile networks. The digital content is streamed to a viewer's set-top box, game console, computer, or other network device.

"Internet Protocol television (IPtv)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and cable television formats.

However, the present invention is not limited to such Internet Television services and more, fewer and/or other Internet Television services can be used to practice the invention.

General Search Engine Services

In one embodiment, the cloud applications 30, 30*a*, 30*b*, 30*c*, 30*d*, 30*e*, 30*f* provide cloud SaaS 64 services and/or non-cloud application services from general search engine services. A search engine is designed to search for information on a cloud communications network 18 or non-cloud communications network 18' such as the Internet including World Wide Web servers, HTTP, FTP servers etc. The search results are generally presented in a list of electronic results. The information may consist of web pages, images, electronic information, multimedia information, and other types of files. Some search engines also mine data available in databases or open directories. Unlike web directories, which are maintained by human editors, search engines typically operate algorithmically and/or are a mixture of algorithmic and human input.

In one embodiment, the cloud applications 30, 30*a*, 30*b*, 30*c*, 30*d*, 30*e*, 30*f* provide cloud SaaS 64 services and/or non-cloud application services from general search engine services. In another embodiment, the cloud applications 30, 30*a*, 30*b*, 30*c*, 30*d*, 30*e*, 30*f* provide general search engine services by interacting with one or more other public search engines (e.g., GOOGLE, BING, YAHOO, etc.) and/or private search engine services.

In another embodiment, the cloud applications 30, 30*a*, 30*b*, 30*c*, 30*d*, 30*e*, 30*f* provide cloud SaaS 64 services and/or non-cloud application services from specialized search engine services, such as vertical search engine services by interacting with one or more other public vertical search engines and/or private search engine services.

However, the present invention is not limited to such general and/or vertical search engine services and more, fewer and/or other general search engine services can be used to practice the invention.

Social Networking Services

In one embodiment, the cloud applications 30, 30*a*, 30*b*, 30*c*, 30*d*, 30*e*, 30*f* provide cloud SaaS 64 services and/or non-cloud application services from one more social networking services including to/from one or more social networking web-sites (e.g., FACEBOOK, YOUTUBE, TWITTER/X, INSTAGRAM, etc.). The social networking web-sites also include, but are not limited to, social couponing sites, dating web-sites, blogs, RSS feeds, and other types of information web-sites in which messages can be left or posted for a variety of social activities.

However, the present invention is not limited to the social networking services described and other public and private social networking services can also be used to practice the invention.

Security and Encryption

Network devices 12, 14, 16, 20, 22, 24, 26, 31, 33, 35, 37, 106-112 with wired and/or wireless interfaces of the present invention include one or more of the security and encryptions techniques discussed herein for secure communications on the cloud communications network 18 or non-cloud communications network 18'.

Application programs 58 (FIG. 2) include security and/or encryption application programs integral to and/or separate from the applications 30, 30*a*, 30*b*, 30*c*, 30*d*. Security and/or encryption programs may also exist in hardware components on the network devices (12, 14, 16, 20, 22, 24, 26, 31, 33, 35, 37, 106-112) described herein and/or exist in a combination of hardware, software and/or firmware.

Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Massachusetts, which can accept encryption keys of arbitrary length, and is essentially a pseudo random number generator with an output of the generator being XORed with a data stream to produce encrypted data.

WEP is used at the two lowest layers of the OSI model, the physical layer and the data link layer, therefore, it does not offer end-to-end security. WEP also uses encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i standard is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES).

DES is a popular symmetric-key encryption method developed in 1975 and standardized by ANSI in 1981 as ANSI X.3.92, the contents of which are incorporated herein by reference. As is known in the art, 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This secret is then converted into various types of cryptographic keys. A large number of the variants of the DH method exist including ANSI X9.42. The IETF RFC-2631, entitled "Diffie-Hellman Key Agreement Method" is incorporated here by reference.

The HyperText Transport Protocol (HTTP) Secure (HTTPS), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security methods are negotiated between the source and destination at the start of establishing a protocol session. The SSL 2.0 protocol specification, by Kipp E. B. Hickman, 1995 is incorporated herein by reference.

Transport Layer Security (TLS) provides communications privacy over the Internet. The protocol allows client/server applications to communicate over a transport layer (e.g., TCP) in a way that is designed to prevent eavesdropping, tampering, or message forgery. For more information on TLS see IETF RFC-2246, incorporated herein by reference.

In one embodiment, the security functionality includes Cisco Compatible EXtensions (CCX). CCX includes security specifications for makers of 802.11xx wireless LAN chips for ensuring compliance with Cisco's proprietary wireless security LAN protocols. As is known in the art, Cisco Systems, Inc. of San Jose, California is supplier of networking hardware and software, including router and security products.

However, the present invention is not limited to such security and encryption methods described herein and more, fewer and/or other types of security and encryption methods can be used to practice the invention. The security and encryption methods described herein can also be used in various combinations and/or in different layers of the protocol stack 38 with each other.

Cloud Computing Networks

Figure 4:
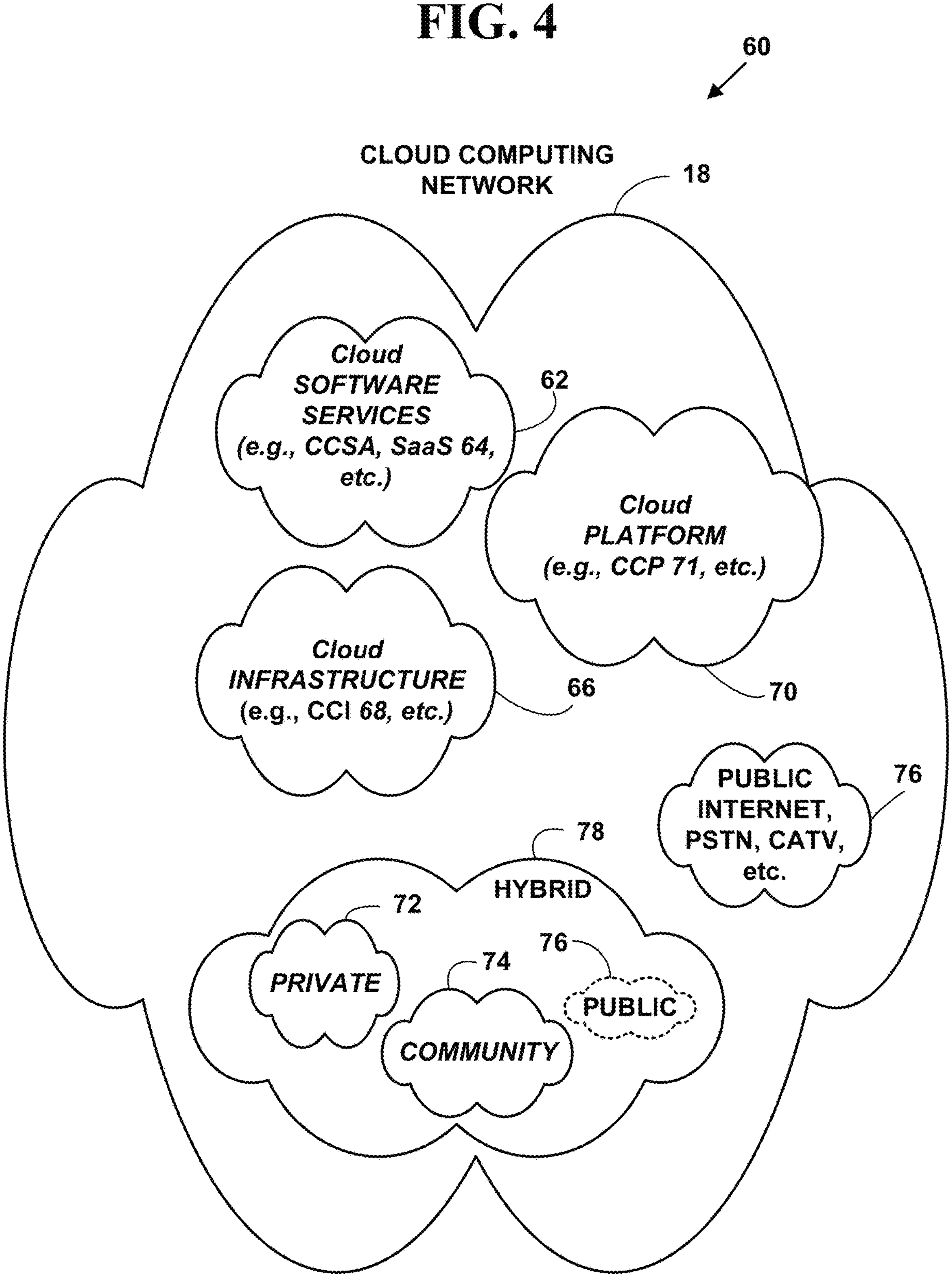
FIG. 4 is a block diagram illustrating an exemplary cloud communications network.

FIG. 4 is a block diagram 60 illustrating an exemplary cloud computing network 18. The cloud computing network 18 is also referred to as a "cloud communications network" 18. However, the present invention is not limited to this cloud computing model and other cloud computing models can also be used to practice the invention. The exemplary cloud communications network includes both wired and/or wireless components of public and private networks.

In one embodiment, the cloud computing network 18 includes a cloud communications network 18 comprising plural different cloud component networks 72, 74, 76, 78. "Cloud computing" is a model for enabling, on-demand network access to a shared pool of configurable computing resources (e.g., public and private networks, servers, storage, applications, and services) that are shared, rapidly provisioned and released with minimal management effort or service provider interaction.

This exemplary cloud computing model for electronic information retrieval promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

| |
|---|
| 1. On-demand identification, verification and/or location information services. Automatic identification, verification and/or location information services can unilaterally provision computing capabilities, such as server time and network storage, as needed automatically without requiring human interaction with each network server 20, 22, 24, 26 on the cloud communications network 18. |
| 2. Broadband network access. Automatic identification, verification and/or location information services capabilities are available over plural broadband communications networks and accessed through standard mechanisms that promote use by heterogeneous thin or thick client platforms (e.g., network devices, 12, 14, 16, 31, 33, 35, 37, 106-112, etc.). The broadband network access includes high speed network access such as 3G, 4G and 5G wireless and/or wired and broadband and/or ultra-broad band (e.g., WiMAX, etc.) network access. |
| 3. Resource pooling. Automatic identification, verification and/or location information services resources are pooled to serve multiple requesters using a multi-tenant model, with different physical and virtual resources dynamically assigned and reassigned according to demand. There is location independence in that a requester of services has no control and/or knowledge over the exact location of the provided by the identification, verification and/or location information service resources but may be able to specify location at a higher level of abstraction (e.g., country, state, or data center). Examples of pooled resources include storage, processing, memory, network bandwidth, virtual server network device and virtual target network devices. |
| 4. Rapid elasticity. Capabilities can be rapidly and elastically provisioned, in some cases automatically, to quickly scale out and rapidly released to quickly scale for identification, verification and/or location information service collaboration. For automatic identification, verification and/or location information services, multi-media collaboration converters, the automatic identification, verification and/or location information services, collaboration and analytic conversion capabilities available for provisioning appear to be unlimited and can be used in any quantity at any time. |
| 5. Measured Services. Cloud computing systems automatically control and optimize resource use by leveraging a metering capability at some level of abstraction appropriate to the type of automatic identification, verification and/or location information services (e.g., storage, processing, bandwidth, custom electronic content retrieval applications, etc.). Electronic Automatic RCS interoperability services collaboration conversion usage is monitored, controlled, and reported providing transparency for both the automatic RCS interoperability services provider and the automatic identification, verification and/or location information service requester of the utilized electronic content storage retrieval service. |

Exemplary cloud computing service models illustrated in FIG. 4 appear in Table 2. However, the present invention is not limited to these service models and more, fewer or other service models can also be used to practice the invention.

TABLE 2

| |
|---|
| 1. Cloud Computing Software Applications 62 for identification, verification and/or location information services (CCSA, SaaS 64). The capability to use the provider's applications 30, 30a, 30b, 30c, 30d, 30e, 30f running on a cloud infrastructure 66. The cloud computing applications 62, are accessible from the server network device 20, 22, 24, 26 from various client devices 12, 14, 16, 31, 33, 35, 37, 106-112 through a thin client interface such as a web browser, etc. The user does not manage or control the underlying cloud infrastructure 66 including network, servers, operating systems, storage, or even individual application 30, 30a, 30b, 30c, 30d, 30e, 30f capabilities, with the possible exception of limited user-specific application configuration settings. |
| 2. Cloud Computing Infrastructure 66 for identification, verification and/or location information services (CCI 68). The capability provided to the user is to provision processing, storage and retrieval, networks 18, 72, 74, 76, 78 and other fundamental computing resources where the consumer is able to deploy and run arbitrary software, which can include operating systems and applications 30, 30a, 30b, 30c, 30d, 30e, 30f. The user does not manage or control the underlying cloud infrastructure 66 but has control over operating systems, storage, deployed applications, and possibly limited control of select networking components (e.g., host firewalls, etc.). |
| 3. Cloud Computing Platform 70 for identification, verification and/or location information services (CCP 71). The capability provided to the user to deploy onto the cloud infrastructure 66 created or acquired applications created using programming languages and tools supported servers 20, 22, 24, 26, etc. The user not manage or control the underlying cloud infrastructure 66 including network, servers, operating systems, or storage, but has control over the deployed applications 30a, 30b, 30c, 30d, 30e, 30f and possibly application hosting environment configurations. |

Exemplary cloud computing deployment models appear in Table 3. However, the present invention is not limited to these deployment models and more, fewer or other deployment models can also be used to practice the invention.

TABLE 3

| |
|---|
| 1. Private cloud network 72. The cloud network infrastructure is operated solely for identification, verification and/or location information services. It may be managed by the electronic content retrieval or a third party and may exist on premise or off premise. |
| 2. Community cloud network 74. The cloud network infrastructure is shared by several different organizations and supports a specific electronic content storage and retrieval community that has shared concerns (e.g., mission, security requirements, policy, compliance considerations, etc.). It may be managed by the different organizations or a third party and may exist on premise or off premise. |
| 3. Public cloud network 76. The cloud network infrastructure such as the Internet, PSTN, SATV, CATV, Internet TV, etc. is made available to the general public or a large industry group and is owned by one or more organizations selling cloud services. |
| 4. Hybrid cloud network 78. The cloud network infrastructure 66 is a composition of two and/or more cloud networks 18 (e.g., private 72, community 74, and/or public 76, etc.) and/or other types of public and/or private networks (e.g., intranets, etc.) that remain unique entities but are bound together by standardized or proprietary technology that enables data and application portability (e.g., cloud bursting for load-balancing between clouds, etc.) |

Cloud software 64 for electronic content retrieval takes full advantage of the cloud paradigm by being service oriented with a focus on statelessness, low coupling, modularity, and semantic interoperability for electronic content retrieval. However, cloud software services 64 can include various states.

Cloud storage of desired electronic content on a cloud computing network includes agility, scalability, elasticity and multi-tenancy. Although a storage foundation may be comprised of block storage or file storage such as that exists on conventional networks, cloud storage is typically exposed to requesters of desired electronic content as cloud objects.

In one exemplary embodiment, the cloud application 30, 30*a*, 30*b*, 30*c*, 30*d*, 30*e*, 30*f* offers cloud services for identification, verification and/or location information of the desired person 41. The application 30, 30*a*, 30*b*, 30*c*, 30*d*, 30*e*, 30*f* offers the cloud computing Infrastructure 66, 68 as a Service 62 (IaaS), including a cloud software infrastructure service 62, the cloud Platform 70, 71 as a Service 62 (PaaS) including a cloud software platform service 62 and/or offers Specific cloud software services as a Service 64 (SaaS) including a specific cloud software service 64 for identification, verification and/or location services information of the desired person 41. The IaaS, PaaS and SaaS include one or more of cloud services 62 comprising networking, storage, server network device, virtualization, operating system, middleware, run-time, data and/or application services, or plural combinations thereof, on the cloud communications network 18.

Figure 5:
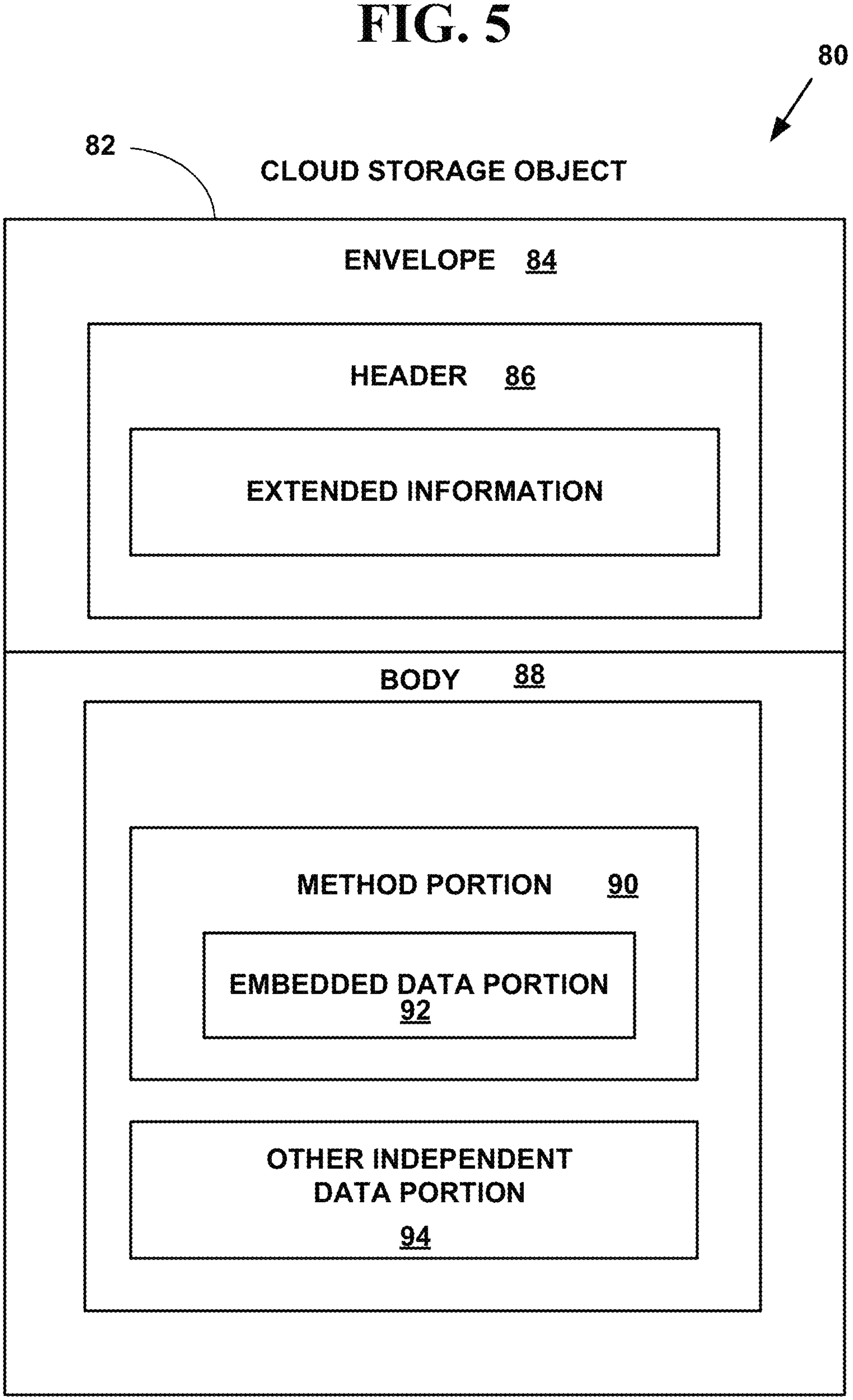
FIG. 5 is a block diagram illustrating an exemplary cloud storage object.

FIG. 5 is a block diagram 80 illustrating an exemplary cloud storage object 82. One or more server network devices (e.g., 20, 22, 24, 26, etc.) store portions 13', 15' of the electronic message content 13, 15 (e.g., electronic identification, verification and/or location information, etc.) as cloud storage objects 82 (FIG. 5) as is described herein.

The cloud storage object 82 includes an envelope portion 84, with a header portion 86, and a body portion 88. However, the present invention is not limited to such a cloud storage object 82 and other cloud storage objects and other cloud storage objects with more, fewer or other portions can also be used to practice the invention.

The envelope portion 84 uses unique namespace Uniform Resource Identifiers (URIs) and/or Uniform Resource Names (URNs), and/or Uniform Resource Locators (URLs) unique across the cloud communications network 18 to uniquely specify, location and version information and encoding rules used by the cloud storage object 82 across the whole cloud communications network 18. For more information, see IETF RFC-3305, Uniform Resource Identifiers (URIs), URLs, and Uniform Resource Names (URNs), the contents of which are incorporated by reference.

The envelope portion 84 of the cloud storage object 82 is followed by a header portion 86. The header portion 86 includes extended information about the cloud storage objects such as authorization and/or transaction information, etc.

The body portion 88 includes methods 90 (i.e., a sequence of instructions, etc.) for using embedded application-specific data in data elements 92. The body portion 88 typically includes only one portion of plural portions of application-specific data 92 and independent data 94 so the cloud storage object 82 can provide distributed, redundant fault tolerant, security and privacy features described herein.

Cloud storage objects 82 have proven experimentally to be a highly scalable, available and reliable layer of abstraction that also minimizes the limitations of common file systems. Cloud storage objects 82 also provide low latency and low storage and transmission costs.

Cloud storage objects 82 are comprised of many distributed resources, but function as a single storage object, are highly fault tolerant through redundancy and provide distribution of desired electronic content across public communication networks 76, and one or more private networks 72, community networks 74 and hybrid networks 78 of the cloud communications network 18. Cloud storage objects 82 are also highly durable because of creation of copies of portions of desired electronic content across such networks 72, 74, 76, 78 of the cloud communications network 18. Cloud storage objects 82 includes one or more portions of desired electronic content and can be stored on any of the 72, 74, 76, 78 networks of the cloud communications network 18. Cloud storage objects 82 are transparent to a requester of desired electronic content and are managed by cloud applications 30, 30*a*, 30*b*, 30*c*, 30*d*, 30*e*, 30*f*.

In one embodiment, cloud storage objects 82 are configurable arbitrary objects with a size up to hundreds of terabytes, each accompanied by with a few kilobytes of metadata. Cloud objects are organized into and identified by a unique identifier unique across the whole cloud communications network 18. However, the present invention is not limited to the cloud storage objects described, and more fewer and other types of cloud storage objects can be used to practice the invention.

Cloud storage objects 82 present a single unified namespace or object-space and manages desired electronic content by user or administrator-defined policies storage and retrieval policies. Cloud storage objects includes Representational state transfer (REST), Simple Object Access Protocol (SOAP), Lightweight Directory Access Protocol (LDAP) and/or Application Programming Interface (API) objects and/or other types of cloud storage objects. However, the present invention is not limited to the cloud storage objects described, and more fewer and other types of cloud storage objects can be used to practice the invention.

REST is a protocol specification that characterizes and constrains macro-interactions storage objects of the four components of a cloud communications network 18, namely origin servers, gateways, proxies and clients, without imposing limitations on the individual participants.

SOAP is a protocol specification for exchanging structured information in the implementation of cloud services with storage objects. SOAP has at least three major characteristics: (1) Extensibility (including security/encryption, routing, etc.); (2) Neutrality (SOAP can be used over any transport protocol such as HTTP, SMTP or even TCP, etc.), and (3) Independence (SOAP allows for almost any programming model to be used, etc.)

LDAP is a software protocol for enabling storage and retrieval of electronic content and other resources such as files and devices on the cloud communications network 18. LDAP is a "lightweight" version of Directory Access Protocol (DAP), which is part of X.500, a standard for directory services in a network. LDAP may be used with X.509 security and other security methods for secure storage and retrieval. X.509 is public key digital certificate standard developed as part of the X.500 directory specification. X.509 is used for secure management and distribution of digitally signed certificates across networks.

An API is a particular set of rules and specifications that software programs can follow to communicate with each other. It serves as an interface between different software programs and facilitates their interaction and provides access to automatic identification, verification and/or location information of a desired person services in a cloud or non-cloud environment. In one embodiment, the API for RCS interoperability services is available to network devices 12, 14, 16, 20, 22, 24, 26, 31, 33, 35, 37, 98-104 and networks 18, 18'. However, the present invention is not limited to such an embodiment and other embodiments can be used to practice the invention.

Wearable Devices

Wearable technology" and/or "wearable devices" are clothing and accessories incorporating computer and advanced electronic technologies. Wearable network devices provide several advantages including, but not limited to: (1) Quicker access to notifications. Important and/or summary notifications are sent to alert a user to view the whole message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices take telemetric data recordings and providing useful feedback for users for exercise, health, fitness, etc. activities.

Figure 6:
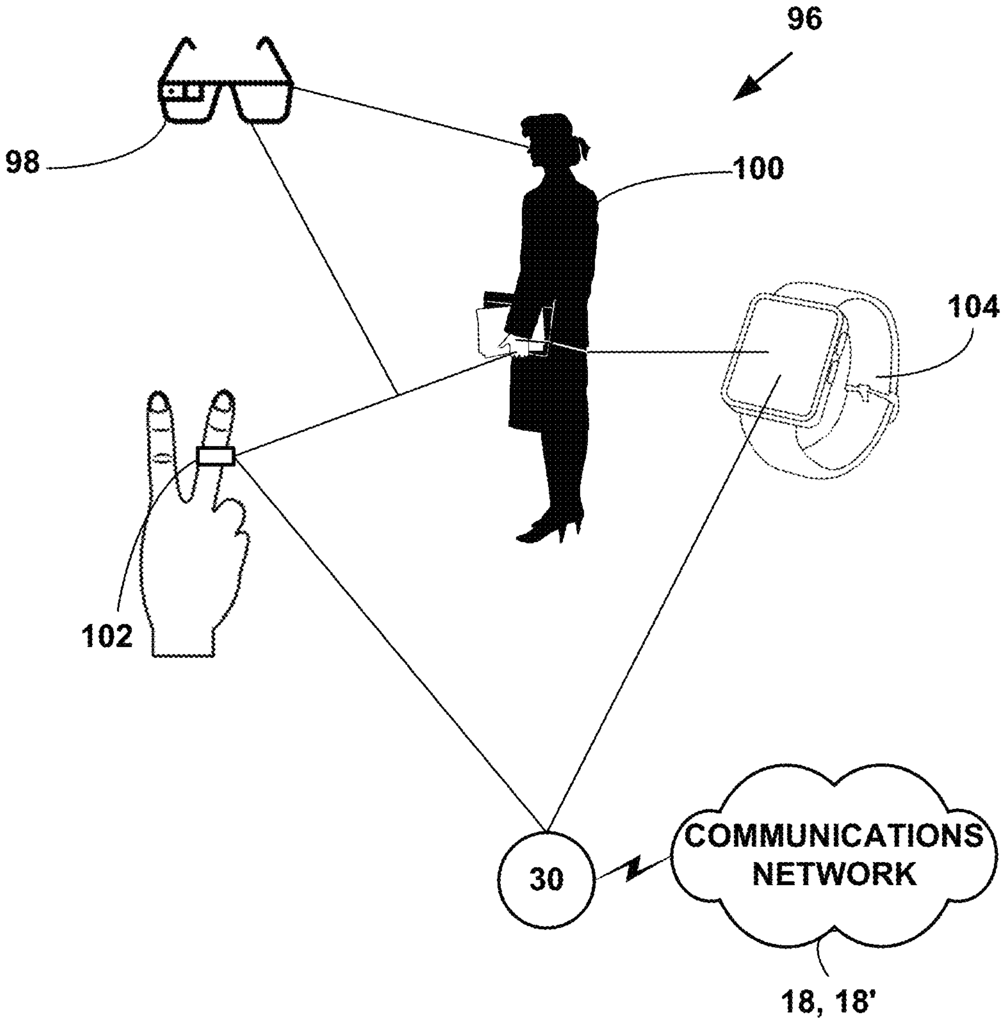
FIG. 6 is a block diagram illustrating wearable network devices.

FIG. 6 is a block diagram with 96 illustrating wearable devices. The wearable devices include one or more processors and include, but are not limited to, wearable digital glasses 98, clothing 100, jewelry 102 (e.g., smart rings, smart earrings, etc.) and/or watches 104. However, the present invention is not limited to such embodiments and more, fewer and other types of wearable devices can also be used to practice the invention.

In one specific embodiment, the application 30, 30*a*, 30*b*, 30*c*, 30*d*, 30*e*, 30*f* interacts with wearable devices 98-104 automatic identification, verification and/or location information services for the desired person 41 with the methods described herein. However, the present invention is not limited this embodiment and other embodiments can also be used to practice the invention.

Artificial Intelligence (AI) and Big Data

"Artificial intelligence" (AI), also known as machine intelligence (MI), is intelligence demonstrated by machines, in contrast to the natural intelligence (NI) displayed by humans and other animals. AI research is defined as the study of "intelligent agents." Intelligent agents are any software application or hardware device that perceives its environment and takes actions that maximize its chance of successfully achieving its goals. Colloquially, the term "artificial intelligence" is applied when a machine mimics "cognitive" functions that humans associate with human brains, such as learning, problem solving and comparing large number of data points. In one embodiment, the present invention uses one or more AI methods including, but are not limited to, AI knowledge-based methods 30*c* for identification, verification and/or location information services for a desired person 41, including but not limited to: providing a plurality of different permissions and at a plurality of different security layers including: (a) a first security layer including authorization for only summary identification, verification and location information for a desired person; (b) a plurality of second advanced security layers including: (1) multi-layer identity verification layer comprising: facial recognition sublayer, eye scan sublayer, and identifying other unique biometric markers sublayer, to verify an identity of a desired person with a pre-determined level of precision, (2) location tracking layer, (3) proximity detection layer, (4) geofencing layer, (5) pattern recognition layer, (6) event recording layer, (7) secure data records layer, (8) data analytics layer (9) electronic chain of custody layer, and (10) law enforcement records layer; However, the present invention is not limited to such an embodiment and more, fewer and/or other AI methods can be used to practice the invention.

In one embodiment, SaaS 64 includes and AI application 30*c* with the AI methods described herein. In another embodiment, the AI application 30*c* is a standalone application. However, the present invention is not limited to such an embodiment, and the AI application 30*c* can be provided in other than the SaaS 64.

"Big Data" refers to the use of predictive analytic methods that extract value from data, and to a particular size of data set. The quantities of data used are very large, at least 100,000 data points and more typically 500,000 to 1 Million+ data points. Analysis of Big Data sets are used to find new correlations and to spot trends. In one embodiment, SaaS 64 includes and Big Data application 30*d* with the Big Data described herein.

In one embodiment, the AI methods described herein collect data information to create and store (e.g., in cloud storage object 82, etc.) a Big Data that is used to analyze trends find new correlations and to spot trends. However, the present invention is not limited to such an embodiment and the AI methods described herein can be used without Big Data sets.

Short Message Service (SMS) Messaging

Short Message Service (SMS) is an electronic text messaging service component of phone, Web, or mobile communication systems. It uses standardized communications protocols to allow fixed line or mobile phone devices to exchange short text messages.

SMS messages were defined in 1985 as part of the Global System for Mobile Communications (GSM) series of standards as a means of sending messages of up to 160 characters to and from GSM mobile handsets. Though most SMS messages are mobile-to-mobile text messages, support for the service has expanded to include other mobile technologies as well as satellite and landline networks.

The SMS Internet Engineering Task Force (IETF) Request for Comments (RFC) 5724, ISSN: 2070-1721, 2010, is incorporated herein by reference.

Direct and Instant Messages

A "direct message" (DM) is a private form of communication between social media users that is only visible to the sender and recipient(s). INSTAGRAM, TWITTER, FACEBOOK and other platforms, allow for direct messages between their users, with varying restrictions by platform.

An "instant message" (IM) is a type of online chat allowing real-time text transmission over the Internet or another computer network. Messages are typically transmitted between two or more parties, when each user inputs text and triggers a transmission to the recipient, who are all connected on a common network.

Multimedia Messaging Service (MMS)

Multimedia Messaging Service (MMS) is a standard way to send messages that include multimedia content to and from a mobile phone over a cellular network. Users and providers may refer to such a message as a PXT, a picture message, and/or a multimedia message.

The MMS Internet Engineering Task Force (IETF) Request for Comments (RFC) 4355 and 4356, are incorporated herein by reference.

Rich Communication Suite (RCS)

Rich Communications Suite/Rich Communications System (RCS) is a communication protocol between mobile telephone carriers, between phones and carriers, and between individual devices aiming at replacing SMS messages with a message system that is richer, provides phonebook polling (e.g., for service discovery, etc.), and can transmit in-call multimedia. It is also marketed under the names of Advanced Messaging, Advanced Communications, Chat, joyn, Message+ and SMS+. RCS is also a communication protocol available for device-to-device (D2D) exchanges without using a telecommunications carrier for devices that are in close physical proximity (e.g., between two IoT devices, smart phones, smart phone and electronic tablet, etc.).

One advantage RCS Messaging has over SMS is that RCS enables users to send rich, verified messages including photos, videos and audio messages, group messages, read receipts, indicators to show other users are typing a message, carousel messages, suggested chips, chat bots, barcodes, location integration, calendar integration, dialer integration, and other RCS messaging features. RCS messaging includes person-to-person (P2P), application-to-person (A2P), application-to-application (A2A), application-to-device (A2D) and/or device-to-device (D2D) messaging.

The RCS Interworking Guidelines Version 14.0, 13 Oct. 2017, GSM Association, Rich Communication Suite RCS API Detailed Requirements, version 3.0, Oct. 19, 2017, Rich Communication Suite 8.0 Advanced Communications Services and Client Specification Version 9.0, 16 May 2018, RCS Universal Profile Service Definition Document Version 2.2, 16 May 2018, and Rich Communication Suite Endorsement of OMA CPM 2.2 Conversation Functions Version 9.0, 16 Oct. 2019, are all incorporated herein by reference.

The Rich Communication Suite-Enhanced (RCS-e) includes methods of providing first stage interoperability among Mobile Network Operators (MNOs). RCS-e is a later version of RCS which enables mobile phone end users to use instant messaging (IM), live video sharing and file transfer across any device on any MNO.

The RCS functionality of the present invention includes, but is not limited to, one and two-way, rich, verified, multimedia messages including photos, videos and audio messages, group messages, read receipts, indicators to show other users are typing a message, predefined quick-reply suggestions, rich cards, carousels, action buttons, maps, click-to-call, calendar integration, geo-location, etc. The RCS functionality also includes RCS emulators and/or thin RCS applications that provide full and/or selected features of available RCS functionality. However, the present invention is not limited to such embodiments and other embodiments can be used to practice the invention.

Figure 7A:
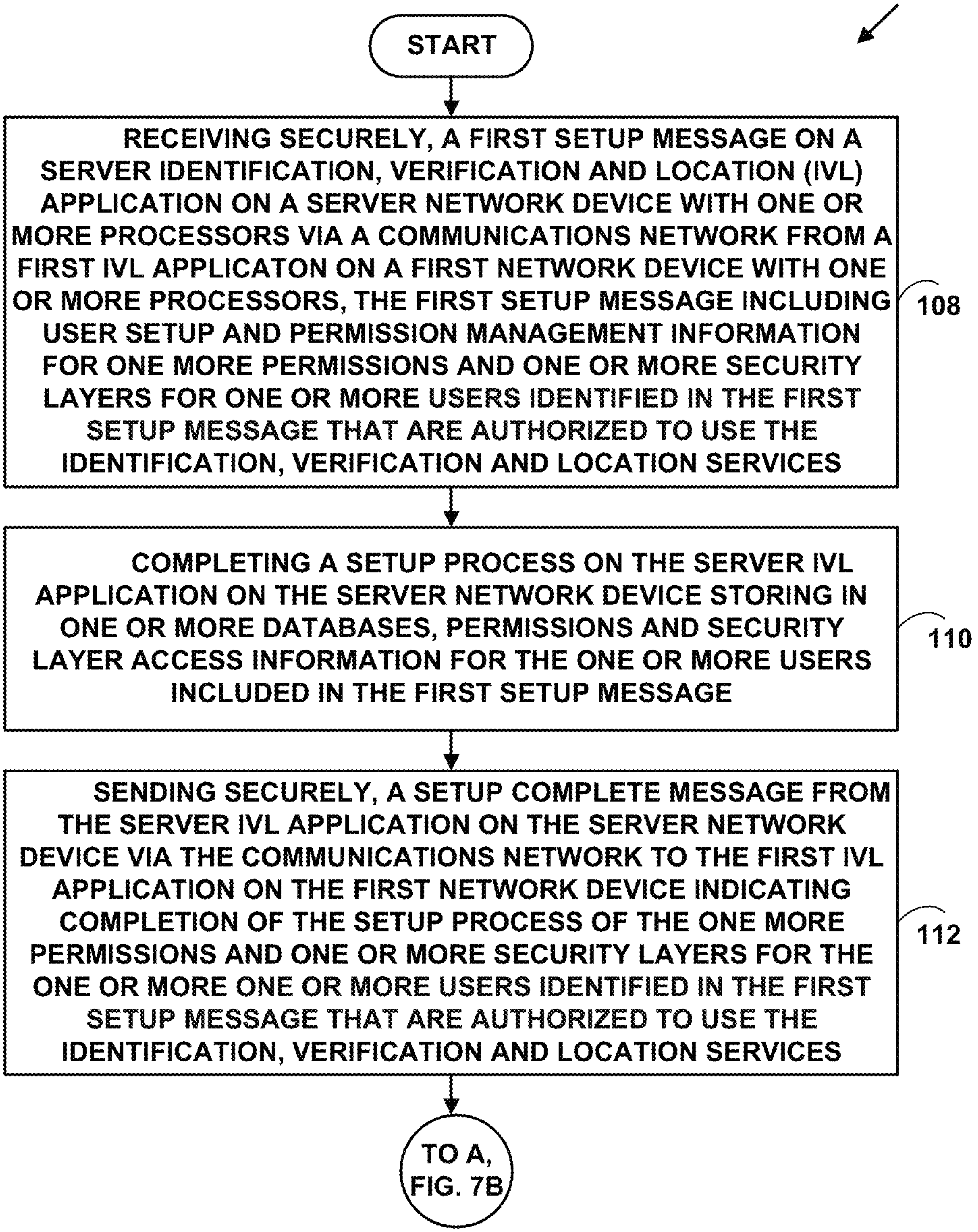
FIGS. 7A, 7B and 7C are a flow diagram illustrating a method for providing identification, verification and location services for a desired person.
Figure 7B:
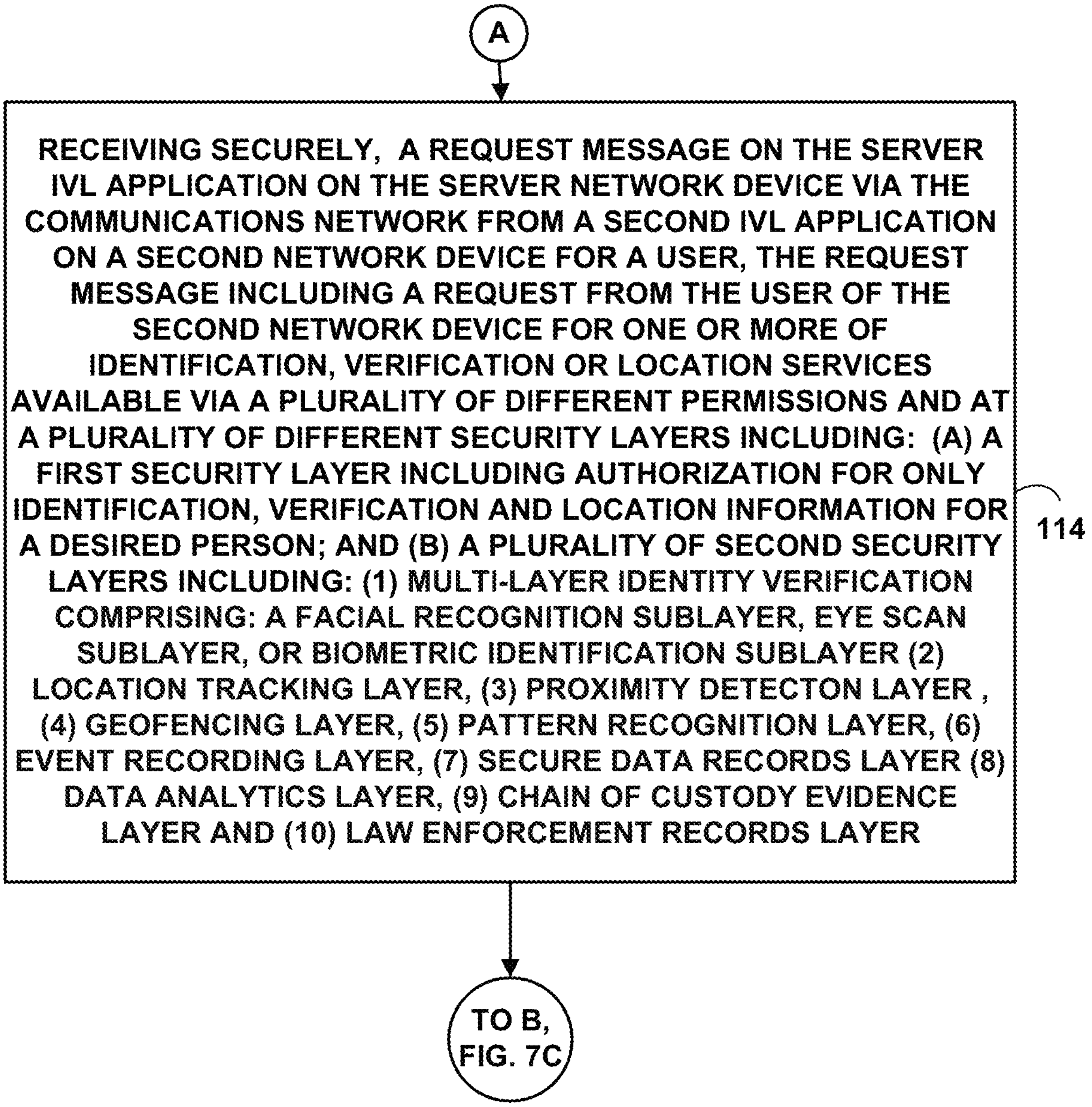
Figure 7C:
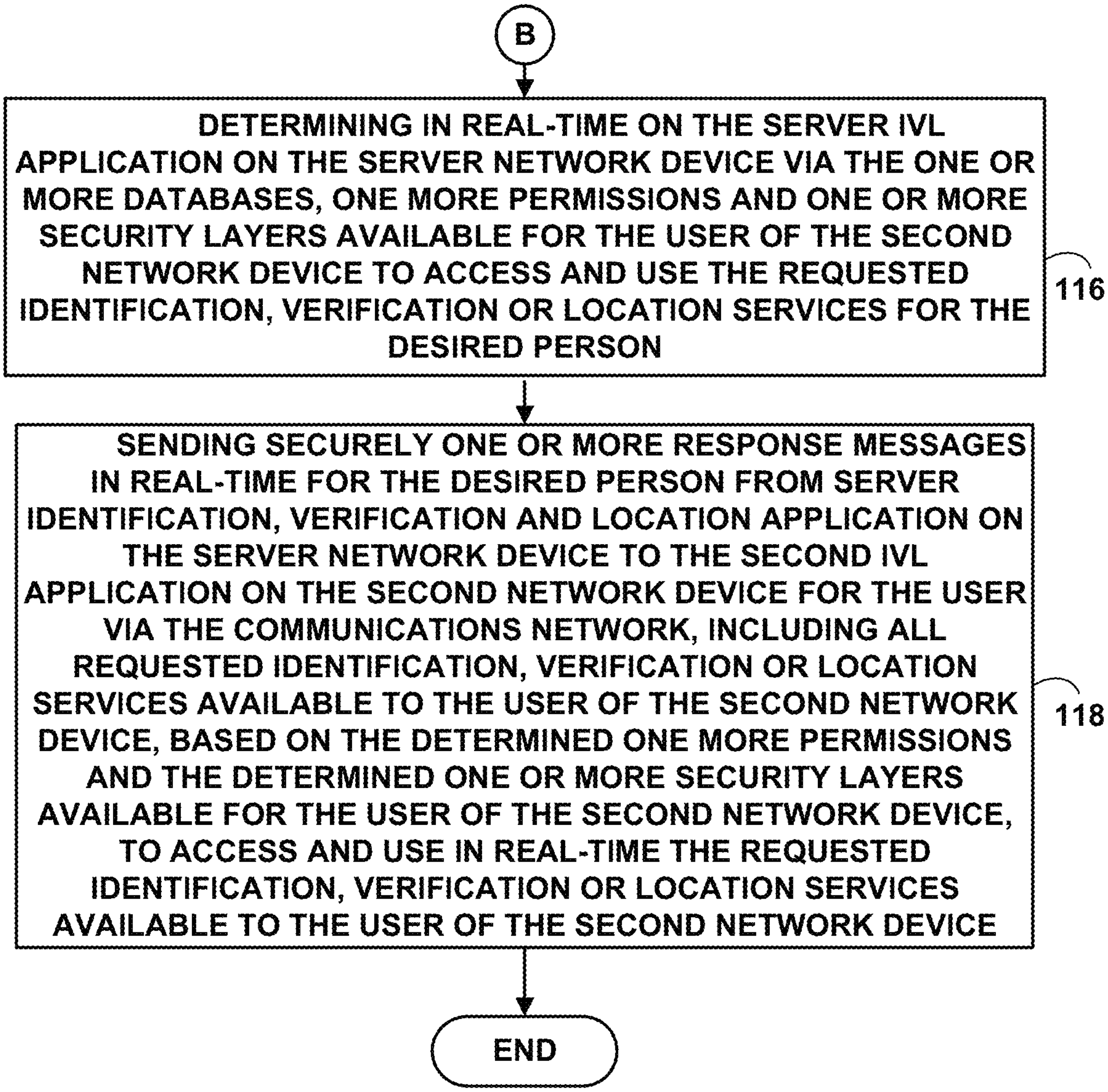

Identification, Verification, Tracking and Location Information Services for a Desired Person or Object FIGS. 7A, 7B and 7C are a flow diagram illustrating a Method 106 for providing identification, verification and location services for a desired person.

In FIG. 7A at Step 108, receiving securely, a first setup message on a server identification, verification and location (IVL) application on a server network device with one or more processors via a communications network from a first IVL application on a first network device with one or more processors, the first setup message including user setup and permission management information for one more permissions and one or more security layers for one or more users identified in the first setup message that are authorized to use the identification, verification and location services; At Step 110, completing a setup process on the server IVL application on the server network device storing in one or more databases, permissions and security layer access information for the one or more users included in the first setup message; At Step 112, sending securely, a setup complete message from the server IVL application on the server network device via the communications network to the first IVL application on the first network device indicating completion of the setup process of the one more permissions and one or more security layers for the one or more one or more users identified in the first setup message that are authorized to use the identification, verification and location services; In FIG. 7B, at Step 114, receiving securely, a request message on the server IVL application on the server network device via the communications network from a second IVL application on a second network device for a user, the request message including a request from the user of the second network device for one or more of identification, verification or location services available via a plurality of different permissions and at a plurality of different security layers including: (a) a first security layer including authorization for only summary identification, verification and location information for a desired person; (b) a plurality of second advanced security layers including: (1) multi-layer identity verification layer comprising: facial recognition sublayer, eye scan sublayer, and identifying other unique biometric markers sublayer, to verify an identity of a desired person with a pre-determined level of precision, (2) location tracking layer, (3) proximity detection layer, (4) geofencing layer, (5) pattern recognition layer, (6) event recording layer, (7) secure data records layer, (8) data analytics layer (9) electronic chain of custody layer, and (10) law enforcement records layer; At Step 116, determining in real-time on the server IVL application on the server network device via the one or more databases, one more permissions and one or more security layers available for the user of the second network device to access and use the requested identification, verification or location services for the desired person; and in FIG. 7C at Step 118, sending securely one or more response messages for the desired person in real-time from server IVL application on the server network device to the second IVL application on the second network device for the user via the communications network, including all requested identification, verification or location services available to the user of the second network device, based on the determined one more permissions and the determined one or more security layers available for the user of the second network device, to access and use in real-time the requested identification, verification or location services available to the user of the second network device for the desired person.

The present invention is illustrated with an exemplary embodiment. However, the present invention is not limited to such an embodiment and other embodiments can be used to practice the invention.

In such an exemplary embodiment in FIG. 7A at Step 108, receiving securely, a first setup message 13*s*, 15*s* on a server identification, verification and location (IVL) application 30*a* on a server network device 20, 22, 24, 24 with one or more processors via a communications network 18, 18' from a first IVL application 30 on the first network device 12, 14, 16, 20, 22, 24, 26, 31, 98-104 with one or more processors, the first setup message including user setup and permission management information for one more permissions and one or more security layers for one or more users 29 identified in the first setup message 13*s*, 15*s* that are authorized to use the identification, verification and location services.

In one embodiment, the first setup message 13*s*, 15*s* is received securely using one or more of the encryption and/or security methods described herein. However, the present invention is not limited to such an embodiment and other encryption and/or security methods can be used to practice the invention.

In one embodiment, the server IVL application 30*a* an identification, verification and location information application 30*a*, includes a separate identification, verification and location information application program interface (API) 30*b*, an Artificial Intelligence (AI) application 30*c* and/or other applications 30*d*, 30*e*, 30*f*. In such an embodiment the server IVL application 30*a* makes calls to the IVL API 30*b* and AI application 30*c* to provide the identification, verification, tracking and location functionality. In another embodiment, the identification, verification and location information application program interface (API) 30*b*, the Artificial Intelligence (AI) application 30*c* and/or other applications 30*d*, 30*e*, 30*f* are integral to server IVL application 30*a*. However, the present invention is not limited to such an embodiment and other embodiments and applications in other configurations can be used to practice the invention.

In one embodiment, the first application 30 on the first network device 12, 14, 16, 20, 22, 24, 26, 31, 98-104 includes IVL application 30 including an identification, verification and location information application 30*a*, identification, verification tracking and location information application program interface (API) 30*b*, an Artificial Intelligence (AI) application 30*c* and/or other applications 30*d*, 30*e*, 30*f*. However, the present invention is not limited to such an embodiment and more, fewer and/or other applications can be used to practice the invention.

At Step 110, completing a setup process on the server IVL application 30*a* on the server network device 20, 22, 24, 26 by storing in one or more databases 20', 22', 24', 26' and/or a blockchain 174 (FIG. 13 and Table 5) permissions and security layer access information for the one or more users 29 included in the first setup message 13*s*, 15*s*.

In one embodiment, the setup process includes, but is not limited to, user 39 setup and permission management, allowing the server IVL application 30*a* and/or IVL application 30, to define which individuals are authorized to use the identification, verification and location services. The setup process includes setting permissions for access points, actions, and data visibility. However, the present invention is not limited to such an embodiment, and other embodiments with other actions completed in the setup process.

Figure 13:
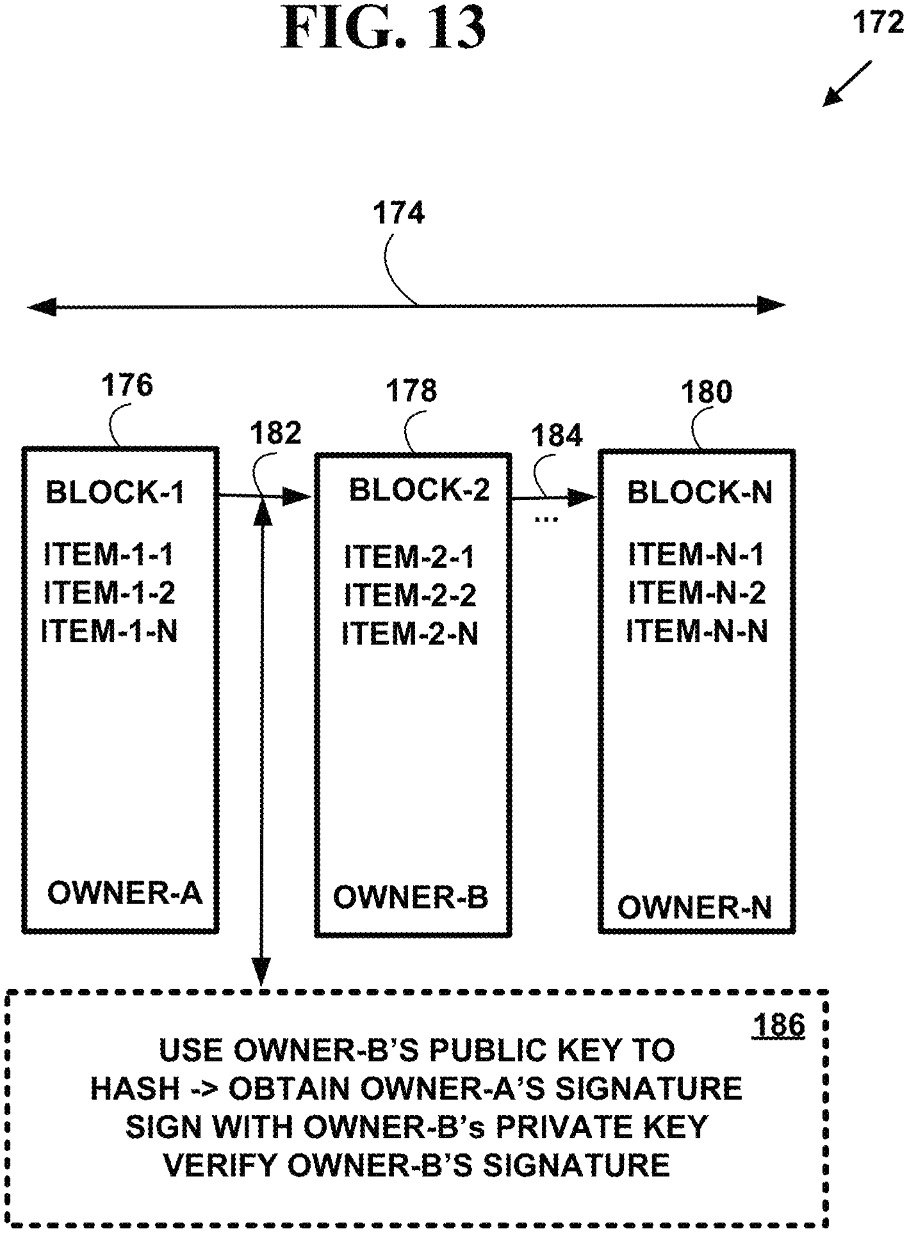
FIG. 13 is a block diagram illustrating an exemplary blockchain.

In one embodiment, the setup process includes, but is not limited to, the server IVL application 30*a* on the server network device 20, 22, 24, 26 setting up one or more user profiles for the one or more users included in the first setup message 13*s*, 15*s* in a database 20', 22', 24', 26' and/or a blockchain 174 (FIG. 13). A user profile includes, but is not limited to, a type of user designation (e.g., vendor, employee, manager, law enforcement, military, government, etc.) and a list of a plurality of user permissions. However, the present invention is not limited to such an embodiment and other embodiments with more, fewer and/or other information included in a user profile can be used to practice the invention.

In one embodiment, the server IVL application 30*a* on the server network device 20, 22, 24, 26 and/or IVL application 30 on the target network device 12, 14, 16, 20, 22, 24, 26, 31, 98-104 provides IVL functionality as one or more SaaS 64 and stores the user setup profile in one or more cloud storage objects 82 in one more cloud storage databases 20', 22', 24', 26' and/or a blockchain 174 (FIG. 13) on a cloud communications network 18. However, the present invention is not limited to such an embodiment and other embodiments without cloud services can be used to practice the invention.

In one embodiment, the server IVL application 30*a* on the server network device 20, 22, 24, 26 includes the list of the plurality of user permissions in a permission hierarchy, including but not limited to, a data structure comprising a search tree, an array and/or a block chain 174. A search tree is a tree data structure used for locating specific keys within a data set. In order for a tree to function as a search tree, a key for each node must be greater than any keys in subtrees on the left, and less than any keys in subtrees on the right. The advantage of search trees is their efficient search time given the tree is reasonably balanced, which is to say the leaves at either end are of comparable depths. Various search-tree data structures exist, several of which also allow efficient insertion and deletion of elements, which operations then have to maintain tree balance. Search trees are often used to implement an associative array. The search tree algorithm uses the key from the key-value pair to find a location in the tree, and then stores the entire key-value pair at that particular location. However, the present invention is not limited to such an embodiment and hierarchies, data structures and tree data structures can be used to practice the invention.

In one embodiment, the search tree includes a binary search tree data structure. A binary search tree is a node-based data structure where each node contains a key and two subtrees, the left and right. For all nodes, the left subtree's key must be less than the node's key, and the right subtree's key must be greater than the node's key. These subtrees must all qualify as binary search trees. The worst-case time complexity for searching a binary search tree is the height of the tree, which can be as small as Big-O of $\log_{10}$ of n $(O(\log_{10}(n)))$ for a binary tree with n elements. Algorithmic complexities are classified according to the type of function appearing in the Big-O notation (e.g., $\log_{10}(n)$, etc.). However, the present invention is not limited to such an embodiment and other hierarchies, data structures and tree structures can be used to practice the invention.

In one embodiment, the setup process includes permission management, including, but not limited to, permission management for: (1) Access Points: which identification, verification and location service access point a user can enter; (2) Actions: What actions the user is permitted to do with selected identification, verification and location services, including: sending data, receiving data, retrieving data, adding data, editing data and/or viewing reports; and (3) Data Visibility: Which data a user can see or not see, so sensitive information is only visible to those who need it and/or are authorized to see it. However, the present invention is not limited to such an embodiment and other embodiments with more, fewer and/or other permissions can be used to practice the invention.

In one embodiment, the setup process includes security layer management, including but not limited to, security layer management with a data structure for: (1) a First Layer of Security-Authorization Features Use: Before users can go further, the server IVL application 30 checks the created user profiles stored in the database 20', 22', 24', 26' and/or a blockchain 174 (FIG. 13) to make sure the users 39 are authorized to use the identification, verification and location services. Only authorized users 39 can enter the First Layer of Security-Authorization which provides only identification, verification and location information for a desired person 41 (e.g., criminal, terrorist, solider, missing person, professional (e.g., doctor, lawyer, nurse, etc.), student, ride share driver, etc.); and (2) a plurality of Second Layers of Security-Advanced Features Use: Once inside the Second Layers of Security, approved users 39 can access deeper features of the identification, verification and location services (e.g., Table 4, etc.), but only if they have permission for each feature. These deeper features are not available to just anyone; they require extra security clearances, making sure only designated users 39 can use them. The security layer management setup helps make sure that only approved users 39 get past the first layer, and only those users 39 with specific permissions can access the more sensitive parts of the identification, verification and location services to apply to the desired person 41. This layered security approach keeps everything secure. However, the present invention is not limited to such an embodiment and other embodiments with more, fewer and/or other security layers can be used to practice the invention.

The second advanced security features, include but are not limited to, those illustrated in Table 4. However, the present invention is not limited to such an embodiment and other embodiments with more, fewer and/or other advance security features can be used to practice the invention.

TABLE 4

The second advanced security 128 features, comprising a plurality of different security layers including, but not limited to:

1. Multi-layer identity verification layer 130, comprising: a facial recognition sublayer 130a, eye scan sublayer 130b, or biometric markers identification sublayer 130c, to verify an identity of a desired person 41 with a predetermined level of precision.
2. Location tracking layer 132, for tracking physical location of the desired person 41 including but not limited to GPS, network and/or other location information.

TABLE 4-continued

| | |
|---|---|
| 3. | Proximity detection layer 134, to determine a proximity of the desired person 41 to other people 41' or other network devices 12, 14, 16, 20, 22, 24, 26, 31, 98-104 within a pre-determined range of the desired person and any network devices (e.g., 12, 14, 16, 20, 22, 24, 26, 31, 98-104) being used by the desired person 41. |
| 4. | Geofencing layer 136, for creating an electronic geofence around the desired person 41. |
| 5. | Pattern recognition layer 138, for determining patterns including current actions or previously recorded actions and habits of the desired person 41 stored in a database 20, 22, 24, 26, cloud storage object 82 and/or blockchain 174. |
| 6. | Event recording layer 140, for recording events completed by the desired person 41 in a database 20, 22, 24, 26, cloud storage object 82 and/or blockchain 174. |
| 7. | Secure data records layer 142, for creating and storing secure data records for the desired person 41 in a database 20, 22, 24, 26, cloud storage object 82 and/or blockchain 174. |
| 8. | Data analytics layer 144, for the desired person 41 including Artificial Intelligence (AI) methods 30c and non-AI analytic methods for analyzing any information collected for the desired person 41. |
| 9. | Electronic chain of custody layer 146, for securely collecting and storing electronic evidence within a chain of custody for the desired person 41 in a database 20, 22, 24, 26, cloud storage object 82 and/or blockchain 174. |
| 10. | Law enforcement records layer 148, including links arrest, conviction and criminal and civil records for the desired person 41. |

In one embodiment, the the server IVL application 30*a* on the server network device 20, 22, 24, stores permissions and security layer access information for the one or more users 29 included in the first setup message 13*s*, 15*s* in a blockchain 174 (FIG. 13).

In one embodiment, the security layer data structure, includes, but is not limited to a search tree data structure. In one embodiment, the search tree data structure includes a binary search tree data structure. However, the present invention is not limited to such an embodiment and other embodiments with more, fewer and/or other security layer data structures can be used to practice the invention.

At Step 112, sending securely, a setup complete message 13*c*, 15*c* from the server IVL application 30*a* on the server network device 20, 24, 26, 28 via the communications network 18, 18' to the first IVL application 30 on the first network device 12, 14, 16, 20, 22, 24, 26, 31, 33, 35, 37, 98-104 indicating completion of the setup process of the one more permissions and one or more security layers for the one or more one or more users 29 identified in the first setup message 13*s*, 15*s* that are authorized to use the identification, verification and location services.

In one embodiment, the setup complete message 13*c*, 15*c* is sent securely using one or more of the encryption and/or security methods described herein. However, the present invention is not limited to such an embodiment and other encryption and/or security methods can be used to practice the invention.

In FIG. 7B, at Step 114, receiving securely, a request message 13*r*, 15*r* on the server IVL application 30*a* on the server network device 20, 22, 24, 26 via the communications network 18, 18' from a second IVL application 30 on a second network device 12, 14, 16, 20, 22, 24, 26, 31, 33, 35, 37, 98-104 for a user 39, the request message 13*r*, 15*r* including a request from the user 39 of the second network device 12, 14, 16, 20, 22, 24, 26, 31, 33, 35, 37, 98-104 for one or more of identification, verification or location services available via a plurality of different permissions and a plurality of different security layers 122-148 including: (a) a first security layer 124 including authorization for providing only summary identification, verification and location information 43, 126 for a desired person; (b) a plurality of second advanced security layers 128-148 including: (1) multi-layer identity verification layer 130 comprising: a facial recognition sublayer 130*a*, eye scan sublayer 130*b*, and biometric markers identification sublayer 130*c*, (2) location tracking layer 132, (3) proximity detection layer 134 (4) geofencing layer 136, (5) pattern recognition layer 138, (6) event recording layer 140, (7) secure data records layer 142, (8) data analytics layer 144, (9) electronic chain of custody layer 146, and (10) law enforcement records layer 148.

In one embodiment, all message communications between the server IVL application 30*a* on the server network device 20, 22, 24, 26 and the first IVL application 30 on the first network device 12, 14, 16, 20, 22, 24, 26, 31, 33, 35, 37, 98-104 and the second IVL application 30 on the second network device 12, 14, 16, 20, 22, 24, 26, 31, 33, 35, 37, 98-104 via the communications network 18, 18' include end-to-end encryption including one or more of the encryption methods described herein. In another embodiment, are completed on secure messaging applications such as WHATSAPP, TELEGRAM, SIGNAL, etc. However, the present invention is not limited to such an embodiment and other embodiments with more, fewer and/or other end-to-end encryption can be used to practice the invention.

In one embodiment, the server IVL application 30*a* on the server network device 20, 22, 24, 26 and the first IVL application 30 on the first network device 12, 14, 16, 20, 22, 24, 26, 31, 33, 35, 37, 98-104 further include object information in the one or more security layers 122-148 including the first initial security layer 124 allowing access to basic functionality of the identification, verification and location services, including only summary identification, verification and location information for one or more desired objects 59, and including object information in plurality of second advanced security layers 128-148 including advanced functionality of the identification, verification and location services, including the individual security layers 128-148 for accessing the one or more of the plurality of different permissions and at the plurality of different security layers including all available summary identification, verification and location information for one or more desired objects 59. However, the present invention is not limited to such an embodiment and other embodiments can be used to practice the invention.

The server IVL application 30*a* on the server network device 20, 22, 24, 26 creates a continuous feedback cycle that to function as a comprehensive identification, tracking and verification system, adaptable across various, law enforcement, employment, background, goods (e.g., tickets, etc.) and/or services purchases (e.g., medical services, etc.). However, the present invention is not limited to such an embodiment and other embodiments can be used to practice the invention.

The server IVL application 30*a* on the server network device 20, 22, 24, 26 includes feedback and adaptive learning, including AI and machine learning to learn and adapt its behavior based on user 39 interactions and IVL requests made for desired persons 39. For example, the server IVL application 30*a* collects information on car jackings, burglaries, robberies, etc., techniques that are used, time such crimes typically occur, etc. sending alerts to users 39, increasing identity checks of persons 41, flagging potential threats as they happen before a corresponding crime and/or other event may occur. However, the present invention is not limited to such an embodiment and other embodiments can be used to practice the invention.

The server IVL application 30*a* on the server network device 20, 22, 24, 26 creates and stores contextual triggers for a plurality of different scenarios based on user 39 interactions, requests made for desired persons 41, 41' and prior and current behaviors of desired persons 41, 41'. For example, an exemplary contextual trigger may include detecting a person is spotted by security camera near an entrance of a building at 2:00 am carry a bag of tools. A facial recognition 130*a* is triggered and the pattern recognition layer 138 is activated. The contextual trigger may then send alerts to a user 39 who is in charge of security for the building. However, the present invention is not limited to such an embodiment and other embodiments can be used to practice the invention.

The server IVL application 30*a* on the server network device 20, 22, 24, 26 is in communications with one or more other third-party APIs, databases, other blockchains and other systems via the communications network 18, 18' to expand its IVL functionality. However, the present invention is not limited to such an embodiment and other embodiments can be used to practice the invention.

The server IVL application 30*a* on the server network device 20, 22, 24, 26 and IVL applications 30 on the network devices 12, 14, 16, 20, 22, 24, 26, 31, 33, 35, 37, 98-104 include a method for conserving device power including battery life on the non-server network devices 12, 14, 16, 31, 33, 35, 37, 98-104, including real-time adaptive scanning intervals, adaptive activation and deactivation, etc. However, the present invention is not limited to such an embodiment and other embodiments can be used to practice the invention.

In one embodiment, one or more of the security layers 122, including the first security layer 124 and the plurality of second advanced security layers 128-148 include a separate encryption key for each layer. However, the present invention is not limited to such an embodiment and other embodiments can be used to practice the invention.

Figure 8:
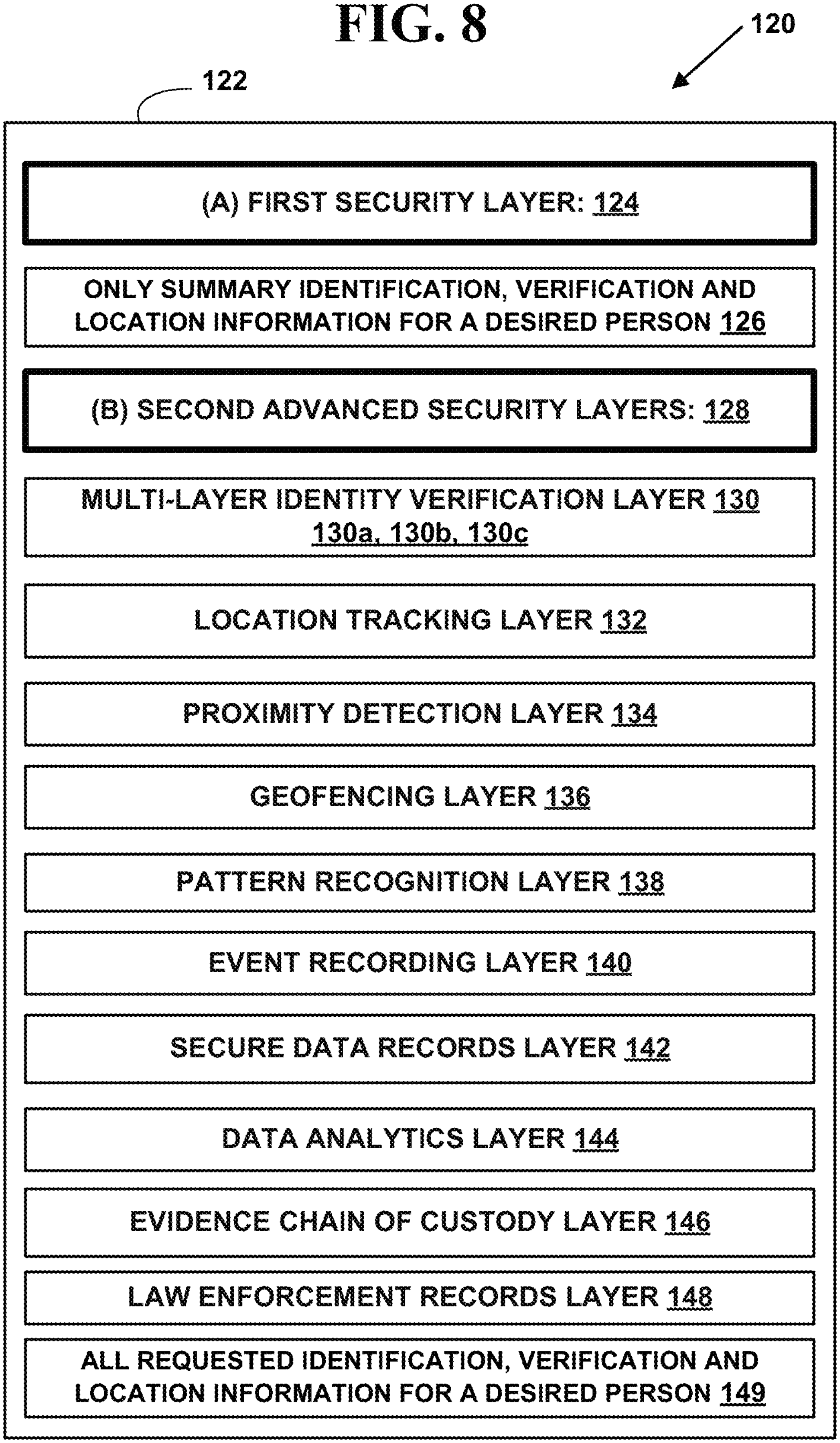
FIG. 8 is a block diagram illustrating a plural different security layers available on the server identification, verification and location application on the server network device.

FIG. 8 is a block diagram 120 illustrating a plurality of different security layers 122 available on the server identification, verification and location application 30*a* on the server network device 20, 22, 24, 26.

FIG. 8 illustrates, a first security layer 124 including authorization for providing only summary identification, verification and location information 43, 126 for a desired person 41; (b) a plurality of second advanced security layers 128 including: (1) multi-layer identity verification layer 130 comprising: facial recognition sublayer, eye scan sublayer, and identifying other unique biometric markers sublayer, to verify an identity of a desired person with a pre-determined level of precision, (2) location tracking layer 132 (3) proximity detection layer 134, (4) geofencing layer 136, (5) pattern recognition layer 138 (6) event recording layer 140, (7) secure data records layer 142, (8) data analytics layer 144, (9) evidence chain of custody layer 146, and (10) law enforcement records layer 148. Also illustrates all requested identification, verification and location information 45, 149 for the desired person 41. However, the present invention is not limited to such an embodiment and other embodiments with more, fewer and/or other security layers can be used to practice the invention.

In one embodiment, the summary identification, verification and location information 43, 126 for the desired person 41, includes but is not limited to, name, address, phone number, vehicle and license plate information, email identifiers, social media identifiers, tattoos, digital photograph, location information including real-time current physical location, arrest, conviction, outstanding arrest warrants, outstanding traffic tickets, Be-On-the-LOokout (BOLO) lists, most wanted lists (e.g., U.S. Marshall, FBI, Interpol, Scotland Yards, etc.) criminal complaint, criminal sentencing, criminal and/or civil judgments, (i.e., for civil legal actions, etc.) and/or other types of law enforcement and/or criminal and/or civil legal information for the desired person 41. However, the present invention is not limited to such an embodiment and other embodiments with more, fewer and/or other summary information items can be used to practice the invention.

In one embodiment, the first and second layers, include, but is not limited to a hierarchy comprising a tree, binary tree and/or an array data structure. An array is a data structure consisting of a collection of elements (e.g., values, variables, cloud services, etc.), of same memory size, each identified by at least one array index or key. An array is stored such that a position of each element can be computed from its index tuple by a mathematical formula. However, the present invention is not limited to such an embodiment and other embodiments with more, fewer and/or other security layer data structures can be used to practice the invention.

Returning to FIG. 7C at Step 114, in one embodiment, the request message 13*r*, 15*r* is securely received using one or more of the encryption and/or security methods described herein. However, the present invention is not limited to such an embodiment and other encryption and/or security methods can be used to practice the invention.

The multi-layer identity verification layer 130, includes, but is not limited to, a facial recognition sublayer, eye scan sublayer, and identifying other unique biometric marker sublayer, to verify an identity of a desired person 41 with a pre-determined level of precision (e.g., 80%, 90%, 100%, etc. level of certainty, etc.). However, the present invention is not limited to such embodiments and more, fewer and other sublayers can be used to practice the invention.

The facial recognition sublayer 130*a*, includes, but is not limited to, technology capable of matching a human face from a digital image or a video frame against a database of faces to confirm an individual's identity. Facial recognition algorithms can be categorized into two main types: feature-based methods and holistic methods. Feature-based facial recognition methods use facial attributes, like jawline, cheek apples, eye sockets, eye focus, mouth shape, lips shape, etc. Using these facial data points, it calculates relative distances between these facial features to build faceprints and uniquely identify individuals. In one embodiment, facial recognition is conducted in real-time using live scanning through front-facing cameras on network devices 12, 14, 16, 20, 22, 24, 26, 31, 33, 35, 37, 98-104. In another embodiment, the feature-based facial recognition is not conducted using live scanning. Holistic face recognition utilizes global information from a large number of different faces to perform face recognition. The global information from faces is fundamentally represented by a small number of features, which are directly derived from pixel information of face images. However, the present invention is not limited to such embodiments and other facial recognition methods can be used to practice the invention.

The eye scan sublayer 130*b*, includes, but are not limited to, retinal scan and iris scans. A retinal scan is a biometric technique that uses unique patterns on a person's 41 retina blood vessels. An iris scan is an eye vein verification that uses scleral veins in the eye of the person 41. However, the present invention is not limited to such embodiments and other eye scan methods can be used to practice the invention.

The identifying other unique biometric marker sublayer 130*c*, includes, but are not limited to, collecting, finger prints, DeoxyriboNucleic Acid (DNA), eye color, hear color, tattoos, gait, voice, height, weight, and/or other unique biometric makers. However, the present invention is not limited to these unique biometric markers and more, fewer and/or other biometric markers can be used to practice the invention.

The location tracking layer 132, includes, but is not limited to, context-aware and location tracking services, including GPS or Wi-Fi-based geofencing.

The Global Positioning System (GPS), includes, but is not limited to, GPS data (e.g., time, longitude, latitude, elevation, etc.) about a physical position, movement and time for an object such as the desired person 41, a vehicle 37 the desired person 41 is driving, etc. via GPS satellites. GPS is a space-based radio-navigation system that uses satellites, ground stations, and receivers to calculate an exact physical location of an object such as the desired person 41, a vehicle 37 the desired person 41 is driving, etc. However, the present invention is not limited to such an embodiment and other location tracking components be used to practice the invention.

The server IVL application 30*a* on the server network device 20, 22, 24, 26 provides via the location tracking layer 132 provides: (1) Location Services: The server IVL application 30*a* on the server network device 20, 22, 24, 26 uses tools like GPS or Wi-Fi to determine where the desired person 41 is. Boundaries and/or zones are set, including specific streets, buildings and/or rooms; (2) Activating Features by Location: When a desired person 41 enters set boundaries, the server IVL application 30*a* on the server network device 20, 22, 24, 26 automatically turns on specific advanced security features (e.g., 130, 134, 138, etc.)

For example, if someone is in a secure area, the server IVL application 30*a* on the server network device 20, 22, 24, 26 activates extra security checks, like the facial recognition sublayer, etc.; and (3) Responding to Events or Security Needs: The server IVL application 30*a* on the server network device 20, 22, 24, 26 adapts to different security situations based on location of the desired person 41. In an event space, it activates guest check-in features with the multi-layer identification layer 130, the location tracking layer 132 and/or the geofencing layer 136, while in high-security areas, it activates the multi-layer identification layer 130, the location tracking layer 132, the geofencing layer 136 and/or the pattern recognition layer 138, etc.

The location tracking layer 132 also helps define and create geographic boundaries where the server IVL application 30*a* on the server network device 20, 22, 24, 26 activates other advanced security layers, making the system responsive to a desired person's 41 physical location, on a street, on public transportation (e.g., via card swiping for fee payment cards, etc.), in a vehicle (e.g., via electronic toll payment pass, etc.), in restaurants, in event spaces, such as concerts, sports, etc. in secure and un-secure spots in a building, etc.

The proximity detection layer 134, includes but is not limited to, detecting proximity of a desired person 41 to other people 41' or other network devices 12, 14, 16, 20, 22, 24, 26, 31, 33, 35, 37, 98-104 within a pre-determined range of the desired person 41 and any network devices 12, 14, 16, 20, 22, 24, 26, 31, 33, 35, 37, 98-104 being used by the desired person 41. The proximity detection layer 134 on the server IVL application 30*a* on the server network device 20, 22, 24, 26 determines with RFID, BLUETOOTH, infrared ultra sound, and/or Wi-Fi signals, if the desired person 41 is within a pre-determined distance (e.g., within 3-5 feet) of other people 41' so other security layers can be activated (e.g., 130, 132, 138, 140, etc.). For example, when teams of people including the desired person 41 are transporting items (e.g., art, currency, jewels, weapons, guns, etc.) the proximity detection layer 134 is activated.

Ultra sound, includes but is not limited to, technology that uses high-energy sound waves to determine characteristics of a person.

For example, sending out RFID, BLUETOOTH, infrared ultra sound, and/or Wi-Fi signals and when the signals are absorbed by the human body of the desired person, determining a location of that person.

The proximity detection layer 134 on the server IVL application 30*a* on the server network device 20, 22, 24, 26 detects when people or network devices 12, 14, 16, 20, 22, 24, 26, 31, 33, 35, 37, 98-104 are close enough to start an interaction with the desired person 41 including for teams of people transporting valuable items. The proximately detection layer 134 provides: (1) Proximity Detection: When authorized team members or their network devices are within a predetermined range (e.g., three to five feet) of the desired person 41, the proximity detection layer 134 recognizes they are close enough to interact. This recognition also includes using the multi-layer identity layer verification layer 130 and one or more of its sublayers; (2) Identification and Verification: Once team members are within range, the proximity detection layer 134 quickly identifies and verifies each person's identity to ensure they're authorized to handle or transport the valuable items; (3) Enhanced Security for Transport: For teams moving valuable items, this proximity detection ensures that only the right people interacting with the desired person 41 are involved, adding an additional layer of security. If an unauthorized person tries to get close to the desired person, the proximity detection layer 134 on the server IVL application 30*a* on the server network device 20, 22, 24, 26 takes preventive actions such as alerting the the team and/or temporarily locking down access to a vehicle, a room in a building, etc.

In one embodiment, when the proximity detection layer 134 on the server IVL application 30*a* on the server network device 20, 22, 24, 26 detects a person or network device nearby the desired person 41, it checks the person's identity with a biometric scan. For example: (1) Proximity Detection: The proximity detection layer 134 on the server IVL application 30*a* on the server network device 20, 22, 24, 26 first confirms that a person 41 or network device is within the pre-determined distance; (2) Biometric Verification: Once the proximity detection layer 134 on the server IVL application 30*a* on the server network device 20, 22, 24, 26 determines other people and/or other network devices are nearby the desired person 14, it automatically triggers a more secure identity check with other advanced security layers (e.g., 130, 132, 138, 140, etc.). However, the present invention is not limited to such an embodiment and other embodiments can be used to practice the invention.

The geofencing layer 136, includes but is not limited to, creating a virtual perimeter for a real-world geographic area for a desired person 41. A geofence is dynamically generated (e.g., as in a radius around a point location) or statically matched to a predefined set of boundaries (e.g., such as school zones, neighborhood boundaries, etc.). The use of a geofence is called geofencing, and one example of use involves a location-aware network device the server IVL application 30*a* on the server network device 20, 22, 24, 26 of a location-based service (LBS) (e.g., GPS, etc.) for the desired person 41 entering or exiting a geofence. Geofencing is based on the observation that desired persons 41 move from one place to another and then stay at that place for a while. This method combines awareness of the desired persons 41 current location with awareness of the user's proximity to locations that may be of interest. This activity triggers an alert as well as messaging to the geofence operator which includes, but is not limited to, the server IVL application 30*a* on the server network device 20, 22, 24, 26. This alert information, includes a physical location of the network device 12, 14, 16, 20, 22, 24, 26, 31, 33, 35, 37, 98-104, and can also be sent to a mobile telephone 14, an email account, etc.

The pattern recognition layer 138, includes but is not limited to, recognizing patterns of current actions or previously recorded habits of the desired person 41, and includes a method and process of continuously collecting and storing data and identifying patterns in the data and assigning them to a class or category. Patten recognition is used to analyze data in many forms, including images, text, social media, voice, video, biometrics, etc. Pattern data is continuously by the collected by the server IVL application 30*a* on the server network device 20, 22, 24, 26 and stored in the databases 20', 22', 24', 26' and/or in a blockchain 174 (FIG. 13) on a plurality of persons and/or the desired person 41, to detect patterns, track high-frequency interactions, and identify unusual and/or potentially suspicious behavior.

The server IVL application 30*a* on the server network device 20, 22, 24, 26 continuously collects pattern data and analyzes patterns of habits, behaviors, actions and interactions between people. Common patterns, habits, actions or interactions that happen frequently are detected. For example, the desired person 41 may buy a cup of coffee every morning at 7:30 am at a same coffee shop. Then anything unusual or potentially suspicious, like the desired person 41 going to a meeting with another person at 7:30 am is detected.

Pattern recognition is performed by both AI and non-AI methods described herein. There are three main types of pattern recognition server IVL application 30*a* on the server network device 20, 22, 24, 26, dependent on a desired mechanism used for classifying the pattern data input. These three types are: statistical, structural and/or syntactic, and neural network pattern matching.

Statistical pattern recognition (SPR) is a field of data analysis that uses statistics (e.g., mean, medium, mode, etc.) mathematical models and algorithms to identify patterns from large datasets. It can be used for various tasks, such as handwriting or speech recognition, classification of objects in images, and natural language processing.

Structural and or syntactic pattern recognition is a method used to check a value (e.g., percentage value, certainty value, etc.) against a pattern (e.g. a sequence of words, etc.), extracting parts of the value if the pattern matches.

Neural pattern recognition is a technique that uses AI methods described herein and artificial neural networks (ANNs) to recognize patterns in data. ANNs are computational systems that mimic the human brain's neural network architecture, allowing them to learn to recognize patterns in a variety of data types.

However, the present invention is not limited to these embodiments and other types of pattern recognition can be used to practice the invention.

The event recording layer 140, includes but is not limited to, capturing and storing event data points in an event log on the server IVL application 30*a* on the server network device 20, 22, 24, 26 including a timestamp, location, verified identity, and any associated network device 12, 14, 16, 31, 33, 35, 37, 98-104 identifiers (e.g., network identifier, smart phone identifier, etc.) for a desired person 41. This event log provides a complete record of interactions, offering transparency and auditability. In one embodiment the event data points are stored in a blockchain 174 (FIG. 13).

The server IVL application 30*a* on the server network device 20, 22, 24, 26 detects and logs usual and unusual events. For example, every time an event occurs, like the desired person 41 entering a secure area, the desire person 41, swiping a key card at a regular and/or unusual time on a subway, etc. the server IVL application 30*a* on the server network device 20, 22, 24, 26 detects the event and creates an event log entry in the database 20', 22' 24', 26' and/or a blockchain 174 (FIG. 13).

The secure data records layer 142, includes, but is not limited to detecting and recording important details in a secure record for each desired event and action, ensuring secure, reliable records that can be reviewed anytime. The server IVL application 30*a* on the server network device 20, 22, 24, 26 provides secure data records collection and logging and feeds them directly into the analytics layer 144, allowing the server IVL application 30*a* on the server network device 20, 22, 24, 26 to build a historical record that directly supports behavior tracking and pattern identification as well The event logs over time create a large set of data and are used by AI and non-AI methods described herein to show behavior and trends of the desired person 41 and/or other persons. However, the present invention is not limited to these embodiments and other embodiments may be used to practice the invention.

The data analytics layer 144, includes, but is not limited to, providing Artificial Intelligence (AI) methods 30*c* and non-AI analytic methods for analyzing any information collected for the desired person 41, and providing an electronic data analytics notebook application to organize and analyze all the data the server IVL application 30*a* on the server network device 20, 22, 24, 26 has collected. Insightful data processing, feedback and system optimization is provided in this layer. The server IVL application 30*a* on the server network device 20, 22, 24, 26 provides automated insights from the data analytics layer providing broader data analysis operations, leading to refined authorization policies, improved security protocols, and/or improved and/or customized user permissions. The collected data is also used by the data analytics layer to detect patterns, track high-frequency interactions, and/or identify unusual and/or potentially suspicious behavior of the desired person 41 and/or other persons. However, the present invention is not limited to these embodiments and other embodiments may be used to practice the invention.

The electronic chain of custody evidence layer 146, but is not limited to, creating and recording a chain of custody record of a chronological handling of electronic evidence (e.g., voice, video, electronic text, etc.), from its collection to its presentation in a court of law for the desired person 41. The server IVL application 30*a* on the server network device 20, 22, 24, 26 securely collects, stores logs and documents, when and where the evidence was collected, how it was collected, and how it was stored, who handled the evidence and how it transferred via the chain of custody layer. The chain of custody evidence layer provides: (1) Evidence validity: helping prove that evidence is valid and authentic, and that it can be directly linked to a defendant in a criminal and/or civil litigation; (2) Evidence integrity: helping maintain the integrity of the evidence, and protects it from contamination or tampering; and (3) Investigation success: helping achieve success of a criminal investigation. However, the present invention is not limited to these embodiments and other embodiments may be used to practice the invention.

The law enforcement records layer 148, includes, but is not limited to, arrest, conviction, warrant and/or other criminal and/or civil records for the desired person 41. This law enforcement records layer includes but is not limited to, providing real-time access via the server IVL application 30*a* on the server network device 20, 22, 24, 26, to municipal, state, federal and/or international, law enforcement, legal including criminal and/or civil databases, court system docketing and documents for pending and/or concluded cases and/or other databases for a user 39. The server IVL application 30*a* on the server network device 20, 22, 24, 26 provides this real-time access to allow the user 39 to obtain any arrest, conviction, outstanding arrest warrants, outstanding traffic tickets, vehicle and license plate information, be on the lookout (bolo) lists, most wanted lists (e.g., U.S. Marshall, FBI, Interpol, Scotland Yards, etc.) criminal complaint, judgment, (i.e., for civil legal actions, etc.) and/or other types of law enforcement and/or criminal and/or civil legal information for the desired person 41. However, the present invention is not limited to these embodiments and other embodiments may be used to practice the invention.

Returning to FIG. 7C at Step 116, determining in real-time on the server IVL application 30*a* on the server network device 20, 22, 24, 26 via the one or more databases 20', 22', 24' 26 and/or a blockchain 174 (FIG. 13), one or more permissions and one or more security layers available for the user 39 of the second network device 12, 14, 16, 20, 22, 24, 26, 31, 33, 35, 37, 98-104 to access and use the requested identification, verification or location services for the desired person 41.

In one embodiment, the server IVL application 30*a* on the server network device 20, 22, 24, 26 determines at Step 116, the one or more permissions and one or more security layers available for the user 39 from one or more cloud storage objects 82 in one more cloud storage databases 20', 22', 24', 26' and/or a blockchain 174 (FIG. 13) on a cloud communications network 18. However, the present invention is not limited to such an embodiment and other embodiments without cloud services can be used to practice the invention.

In one embodiment, the server IVL application 30*a* on the server network device 20, 22, 24, 26 uses a user profile previously created for the user 39. However, the present invention is not limited to such an embodiment and other embodiments can be used to practice the invention.

At Step 118, sending securely one or more response messages 13*rs*, 15*rs* in real-time for the desired person 41 from server IVL application 30*a* on the server network device 20, 22, 24, 26 for the desired person 41, to the second IVL application 30 on the second network device 12, 14, 16, 20, 22, 24, 26, 31, 33, 35, 37, 98-104 for the user 39 via the communications network 18, 18', including all requested identification, verification and location services information 45, 149 for the desired person 41 available to the user 39 of the second network device 12, 14, 16, 20, 22, 24, 26, 31, 33, 35, 37, 98-104, based on the determined one more permissions and the determined one or more security layers available for the user 39 of the second network device 12, 14, 16, 20, 22, 24, 26, 31, 33, 35, 37, 98-104, to access and use in real-time the requested identification, verification or location services available to the user 39 of the second network device 12, 14, 16, 20, 22, 24, 26, 31, 33, 35, 37, 98-104 for the desired person 41.

In one embodiment, the one or more response messages 13*rs*, 15*rs* are sent securely using one or more of the encryption and/or security methods described herein. However, the present invention is not limited to such an embodiment and other encryption and/or security methods can be used to practice the invention.

Figure 9A:
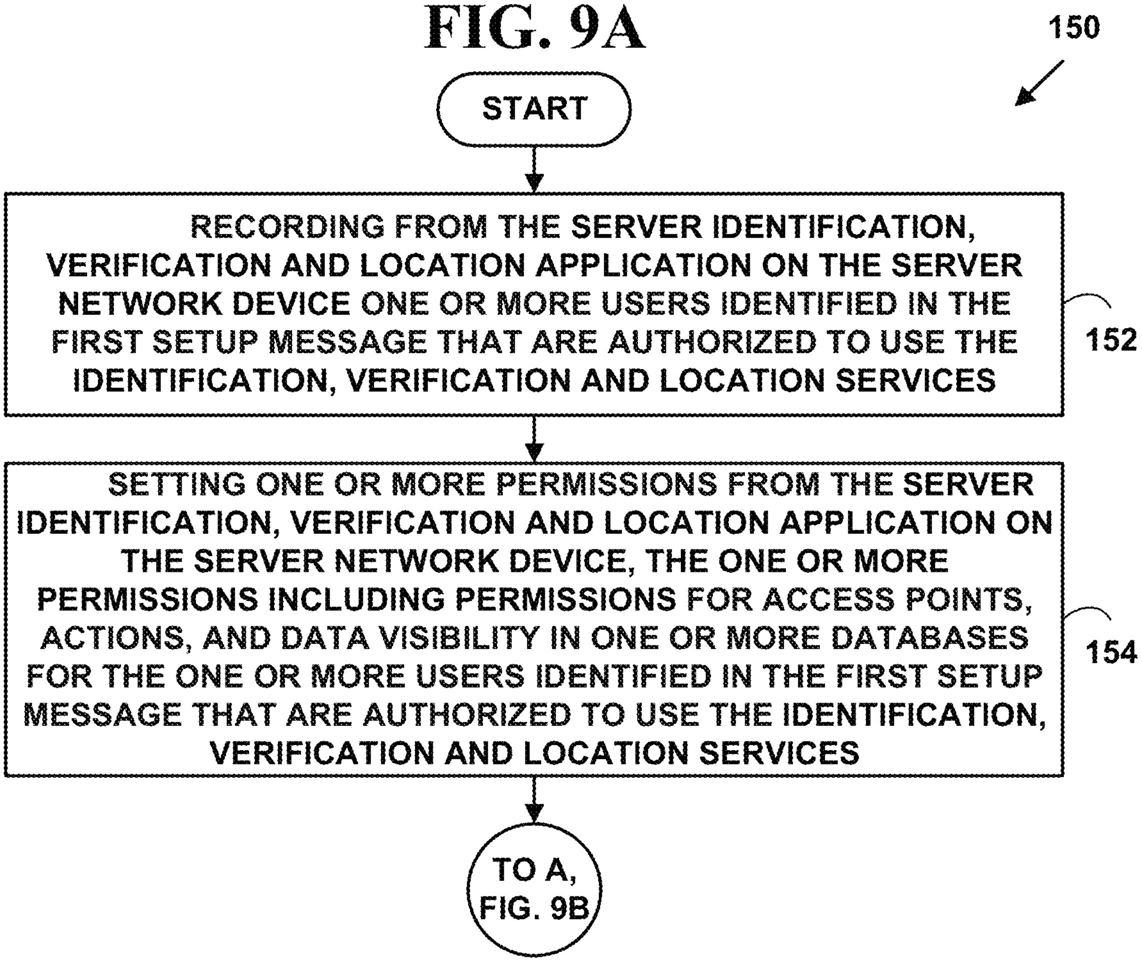
FIGS. 9A and 9B are a flow diagram illustrating a method for providing identification, verification and location services.
Figure 9B:
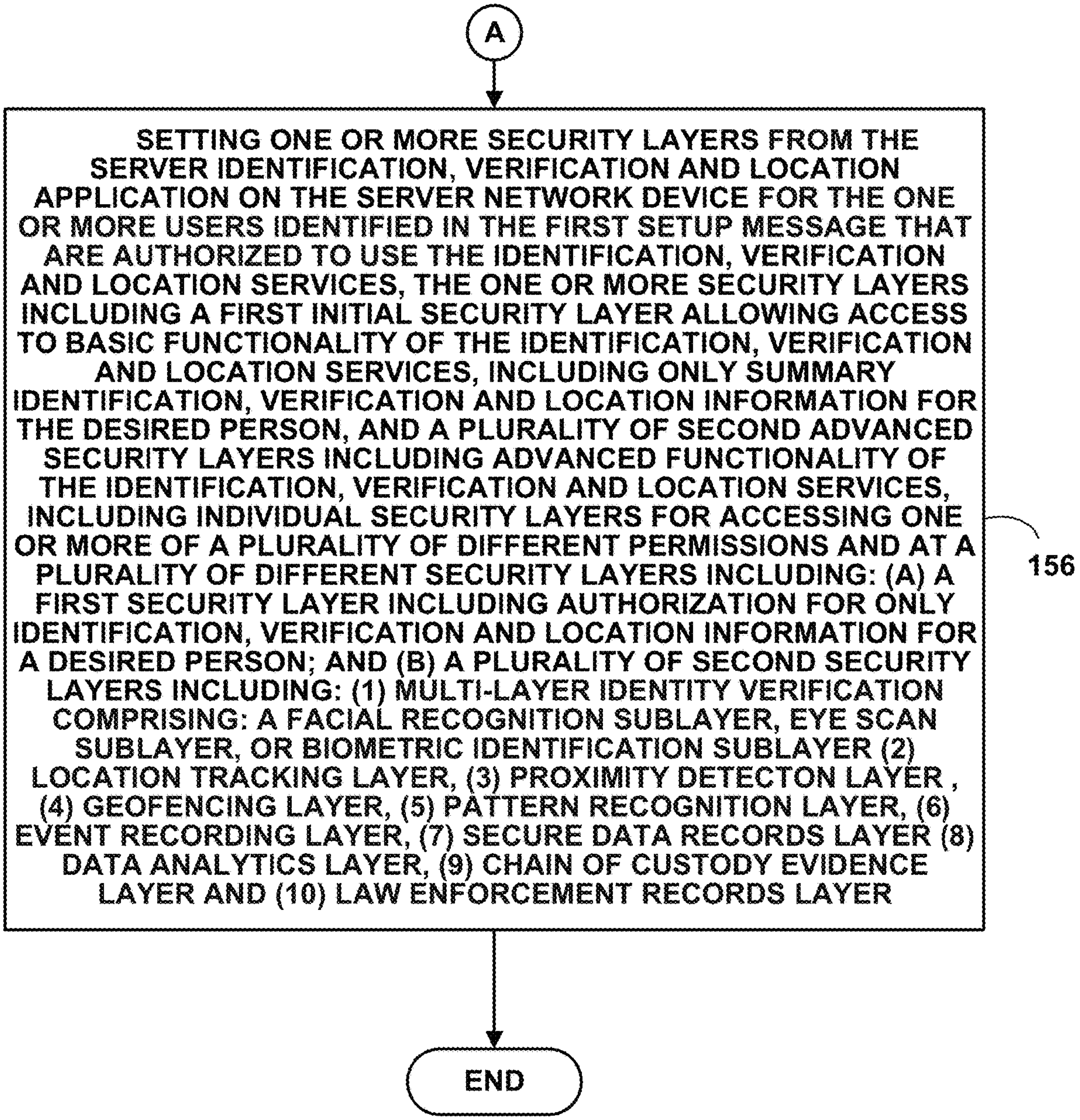

FIGS. 9A and 9B are a flow diagram illustrating a Method 150 for providing identification, verification and location services.

In FIG. 9A at Step 152, recording from the server identification, verification and location application on the server network device one or more users identified in the first setup message that are authorized to use the identification, verification and location services; At Step 154, setting one or more permissions from the server identification, verification and location application on the server network device, the one or more permissions including permissions for access points, actions, and data visibility in one or more databases for the one or more users identified in the first setup message that are authorized to use the identification, verification and location services; In FIG. 9B, at Step 156, setting one or more security layers from the server identification, verification and location application on the server network device for the one or more users identified in the first setup message that are authorized to use the identification, verification and location services, the one or more security layers including a first initial security layer allowing access to basic functionality of the identification, verification and location services, including only summary identification, verification and location information for the desired person, and a plurality of second advanced security layers including advanced functionality of the identification, verification and location services, including individual security layers for accessing one or more of a plurality of different permissions and at a plurality of different security layers including: (a) a first security layer including authorization for only summary identification, verification and location information for a desired person; (b) a plurality of second security layers including: (1) multi-layer identity verification layer comprising: a facial recognition sublayer, eye scan sublayer, or biometric markers identifier sublayer (2) location tracking layer, (3) proximity layer, (4) geofencing of the desired person, (5) pattern recognition layer, (6) event recording layer, (7) secure data records layer, (8) data analytics layer, (9) electronic chain of custody layer, and (10) law enforcement records layer.

In FIG. 9B at Step 156, setting one or more security layers 122-148 from the server identification, verification and location application 30*a* on the server network device 20, 22, 24, 26 for the one or more users 39 identified in the first setup message 13*s*, 15*s*, that are authorized to use the identification, verification and location services, the one or more security layers 122-124 including a first initial security layer 124 allowing access to basic functionality of the identification, verification and location services, including only summary identification, verification and location information 43, 126 for the desired person, and a plurality of second advanced security layers 128-148 including advanced functionality of the identification, verification and location services, including individual security layers for accessing one or more of a plurality of different permissions and at a plurality of different security layers including: (a) a first security layer 124 including authorization for only summary identification, verification and location information 126 for a desired person 41; (b) a plurality of second security layers plurality of different security layers 122-148 including: (a) a first security layer 124 including authorization for providing only summary identification, verification and location information 43, 126 for a desired person; (b) a plurality of second advanced security layers 128-148 including: (1) multi-layer identity verification layer 130 comprising: a facial recognition sublayer 130*a*, eye scan sublayer 130*b*, and biometric markers identification sublayer 130*c*, (2) location tracking layer 132, (3) proximity detection layer 134 (4) geofencing layer 136, (5) pattern recognition layer 138, (6) event recording layer 140, (7) secure data records layer 142, (8) data analytics layer 144, (9) electronic chain of custody layer 146, and (10) law enforcement records layer 148.

The present invention is illustrated with an exemplary embodiment. However, the present invention is not limited to such an embodiment and other embodiments can be used to practice the invention.

In such an exemplary embodiment in FIG. 9A at Step 160, recording from the server identification, verification and location application 30*a* on the server network device 20, 22, 24, 26, one or more users 39 identified in the first setup message 13*s*, 15*s* that are authorized to use the identification, verification and location services.

At Step 154, setting one or more permissions from the server identification, verification and location application 30*a* on the server network device 20, 22, 24 26, the one or more permissions including permissions for access points, actions, and data visibility in one or more databases 20', 22', 24', 26' and/or a blockchain 174 (FIG. 13) for the one or more users 39 identified in the first setup message 13*s*, 15*s* that are authorized to use the identification, verification and location services.

Figure 10:
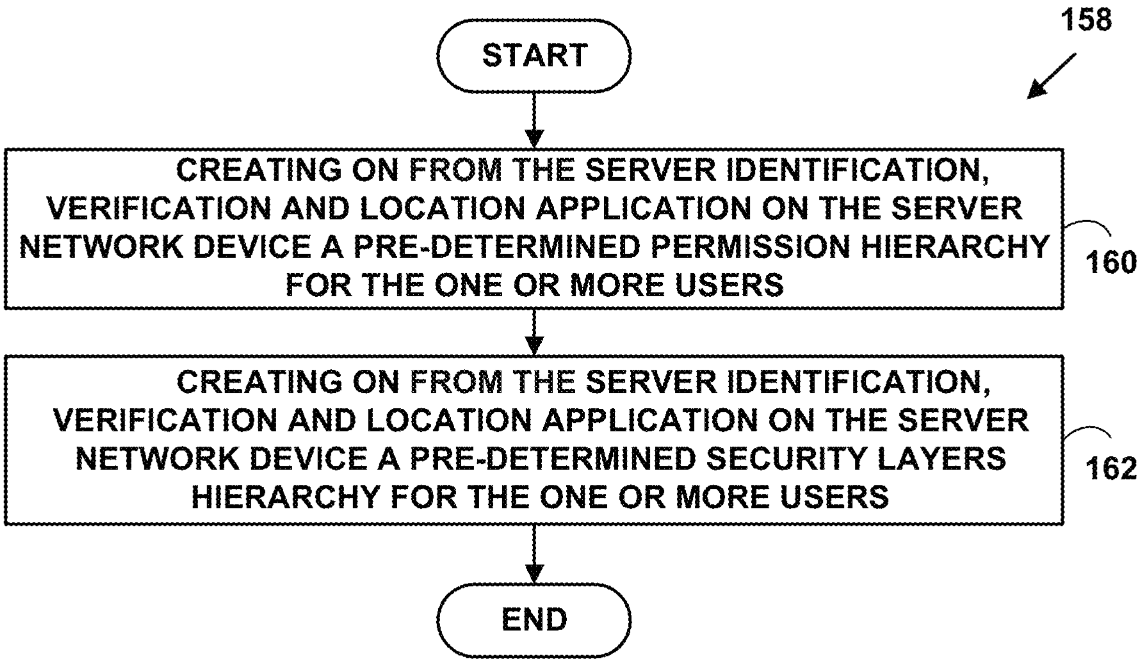
FIG. 10 is a flow diagram illustrating a method for providing identification, verification and location services.

FIG. 10 is a flow diagram illustrating a Method 158 for providing identification, verification and location services.

In FIG. 10, at Step 160 creating on from the server identification, verification and location application on the server network device a pre-determined permission hierarchy for the one or more users; and at Step 162 creating on from the server identification, verification and location application on the server network device a pre-determined security layers hierarchy for the one or more users.

The present invention is illustrated with an exemplary embodiment. However, the present invention is not limited to such an embodiment and other embodiments can be used to practice the invention.

In such an exemplary embodiment in FIG. 10 at Step 160, creating on from the server identification, verification and location application 30*a* on the server network device 20, 22, 24, 26 a pre-determined permission hierarchy for the one or more users 39.

At Step 162, creating on from the server identification, verification and location application 30*a* on the server network device 20, 22, 24, 26 a pre-determined security layers hierarchy for the one or more users 39.

In one embodiment, the pre-determined permission hierarchy and the pre-determined security layers hierarchy, include, but is not limited to a hierarchy comprising a tree, binary tree and/or an array data structure. An array is a data structure consisting of a collection of elements (e.g., values, variables, cloud services, etc.), of same memory size, each identified by at least one array index or key. An array is stored such that a position of each element can be computed from its index tuple by a mathematical formula. However, the present invention is not limited to such an embodiment and other embodiments with more, fewer and/or other security layer data structures can be used to practice the invention.

Figure 11:
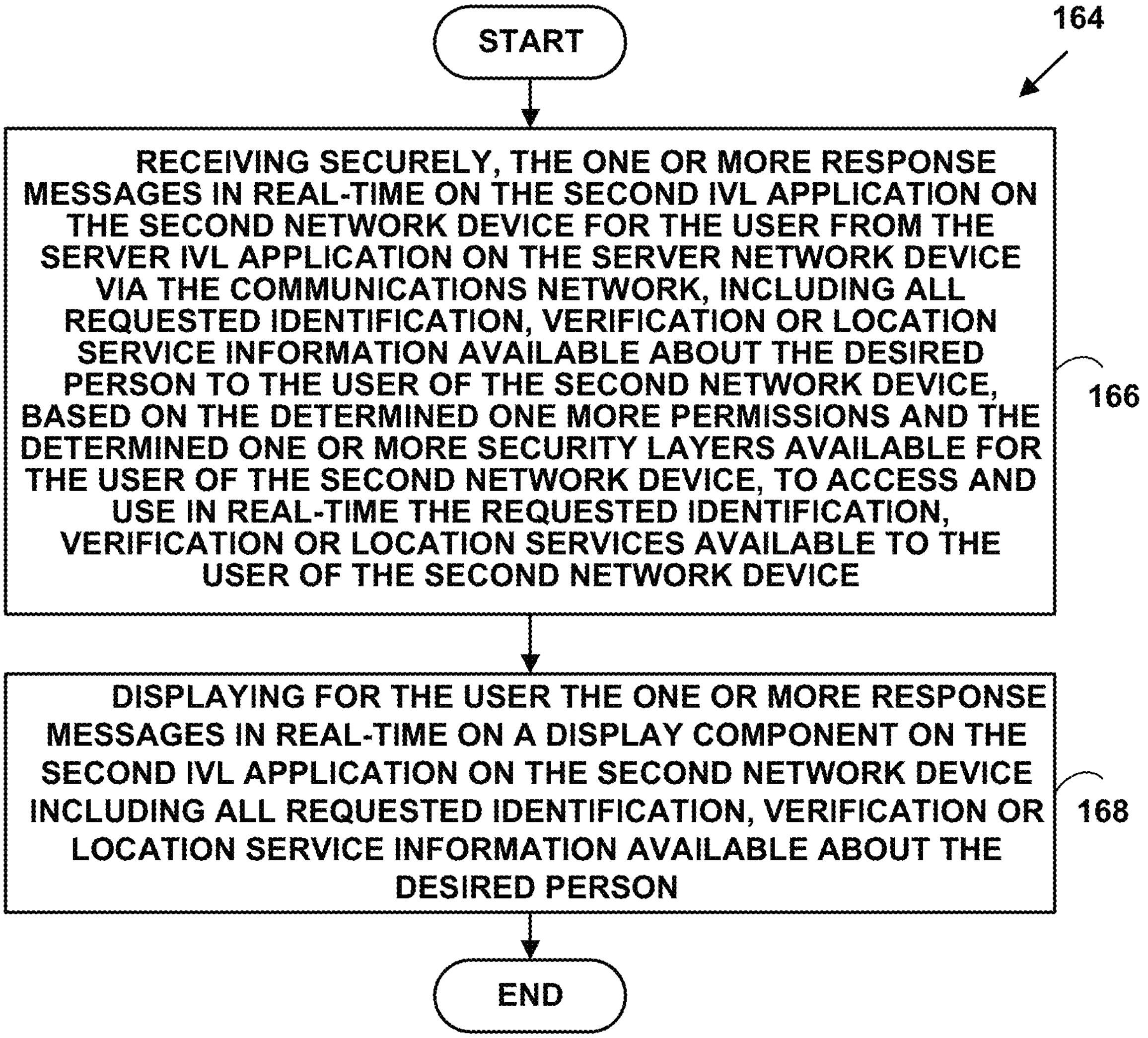
FIG. 11 is a flow diagram illustrating a method for providing identification, verification and location services for a desired peron.

FIG. 11 is a flow diagram illustrating a Method 164 for providing identification, verification and location services.

In FIG. 11 at Step 166, receiving securely, the one or more response messages in real-time on the second IVL application on the second network device for the user from the server IVL application on the server network device via the communications network, including all requested identification, verification or location service information available about the desired person to the user of the second network device, based on the determined one more permissions and the determined one or more security layers available for the user of the second network device, to access and use in real-time the requested identification, verification or location services available to the user of the second network device; and at Step 168, displaying for the user the one or more response messages in real-time on a display component on the second IVL application on the second network device including all requested identification, verification or location service information available about the desired person.

The present invention is illustrated with an exemplary embodiment. However, the present invention is not limited to such an embodiment and other embodiments can be used to practice the invention.

In such an exemplary embodiment in FIG. 11 at Step 166, receiving securely, the one or more response messages 13*rs*, 15*rs* in real-time on the second IVL application 30 on the second network device 12, 14, 16, 20, 22, 24, 26, 31, 33, 35, 37, 98-104 for the user from the server IVL application 30*a* on the server network device 20, 22, 24, 26 via the communications network, 18, 18' including all requested identification, verification or location service information 45, 149 available about the desired person 41 to the user 39 of the second network device 12, 14, 16, 20, 22, 24, 26, 31, 33, 35, 37, 98-104, based on the determined one more permissions and the determined one or more security layers 124-148 available for the user of the second network device 12, 14, 16, 20, 22, 24, 26, 31, 33, 35, 37, 98-104, to access and use in real-time the requested identification, verification or location services available to the user 39 of the second network device 12, 14, 16, 20, 22, 24, 26, 31, 33, 35, 37, 98-104.

At Step 168, displaying for the user the one or more response messages 13*rs*, 15*rs* in real-time on a display component 24 via the second IVL application 30 on the second network device 12, 14, 16, 20, 22, 24, 26, 31, 33, 35, 37, 98-104 including all requested identification, verification or location service information 45, 149 available about the desired person 41.

Figure 12:
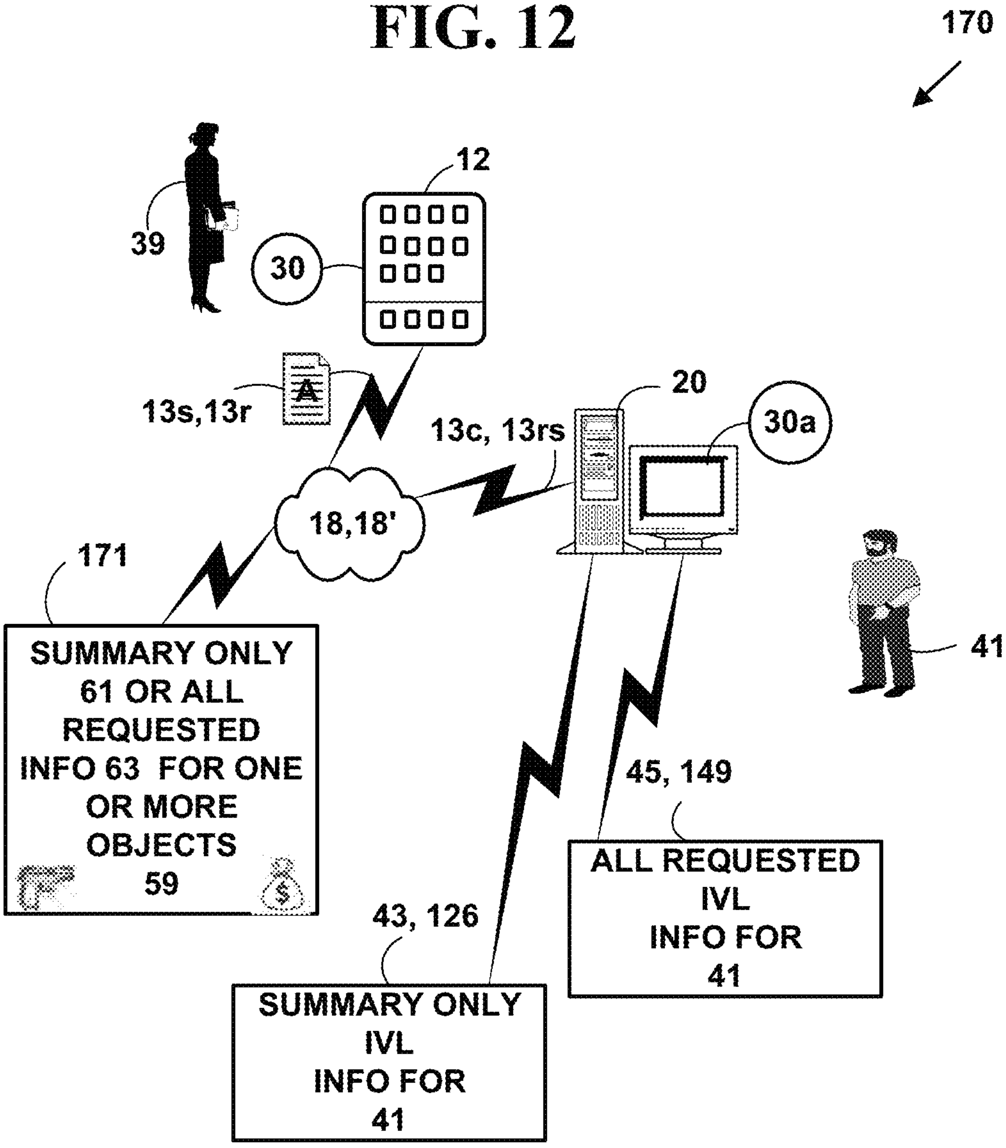
FIG. 12 is a block diagram illustrating a data flow for providing identification, verification and location services.

FIG. 12 is a block diagram illustrating a data flow 170 for providing identification, verification and location services.

In FIG. 12 a selected user 39 (e.g., law enforcement officer, etc.) is only authorized and/or only requests IVL summary information 43, 126 for a desired person 41 (e.g., a criminal offender, etc.) and/or is authorized and receives all requested IVL information 45, 149 for the desired person. However, the present invention is not limited to such an embodiment and other embodiments can be used to practice the invention.

In one embodiment, Methods 106, 150, 154, 158, 164 further include creating IVL information 171 including authorized information 61 and/or summary IVL information collected 63 for one or more objects 59 (e.g., ticket, valuable object, dangerous object, financial object, e-commerce object, food object, machine object, etc.) instead of a desired person 41. However, the present invention is not limited to such an embodiment and other embodiments can be used to practice the invention.

FIG. 12 also illustrates IVL information 171 including authorized information 61 and summary IVL information collected 63 for the one or more objects 59 (e.g., ticket, valuable object, dangerous object, financial object, e-commerce object, food object, machine object, etc.) However, the present invention is not limited to such an embodiment and other embodiments can be used to practice the invention.

Blockchains

A "blockchain" is a public ledger of all transactions that have ever been executed. It is constantly growing as completed blocks are added to it with a new set of recordings. The blocks are added to the blockchain in a linear, chronological order. Blockchains are used on P2P networks and other networks such as cloud communications networks. Each P2P node gets a copy of the blockchain, which gets downloaded automatically upon joining P2P. The blockchain has complete information about the block owners and block content right from the first block to the most recently completed block.

A "blockchain is also a digital ledger that records every transaction that has ever occurred. Blockchains and transactions on blockchains are typically protected by cryptography. More importantly, though, the blockchain does not reside in a single server, but across a distributed network of servers and computer such as a cloud computing network and a P2P computing network. Accordingly, whenever new transactions occur, a new blockchain is authenticated across this distributed network, then the transaction is included as a new "block" on the "chain." A blockchain implementation comprises of two kinds of records: transactions and blocks.

"Transactions" are the content to be stored in the blockchain (e.g., financial transactions, etc.). Transactions are created by participants using the system. In the case of cryptocurrencies, a transaction is created any time a cryptocurrency owner sends cryptocurrency to someone.

A transaction is also a transfer of value between digital wallets that gets included in the blockchain. Digital wallets, including the cryptocurrency BITCOIN wallets, store a secret piece of data called a "private key" or, which is used to digitally sign transactions, providing a mathematical proof that the digital signature has actually come from the owner of the digital wallet.

System users create transactions that are passed from node to node on a best-effort basis. The system implementing the blockchain defines a valid transaction. In cryptocurrency applications, a valid transaction must be digitally signed, spend one or more unspent outputs of previous transactions, and the sum of transaction outputs must not exceed the sum of inputs.

Blocks record and confirm when and in what sequence transactions enter and are logged in the blockchain. Blocks are created by users known as "miners" who use specialized software or equipment designed specifically to create blocks.

In a cryptocurrency system, miners are incentivized to create blocks to collect two types of rewards: a pre-defined per-block award, and fees offered within the transactions themselves, payable to any miner who successfully confirms the transaction.

Blockchains are decentralized and do not require a "central authority" or "middleman." Every node in a decentralized system has a copy of the blockchain. This avoids the need to have a centralized database managed by a trusted third party. Blockchain transactions are broadcast to a network using software applications. Network nodes can validate transactions, add them to their copy and then broadcast these additions to other nodes. To avoid the need for a trusted third party to timestamp transactions, decentralized blockchains use various timestamping schemes, such as proof-of-work.

The core advantages of the blockchain architecture include, but are not limited to those described in Table 5.

TABLE 5

| |
|---|
| The ability for independent nodes to converge on a consensus of the latest version of a large data set such, as a ledger, even when the nodes are run anonymously, have poor interconnectivity and have operators who are dishonest or malicious. |
| The ability for any well-connected node to determine, with reasonable certainty, whether a transaction does or does not exist in the data set. |
| The ability for any node that creates a transaction to, after a confirmation period, determine with a reasonable level of certainty whether the transaction is valid, able to take place and become final (i.e., that no conflicting transactions were confirmed into the blockchain elsewhere that would invalidate the transaction, such as the same currency units "double-spent" somewhere else). |
| A prohibitively high cost to attempt to rewrite or alter transaction history. |
| Automated conflict resolution that ensures that conflicting transactions (such as two or more attempts to spend the same balance in different places) never become part of the confirmed data set. |

A "digital wallet" is a software program where blockchains are stored. A digital wallet stores a private encryption key for every blockchain address that is saved in the digital wallet of the person who owns the balance. Digital wallets facilitate sending and receiving blockchains and gives ownership of the blockchain balance, if it includes financial information such as cryptocurrency (e.g., BITCOINS, etc.) to a user.

A digital wallet stored on a communications network, allows a user to use blockchains from anywhere, on any browser and/or any mobile network device and/or any smart network device and/or any wearable network device. Storing a digital wallet must be done carefully since it stores private encryption keys for the blockchains online.

FIG. 13 is a block diagram 172 illustrating an exemplary blockchain 174.

In FIG. 13, the blockchain 174 includes plural blocks 176, 178, 180 (only three of which are illustrated) which include one or more items, and plural transactions 182, 184 (only two of which are illustrated). Exemplary transaction 182 includes, for example, includes taking Owner-B's public key 186 for block 176 in blockchain 174, running it through a hash algorithm (e.g., SHA-256, etc.) and obtaining Owner-A's digital signature, Owner-B signs the block 176 with its private key and Owner-B's signature is verified on the next block 178, etc. Transaction 184 includes identical steps as was illustrated in transaction 182. However, the present invention is not limited to this embodiment and more, fewer or other exemplary blockchain transactions can be used to practice the invention.

In one embodiment, the summary identification, verification and location information 43, 126 for the desired person 41 and/or all requested identification, verification location services information 45, 149 for the desired person 41 are stored in blockchain blocks, 176, 178, 180, in a blockchain 174. However, the present invention is not limited to such an embodiment and other embodiments, with and/or without blockchains can be used to practice the invention.

Figure 14:
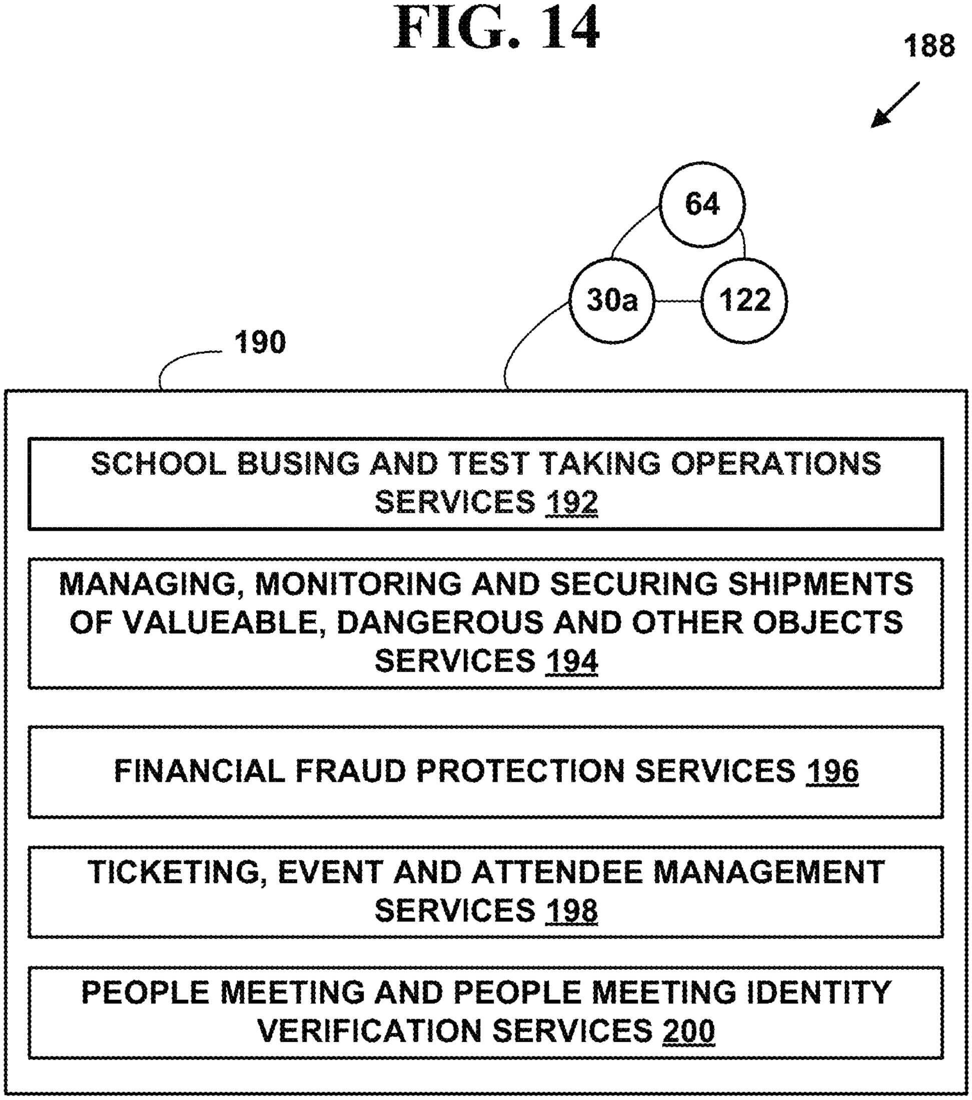
FIG. 14 is a block diagram illustrating plural different services available on the server identification, verification and location application on the server network device.

FIG. 14 is a block diagram 188 illustrating plural different services available on the server identification, verification and location application on the server network device.

FIG. 14 illustrates the server identification, verification and location application 30*a* on the server network device 20, 22, 24, 26, providing plural real-time services 190 for: (1) school, busing and testing operations 192; (2) identification, verification, tracking and location information for valuable and/or dangerous objects 59 and/or other types of objects; (3) financial fraud protection for merchants, financial institutions, law enforcement and consumers 196; (4) ticketing, event and attendee management 198; and (5) people meeting and people verification management services 200.

School, Busing and Test Taking Operation Services 192

The server identification, verification and location (IVL) application 30*a* on the service network device 20, 22, 24, 26 and/or the IVL application 30 on the target network device 12, 14, 16, 31, 33, 35, 37, 106-112 with the plurality of different security layers 122-148 provides real-time services 192 for school, bussing and test taking operations 192. The services 192 include cloud SaaS 64 services and non-cloud services.

The services 192 includes summary identification, verification and location information 43, 126 for a desired person 41 and/or all requested identification, verification and location services information 45, 149 for the desired person 41 including secure critical school and test-related processes, including child drop-offs and pickups, bus operations, and test-taking activities.

The IVL application 30*a*/30 uses as facial recognition, blockchain, real-time notifications, and data analytics to provide a comprehensive and a user-friendly platform for schools, parents, bus companies, and testing organizations. The server IVL application 30*a* ensures accountability, security, and efficiency for school, busing and test taking operations.

Some advantages of using the IVL application 30*a* with the plurality of different security layers 122-148 for school, busing and testing operations services 192 include, but are not limited to those described in Table 6.

TABLE 6

| |
|---|
| 1. School Operations: |
| Provides facial recognition and GPS tracking of students. |
| Manages secure student drop-offs and pickups at school, day care, after care, sports practice, music practice, drama practice, sports games, music and drama performances, etc. |
| Provides real-time notifications to parents, guardians, grandparents and other authorized individuals. |
| Tracks access points, timestamps, and authorized individuals. |
| 2. Bus Operations: |
| Provides facial recognition and GPS tracking for buses and students on buses. |
| Logs student pickups and drop-offs with identity verification. |
| Notifies parents of bus arrivals, departures, and completed drop-offs. |
| 3. Testing Operations: |
| Facilitates test registration, payment, and identity verification for students for every day academic testing, college and professional license testing. |
| Provides facial recognition and GPS tracking of test takers. |
| Allows proctors to securely manage test sessions, attendance, and accommodations. |
| Provides testing organizations (e.g., Advance Placement, (AP), ACT, SAT, LSAT, MCAT, insurance licensing, financial professional licensing, medical licensing, medical board certifications, dental licensing, law licensing, certified public accountant (CPA), general securities representative exams (GSRE) (e.g., Series 7, etc.) real-estate licensing, etc.) with comprehensive analytics and reporting. |
| 4. Parent and Guest Access: |
| Provides facial recognition and GPS tracking. |
| Parents manage authorized pickup persons, receive notifications, and access records. |
| Guests use electronic links (e.g., SMS, DM, email, etc.) for secure, temporary or permanent pickup authorizations. |
| 5. Continuing Education: |
| Facilitates registration, payment, and identity verification for individuals taking professional continuing education classes (e.g., law, medical, insurance, accounting, etc.). |

Managing, Monitoring, Tracking and Securing Shipments of Valuable or Dangerous Object Services 194

The server identification, verification and location (IVL) application 30*a* on the service network device 20, 22, 24, 26 and/or the IVL application 30 on the target network device 12, 14, 16, 31, 33, 35, 37, 106-112 with the plurality of different security layers 122-148 provides real-time services 194 for, summary identification, verification, tracking and location information for valuable and/or dangerous objects and other types of objects such as food shipments, machinery, etc. The services 194 include cloud SaaS 64 services and non-cloud services.

The server identification, verification and location (IVL) application 30*a* as AI 30*c*, blockchain 174, and IoT 33 technologies for high-value objects (e.g., physical currencies and cryptocurrencies, stock certificates, bond certificates, gems, such diamonds, rubies, etc., metals such as gold, silver, platinum, etc.) and sensitive shipments (e.g., guns, military arms, ammunitions, munitions, military equipment, radio-active materials, etc.) from e-commerce to government and military operations, ensuring security, tracking, transparency, location verification, delivery verification and operational flexibility.

Some advantages of using the IVL application 30*a*/30 with the plurality of different security layers 122-148 for providing real-time services 194 for summary identification, verification, tracking and location information for valuable and/or dangerous objects, include, but are not limited to those described in Table 7.

TABLE 7

1. AI 30c Integration for Predictive and Proactive Risk Mitigation
Dynamic Risk Assessment: Leverages AI 30c to continuously analyze real-time and historical data, assigning dynamic risk scores to shipments based on factors like
route conditions, package value, and security features. This allows for proactive adjustments to mitigate theft, delays, or tampering risks.
Route Optimization: AI 30c driven algorithms optimize delivery routes in real time,
accounting for traffic, weather, and security risks to ensure timely and efficient shipments.
Anomaly Detection: AI 30c monitors handler behavior, package movement, and geofence compliance to detect unusual activity, triggering alerts and automated protective measures when necessary, including for food shipments when listeria and/or salmonella outbreaks are detected.
2. Blockchain 174 Security for Immutable Transparency
Chain-of-Custody Logging: Shipment interaction, from creation to final delivery, is immutably logged on the blockchain 174. This ensures a transparent, tamper-proof
record of all events including serial numbers, other identifiers, including handoffs, tampering alerts, and manual overrides.
Dispute Resolution and Accountability: Blockchain 174 logs provide indisputable evidence for resolving disputes, verifying chain-of-custody, and maintaining regulatory compliance.
Dedicated Blockchain 174 Architecture: For high-security applications, such as government
or military operations, Customizable, dedicated blockchains 174 to ensure data isolation and enhanced security.
3. Payments and Financial Management:
Processes payments for shipments, including customizable security tiers and premium features.
Tracks payment history, invoices, and outstanding balances.
Provides revenue analytics to monitor financial performance.
4. Incident Management and Overrides:
Allows administrators to respond to incidents, such as tampering alerts or recipient
verification failures.
Offers manual override tools for situations requiring customer support intervention.
Logs all overrides and incident resolutions on the blockchain for transparency.
5. Mapping System:
Provides an interactive map showing shipment locations, routes, and geofences.
Displays event markers for incidents like tampering or geofence breaches.
Allows administrators to modify geofences and optimize delivery routes in real-time.
6. Adaptability Across Industries
Modular Design: The applications 30a modular architecture allows
shippers, receivers, vendors/partners, and government/military entities, ensuring a tailored user experience for each stakeholder.
Scalability: designed to handle everything from small business shipments
to enterprise-level logistics, with multi-language support and global integration capabilities.
Cross-Sector Applications: The application 30a supports diverse industries, including:
E-commerce: Secure, trackable deliveries with biometric recipient verification.
Healthcare: Temperature-controlled tracking for sensitive medical shipments.
Government and Military: Secure logistics with geofencing, encrypted data, and
capabilities for classified operations.
7. Operational Flexibility and Reliability
Manual Override Systems: Built-in override protocols allow administrators to resolve issues like verification failures, geofence breaches, or tampering alerts without disrupting shipment progress.
Offline Mode: Critical shipment data and actions remain accessible during connectivity outages, with automatic syncing upon restoration.
Multi-Modal Tracking: Redundant tracking technologies, including GPS, cellular triangulation, and RFID, ensure reliable location monitoring even in challenging environments.

TABLE 7-continued

| |
|---|
| 8. Advanced Security and Compliance<br>Biometric and electronic link verification: Ensures only authorized personnel handle to send or receive packages, with logs stored immutably on the blockchain 174.<br>Tamper-Proof Packaging: IoT 33-enabled lockboxes and tamper-evident seals provide real-time alerts for potential breaches.<br>Regulatory Compliance: The application 30a adheres to global data privacy and security standards, such as the European Union (EU) General Data Protection Regulation (GDPR) and the United States Health Insurance Portability and Accountability Act (HIPAA), making it ideal for handling sensitive shipments. |

Financial Fraud Protection Services 196

The server identification, verification and location (IVL) application 30*a* on the service network device 20, 22, 24, 26 and/or the IVL application 30 on the target network device 12, 14, 16, 31, 33, 35, 37, 106-112 with the plurality of different security layers 122-148 provides real-time services 196 for financial fraud protection for merchants, financial institutions, securities instructions, law enforcement and consumers. The services 196 include cloud SaaS 64 services and non-cloud services.

Some advantages of using the IVL application 30*a*/30 with the plurality of different security layers 122-148 for providing real-time services 196 for financial fraud protection include, but are not limited to those described in Table 8.

TABLE 8

| |
|---|
| 1. Real-Time Fraud Detection and Prevention for Merchants<br>Provides merchants cutting-edge fraud detection tools to protect businesses and institutions from losses.<br>AI 30cPowered Fraud Scoring:<br>Identifies suspicious behavior in real time using machine learning algorithms and dynamic risk profiling.<br>Transaction Monitoring:<br>Alerts merchants immediately about high-risk or flagged transactions.<br>Enables instant manual overrides with identity verification tools, including live photo capture and ID matching.<br>Employee Accountability:<br>Tracks employee-related fraud patterns, identifying specific registers or individuals with unusually high fraudulent activity.<br>Provides analytics for merchants to mitigate internal risks effectively. |
| 2. Financial Institution and Securities Institutions Integration<br>Banks, brokers, and credit card issuers benefit from robust fraud prevention capabilities.<br>Dynamic Safety Features:<br>Allows banks to toggle security features (e.g., facial recognition, spending limits) for each cardholder based on risk profiles.<br>Fraud History Analysis:<br>Enables banks to query individuals for prior grand larceny or fraud incidents before issuing new credit cards or adjusting credit limits.<br>Dispute Management:<br>Streamlines chargeback workflows, ensuring swift and accurate resolutions between banks, merchants, and consumers. |
| 3. Law Enforcement Dashboard and Collaboration<br>Provides law enforcement with a powerful, user-friendly dashboard designed to streamline investigations:<br>Accusatory Instrument Generation:<br>Automatically compiles detailed reports, including purchaser photos, transaction details, and fraud likelihood scores, for use in grand larceny cases.<br>Geographic Focus Tools:<br>Allows officers to analyze flagged transactions in specific areas to identify fraud hotspots.<br>Cross-Merchant Collaboration:<br>Enables law enforcement to connect fraud patterns across multiple merchants for broader investigations. |
| 4. Vehicle and Vessel Fraud Prevention<br>High-value purchases, such as vehicles 37, trucks, aircraft and boats, are a key focus area.<br>Dedicated Purchase Tab:<br>Tracks VINs, hull identification numbers, and other unique identifiers for vehicles and vessels.<br>Identity Verification:<br>Ensures purchaser legitimacy through real-time ID checks and biometric tools like facial recognition.<br>Post-Sale Monitoring:<br>Tracks high-value items to prevent fraudulent resales and aids in recovering stolen property. |

TABLE 8-continued

| |
|---|
| 5. Consumer Protection<br>Prioritizes consumer trust and safety with features tailored for cardholders:<br>Real-Time Alerts:<br>Notifies users of every transaction, including flagged purchases with photo verification.<br>User-Friendly Dispute Resolution:<br>Allows cardholders to confirm or deny transactions instantly, triggering fraud investigations if necessary.<br>Educational Tools:<br>Provides cardholders with tips and resources for spotting and preventing fraud. |
| 6. Scalable Design for Global Reach<br>Built to handle massive transaction volumes, leveraging:<br>Cloud-Native and Blockchain 174 architecture:<br>Ensures elastic scalability for growing user bases.<br>Secondary System:<br>Provides operational continuity during blockchain or network downtime.<br>International Integration:<br>Enables cross-border fraud detection and global database cross-referencing for stolen goods. |

Ticketing, Event and Attendee Management Services 198

The server identification, verification and location (IVL) application 30*a* on the service network device 20, 22, 24, 26 and/or the IVL application 30 on the target network device 12, 14, 16, 31, 33, 35, 37, 106-112 with the plurality of different security layers 122-148 provides real-time services 198 for ticketing, event and attendee management. The services 198 include cloud SaaS 64 services and non-cloud services.

Some advantages of using the IVL application 30*a*/30 with the plurality of different security layers 122-148 for providing real-time services 198 for financial fraud protection include, but are not limited to those described in Table 9.

TABLE 9

| |
|---|
| 1. Biometric-Based Ticketing:<br>Eliminates the need for phones or physical tickets by providing biometric based ticketing relying on facial recognition, gait analysis and/or other biometrics (e.g., voice, finger prints, iris scanning, retinal scan, vein scan, tattoos, etc.) for event access. |
| 2. Geofencing:<br>Enables real-time attendee monitoring and dynamic venue management. |
| 3. Wearable 98-102 Safety Devices:<br>Provides enhanced safety for children and special needs individuals through real-time tracking and notifications via wearable devices 98-102. |
| 4 Advanced Analytics:<br>Offers event organizers actionable insights, including demographic breakdowns, behavioral patterns, and payment trends. |
| 5. Fraud Prevention Mechanisms:<br>Validates ticket authenticity and prevents unauthorized access through biometric and geofence-linked systems. |
| 6. Post-Event Tools:<br>Features user-generated content sharing and memorabilia integration to enhance the attendee experience and drive engagement. |
| 7. Augmented Reality (AR)/Virtual Reality (VR) Navigation:<br>Provides AR/VR overlays to guide users in physical venues. |
| 8. Crowd-Aware Navigation:<br>Uses live crowd density data to dynamically adjust AR navigation paths, optimizing attendee movement and preventing congestion.<br>Provides real-time route changing based on foot traffic and predicted movement trends. |
| 9. User-Centric Customization:<br>Allows attendees to personalize their AR interface, choosing overlays for different needs<br>(e.g., food stalls, restrooms, family areas, or accessibility paths).<br>A customizable AR navigation system tailored to individual attendee preferences. |
| 10: AI 30c Powered Wayfinding:<br>AI applications 30 c to predict attendee destinations based on behavior (e.g., seat location, event schedule) and proactively display directions.<br>An attendee walking toward the food court sees suggested paths with wait times and nearby deals. |
| 11. Dynamic Ticket Pricing:<br>Uses machine learning to adjust prices based on demand. |
| 12. Predictive Behavioral Pricing:<br>Ticket Use a hybrid approach combining historical data and real-time behavior (e.g., how long a user views specific tickets) to calculate dynamic pricing.<br>Behavioral pricing algorithms that predict willingness to pay based on in-app interactions. |

TABLE 9-continued

| |
|---|
| 13. Sharing and Group Discounts:<br>Provides dynamic group pricing where discounts scale based on the size of the group and proximity of their seats.<br>Adjacent seat bundling discounts for families or friends booking together. |
| 14. Gamified Pricing Models:<br>Enable users to participate in time-sensitive games (e.g., "beat the clock" discounts or challenges) to secure dynamic pricing offers.<br>Gamification of ticket pricing tied to real-time engagement. |
| 15. Integration into a Unified Platform:<br>Independent User Profiles Across Events:<br>Uses of decentralized user profile system where attendee data is stored locally and shared temporarily with venues only for specific events.<br>Profiles can be deleted or reset after events, ensuring no long-term storage of personal information by venues- if the user wants their data deleted.<br>Unified Dashboard with Predictive Analytics:<br>Provides venues with a dashboard that predicts attendee behavior across events, using anonymized behavioral patterns rather than direct user data.<br>Provides predictive attendee analytics based on anonymized cross-event behavior. |
| 16. Tokenized Ticketing System:<br>Replaces traditional ticketing with a blockchain-based system that creates unique, event-specific tokens for each attendee.<br>Tokens are transferred securely and can include embedded AR features for post-event engagement. |
| 17. Dynamic Event-Specific Smart Contracts<br>Self-Updating Tickets: Use blockchain smart contracts to create tickets that adapt dynamically:<br>Changes access levels (e.g., general admission upgrades to VIP based on availability or user engagement).<br>Unlocks perks or features (e.g., special discounts for frequent attendees or free merchandise).<br>Automates refunds if events are canceled, ensuring trust. |
| 18. Non-Fungible Token (NFT) Tickets with Evolving Features<br>Each ticket is minted as a unique NFT that evolves:<br>After the event, tickets can convert into collectibles with exclusive perks like access to event<br>photos, videos, or signed memorabilia.<br>Embeds gamified elements, such as unlocking rare, tradable NFT items only available to attendees.<br>Offers limited-edition, themed ticket NFTs for special events to drive exclusivity. |
| 19. Provenance and Ownership Tracking<br>Showcases the entire history of a ticket:<br>Buyers can view the ticket's origin, price changes, and ownership transfers directly on the Blockchain 174.<br>Transparency builds trust and discourages scalping. |
| 20. Interoperable Ticketing Ecosystem<br>Leverage cross-event compatibility:<br>Tickets purchased for one event grant access to another partner event or discounts,<br>creating a unified ecosystem of experiences.<br>Tokenized tickets integrate with loyalty programs or enable cross-platform use (e.g., in gaming, music, or travel). |
| 21. Anti-Scalping and Secure Resale Markets<br>Includes resale control mechanisms:<br>Resale prices are governed by smart contracts to cap scalping.<br>Blockchain verifies authenticity and ownership of tickets in the secondary market, preventing counterfeiting.<br>Uses identity-linked NFTs to ensure tickets cannot be sold without proper verification, reducing fraud. |
| 22. Decentralized Ticket Wallets<br>Instead of centralized storage, attendees store their tickets in decentralized wallets:<br>This ensures attendees own their tickets outright, increasing trust and user autonomy.<br>Enables seamless ticket management across multiple devices and platforms. |
| 23. Blockchain Analytics and Audience Insights<br>Uses blockchains 174 to provide transparent, anonymized data to event organizers:<br>Views attendance patterns, resale trends, and engagement metrics on-chain.<br>Offers event-specific tokens or badges based on user behavior (e.g., frequent attendee rewards). |
| 23. Revenue Sharing via Tokenomics<br>Provides revenue-sharing models:<br>A portion of ticket sales is redistributed to artists, event staff, or even loyal attendees using blockchain 174 tokens.<br>Implements royalty features so creators or organizers receive a percentage of resale profits on<br>the blockchain 174. |

TABLE 9-continued

| |
|---|
| 24. Token-Gated Experiences<br>Uses blockchain to create exclusive, token-gated experiences:<br>Only attendees with a specific NFT ticket can access certain event features, AR/Virtual Reality (VR).<br>experiences, or post-event content.<br>Allows NFT holders to vote on event-related decisions, creating a decentralized fan-driven event. |
| 25. Blockchain for Reputation and Trust<br>Establishes a reputation system for attendees:<br>Tracks attendance history and engagement using blockchain tokens.<br>Rewards frequent attendance with priority access to future events or discounted tickets.<br>Builds trust with event partners by providing an immutable ledger of ticket sales, revenue splits, and attendance data. |
| 26. Sustainable and Transparent Ticketing<br>Uses eco-friendly blockchains to reduce the carbon footprint of ticketing.<br>Includes detailed, blockchain-verified reporting of sustainability initiatives tied to the event (e.g.,<br>funds donated to green causes). |
| 27. Universal Blockchain 174 Integration<br>Integrates with multiple blockchain 174 networks:<br>Allow attendees to choose their preferred blockchain for ticket storage. |

People Identification and People Identity Verification Management Services 200

The server identification, verification and location (IVL) application 30*a* on the service network device 20, 22, 24, 26 and/or the IVL application 30 on the target network device 12, 14, 16, 31, 33, 35, 37, 106-112 with the plurality of different security layers 122-148 provides real-time services 200 for people meeting and people meeting identity verification services 200. The services 200 include cloud SaaS 64 services and non-cloud services.

The services 200 include people meeting identity verification services for identifying and verifying identifies of people at schools, day-care, dating sites, employment interviews, professional meetings, networking events, professional appointments (e.g., medical, legal, real-estate, accounting, etc.) goods pick-up and drop-off, goods transport, taxi drivers, baby sitters, contractors, repair people, rideshare drivers, rideshare vehicles, curriers, messengers, concerts, sporting events, movies, community events, banks, hospitals, medical clinics, urgent care clinics, automated teller machines (ATM), doorbell cameras, security cameras, trail cameras, traffic cameras, airport security screening, etc.

Some advantages of using the IVL application 30*a*/30 with the plurality of different security layers 122-148 for providing real-time services 200 for people meeting and people identity verification include, but are not limited to those described in Table 10.

TABLE 10

| |
|---|
| 1. Automatic Biometric Recognition and Identify verification:<br>Automatic real-time facial recognition, voice, finger prints, iris scanning, retinal scan, vein scanning, gait analysis, tattoos, etc. to verify an identity of a desired person 41 with a pre-determined level of precision. |
| 2. Automated Identity Verification for On-Line Meetings:<br>Automatic real-time facial recognition, voice, finger prints, iris scanning, retinal scan, vein scanning, gait analysis, tattoos, etc.to verify an identity of a desired person 41 with a pre-determined level of precision for personal on-line meetings, video chats, professional on-line meetings (e.g., telemedicine, legal, etc.). |
| 3. Automatic Collection and Linking of Social Media Profiles and Social Media Posts:<br>Use of AI 30c and blockchains 174 to collect and analyze, pictures, user profiles social media posts, for comprehensive insights. |
| 4. Automated Search Engine Analysis:<br>Use of AI 30c and blockchains 174 to collect and analyze search engine information including information from news articles, professional meetings, family events, community events, etc. |
| 5. Automated Behavioral analysis:<br>Use of AI 30c and blockchains 174 for user-driven flagging and pattern recognition to aid in the identification of individuals and the determination of if the individual(s) is/are dangerous, have a prior criminal record, have a negative dating history, dating site complaints, have been cited in a negative way in a news article, social media post, etc. |
| 6. Automated Collection Analysis of Law Enforcement and Legal Databases:<br>Use of AI 30c and blockchains 174 to collect and analyze arrest, conviction and criminal records, arrest warrants, BOLOs, most wanted information and/or civil records. |
| 7. Automated Collection and Analysis of Credit Information:<br>Use of AI 30c and blockchains 174 to collect and analyze credit information including credit reports, loan information, etc. |
| 8. Automated Collection and Analysis of Prior Employment Information:<br>Use of AI 30c and blockchains 174 to collect and analyze prior employment information. |

The methods and systems described herein have been described with respect to people 41 and objects 59. However, the methods and systems are not limited to such embodiments and the methods and system can be used to identify, locate, track, secure and verify animals such as pets, livestock, wild animals, and other objects such as construction equipment, sports equipment and/other types of objects. However, the present invention is not limited to such embodiments sand other embodiments can be used to practice the invention.

The method and system described herein includes, but is not limited to providing summary and comprehensive IVL information in real-time for meeting a person for an interview, a law enforcement person pursuing a criminal, a person applying for employment, a person applying for a security clearance, a person taking a test for college and/or a professional license, a person picking up tickets for an event, a person using a dating application to meet another person, a person entering a secure area, a courier arriving to pick up currency and/or other valuables, rideshare drivers, contractors for home repair, babysitters, a person purchasing a home, property, a person withdrawing money from a financial institution, etc. However, the present invention is not limited to such an embodiments and other embodiments can be used to practice the invention.

A method and system for providing multi-layer identification, verification, tracking and location information for people and events is presented. Multi-layer security permissions and multi-layer security functionality is provided. An identity and a physical location of a person or an object is verified in real-time as the person or object engages in current habits, actions and events and with analysis of previous habits, actions and events. Summary identification, verification and location information and comprehensive identification, verification and location information is provided in real-time for a desired person or an object. Feedback and adaptive learning with artificial intelligence (AI) using blockchains and other methods provide comprehensive identification, tracking and verification information, adaptable across various different situations and circumstances.

It should be understood that the architecture, programs, processes, methods and systems described herein are not related or limited to any particular type of computer or network system (hardware and/or software and/or firmware, etc.), unless indicated otherwise. Various types of computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware and/or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A method for automatically providing identification, verification, and location (IVL) services, comprising:

providing a server IVL application on a server network device with one or more processors, available to other network devices each with one or more processors via a communications network;

providing an Artificial Intelligence (AI) application on the server IVL application configured for:

(1) providing a plurality of AI methods for setting a plurality of different permissions at a plurality of different security layers including: (a) a first security layer configured for providing only summary IVL information for a desired person; and (b) a plurality of second advanced security layers configured for providing detailed IVL information for the desired person, (2) providing a plurality of IVL services from plurality of second advanced security layers comprising: (a) Identification services including: a multi-layer identity verification layer comprising: a facial recognition sublayer, eye scan sublayer and biometric markers identification sublayer, (b) Location services including: a location tracking layer, proximity detection layer and a geofencing layer, and (c) Verification services including: a pattern recognition laver, event recording layer, secure data records layer, data analytics layer evidence chain of custody layer and law enforcement records layer, and (3) providing a continuous feedback cycle using AI methods and machine learning to adapt behavior of the AI application based on user interactions and requests made by users for IVL services for desired persons and current behaviors of the desired persons;

receiving securely, a first setup message on a server IVL application on the server network device via the communications network from a first IVL application on a first network device with one or more processors, the first setup message including user setup and permission management information for one or more permissions and one or more security layers for one or more users identified in the first setup message that are authorized to use the IVL services;

the one or more security layers including: (1) a first security layer configured for providing authorization for a user to obtain only summary IVL information for the desired person from the server IVL application on the server network device, and (2) a plurality of second advanced security layers configured for providing authorization for the user to obtain detailed IVL information for the desired person from the AI application on the server IVL application on the server network device from the plurality of second advanced security layers;

the one or more permissions including: (1) a first permission for allowing access points configured for determining which of the one or more security layers the user can enter on the AI application on the server IVL application on the server network device, (2) a second permission for allowing data actions: configured for allowing one or more actions the user is permitted to do with data obtained from selected IVL service access points on the AI application on the server IVL application on the server network device, including sending data, receiving data, retrieving data, adding data, editing data or viewing reports, and (3) a third permission for allowing data visibility configured for allowing what the user can see or not see for data obtained from selected IVL service access points on the AI application on the server IVL application on the server network device;

completing a setup process on the AI application on the server IVL application on the server network device and storing in one or more user profiles on a blockchain, permissions and security layer access information for the one or more users included in the first setup message, the one or more user profiles on the blockchain including a type of user designation comprising: a vendor, employee, manager, law enforcement, military or government user and permission management information for the one or more permissions and the one or more security layers for one or more users identified in the first setup message that are authorized to use the IVL services;

sending securely, a setup complete message from the AI application on the server IVL on the server network device via the communications network to the first IVL application on the first network device indicating completion of the setup process of the one or more permissions and the one or more security layers for the one or more one or more users identified in the first setup message that are authorized to use the IVL, services;

receiving a request message on the AI application on the server IVL application on the server network device via the communications network from a second IVL application on a second network device for a user, the request message including a request from the user of the second network device for one or more of the services available via a plurality of different permissions and at a plurality of different security layers for the desired person including: (1) the first security layer including authorization for only summary IVL information for the desired person, or authorization for (2) the plurality of second advanced security layers including:

(a) Identification services including: a multi-layer identity verification layer comprising: a facial recognition sublayer, eye scan sublayer and biometric markers identification sublayer, (b) Location services including: a location tracking layer, proximity detection layer and a geofencing layer, and (c) Verification services including: a pattern recognition layer, event recording layer, secure data records layer, data analytics layer evidence chain of custody layer and law enforcement records layer, including the detailed IVL information for the desired person from the plurality of second advanced security layers;

determining in real-time on the AI application on the server IVL application on the server network device via the blockchain with the one or more permissions and which of one or more security layers are available for the user of the second network device to access and use the requested IVL services for the desired person;

accessing in real-time on the AI application on the server IVL application on the server network device the determined one or more security layers available to the user of the second network device with the one or more permissions determined from the blockchain providing: (1) only summary IVL information for the desired person from the first security layer, or (2) detailed IVL information for the desired person from the plurality of second advanced security layers;

sending securely one or more response messages in real-time from the AI application on the server IVL application on the server network device to the second IVL application on the second network device for the user via the communications network, including all requested IVL services information including summary only information or detailed information available to the user of the second network device, based on the determined one or more permissions and the determined one or more security layers available for the user of the second network device determined from the blockchain, for accessing and using in real-time the requested IVL services providing summary only information or detailed information available to the user of the second network device for the desired person.

2. The method of claim 1, wherein the AI application on the IVL application on the server network device providing: (a) only summary IVL information for the desired person from the first security layer, or (b) detailed IVL information for the desired person from the plurality of second advanced security layers including providing IVL information for: (a) Identification services including: a multi-layer identity verification layer comprising: a facial recognition sublayer, eye scan sublayer and biometric markers identification sublayer, (b) Location services including: a location tracking layer, proximity detection layer and geofencing layer, and (c) Verification services including: a pattern recognition layer, event recording layer, secure data records layer, data analytics layer evidence chain of custody layer and law enforcement records layer.

3. The method of claim 1 wherein, the step of completing a setup process includes:

creating on from the server IVL application on the server network device a pre-determined permission hierarchy for the one or more users;

creating on from the server IVL application on the server network device a pre-determined security layers hierarchy for the one or more users.

4. The method of claim 3 wherein, the pre-determined permissions hierarchy comprising one or more data structures including a search tree, binary search tree, an array or the blockchain.

5. The method of claim 1, further comprising:

receiving securely, the one or more response messages in real-time on the second IVL application on the second network device for the user from the AI application on the server IVL application on the server network device via the communications network, including all requested IVL service information available about the desired person sent to the user of the second network device, based on the determined one or more permissions and the determined one or more security layers available for the user of the second network device, to access and use in real-time the requested IVL services available to the user of the second network device; and displaying for the user the one or more response messages in real-time on a display component on the second IVL application on the second network device including all requested IVL service information available about the desired person.

6. The method of claim 1 wherein, first network device, the second network device and the server network include one or more wireless communications interfaces comprising one or more of: a cellular telephone, 802.11a, 802.11b, 802.11 g, 802.11n, 802.15.4 (ZigBee), Wireless Fidelity (Wi-Fi), Wi-Fi Aware, Worldwide Interoperability for Microwave Access (WiMAX), ETSI High Performance Radio Metropolitan Area Network (HIPERMAN), Near Field Communications (NFC), Machine-to-Machine (M2M), 802.15.1 (BLUETOOTH), RFID, or infra data association (IrDA), wireless communication interfaces.

7. The method of claim 1 first network device and the second network device include: desktop and laptop computers, tablet computers, mobile phones, non-mobile phones with displays, smart phones, Internet phones, Internet appliances, personal digital/data assistants (PDA), portable, handheld and desktop video game devices, cable television (CATV), satellite television (SATV) and Internet television set-top boxes, digital televisions including high definition television (HDTV), three-dimensional (3DTV) televisions, smart speakers, Internet of Things (IOT) devices, Radio Frequency Identifier (RFID) devices, wearable network devices, or air, water or land vehicles, with wireless or wired network interfaces, connectable to the communications network.

8. The method of claim 1 wherein, the first setup message, setup complete messages, request message and one or more response messages include one or more of: an email message, voice message, video message, RCS message, Short Message Service (SMS) message, Direct Message (DM), Instant Message (IM), Multimedia Messaging Service (MMS) message, GOOGLE Business Message, APPLE iMessage, instant message, direct message, Short Message Peer-to-Peer (SMPP) message, social media message, REpresentational State Transfer (REST) message, data link protocol message, network protocol message, Simple Object Access Protocol (SOAP) message, or Lightweight Directory Access Protocol (LDAP) message.

9. The method of claim 1, wherein the data link protocol message includes a Medium Access Control (MAC) message and the network protocol message includes: an Internet Protocol (IP) message, or Internet Protocol suite protocol message comprising one or more of: Simple Mail Transfer Protocol, (SMTP), Hyper Text Transfer Protocol (HTTP), File Transfer Protocol (FTP), Dynamic Host Configuration Protocol (DHCP), Domain Name System (DNS) protocol, or Short Message Peer-to-Peer (SMPP) protocol, network protocol message.

10. The method of claim 1 wherein, the setup message, the setup complete message, request message and the one or more response messages are securely sent and received with one or more of: a Wireless Encryption Protocol (WEP), Advanced Encryption Standard (AES), Data Encryption Standard (DES), RSA encryption, Secure Hash Algorithm (SHA), Message Digest-5 (MD-5), Keyed Hashing for Message Authentication Codes (HMAC), Electronic Code Book (ECB) or Diffie and Hellman (DH) or Secure Sockets Layer (SSL), encryption or security methods.

11. The method of claim 1 wherein, the AI application on the server IVL application on the server network device includes IVL services for (1) high-value objects including: physical currencies, cryptocurrencies, stock certificates, bond certificates, gems and metals, and (2) sensitive objects including: guns, military arms, ammunitions, munitions, military equipment and radio-active materials.

12. The Method of claim 1 wherein, the summary only IVL information for the desired person includes one or more of: a name, address, phone number, vehicle and license plate information, email identifiers, social media identifiers, digital photograph, location information including real-time current physical location, tattoos, arrests, convictions, outstanding arrest warrants, outstanding traffic tickets, be on the lookout (bolo) lists, most wanted lists, criminal complaint, criminal sentencing, or civil judgment information, for the desired person.

13. The method of claim 1, wherein the proximately detection layer includes determining a proximity of the desired person with RFID, Wi-Fi or ultra sound devices.

14. The method of claim 1, wherein all message communications between the AI application on the server IVL application on the server network device and the first IVL application on the first network device and the second IVL application on the second network device via the communications network include end-to-end encryption.

15. The method of claim 1, wherein the AI application includes a Big Data set with at least 100,000 data points.

16. The method of claim 1, wherein the AI application on the server IVL application on the server network device creates and stores contextual triggers for a plurality of different scenarios based on user interactions, requests made for desired persons and prior and current behaviors of desired persons.

17. The method of claim 1 wherein, the server network device includes a plurality of cloud applications and one or more cloud databases or the blockchain communicating with a cloud communications network, the plurality of cloud applications providing a plurality of cloud AI IVL services including: a cloud computing Infrastructure as a Service (IaaS), a cloud computing Platform as a Service (PaaS) and one or more AI IVL, services as a Software as a Service (SaaS).

18. The method of claim 17 wherein, the one or more cloud databases include one or more cloud storage objects comprising one or more of a REpresentational State Transfer (REST) or Simple Object Access Protocol (SOAP), Lightweight Directory Access Protocol (LDAP) cloud storage objects, portions thereof, or combinations thereof, stored in the one or more cloud databases.

19. The method of claim 1, wherein the AI application on the server (IVL) application on the server network device further includes a plurality of real-time services for accountability, security, identifying, locating and tracking for:

school, busing and test taking operations;

managing, monitoring, tracking and securing shipments of valuable or dangerous objects;

financial fraud protection for merchants, financial institutions, securities institutions, law enforcement and consumers;

ticketing, event and attendee management; and people meeting and people meeting identity.

20. The method of claim 1 further including:

including object information in the one or more security layers including the first initial security layer allowing access to basic functionality of the IVL services, including only summary IVL information for one or more desired objects, and including object information in plurality of second advanced security layers including advanced functionality of the IVL services, including the individual security layers for accessing the one or more of the plurality of different permissions and at the plurality of different security layers including all available detailed IVL information for one or more desired objects.

21. One or more non-transitory computer readable mediums each having stored therein a plurality of instructions for causing one or more processors on one more network devices to execute the steps of:

providing a server IVL application on a server network device with one or more processors, available to other network devices each with one or more processors via a communications network;

providing an Artificial Intelligence (AI) application on the server IVL application configured for:

(1) providing a plurality of AI methods for setting a plurality of different permissions at a plurality of different security layers including: (a) a first security layer configured for providing only summary IVL information for a desired person; and (b) a plurality of second advanced security layers configured for providing detailed IVL information for the desired person, (2) providing a plurality of IVL services from plurality of second advanced security layers comprising: (a) Identification services including: a multi-layer identity verification layer comprising: a facial recognition sublayer, eye scan sublayer and biometric markers identification sublayer, (b) Location services including: a location tracking layer, proximity detection layer and a geofencing layer, and (c) Verification services including: a pattern recognition layer, event recording layer, secure data records layer, data analytics layer evidence chain of custody layer and law enforcement records layer, and (3) providing a continuous feedback cycle using AI methods and machine learning to adapt behavior of the AI application based on user interactions and requests made by users for IVL services for desired persons and current behaviors of the desired persons;

receiving securely, a first setup message on a server IVL application on the server network device via the communications network from a first IVL application on a first network device with one or more processors, the first setup message including user setup and permission management information for one or more permissions and one or more security layers for one or more users identified in the first setup message that are authorized to use the IVL services;

the one or more security layers including: (1) a first security layer configured for providing authorization for a user to obtain only summary IVL information for the desired person from the server IVL application on the server network device, and (2) a plurality of second advanced security layers configured for providing authorization for the user to obtain detailed IVL information for the desired person from the AI application on the server IVL application on the server network device from the plurality of second advanced security layers;

the one or more permissions including: (1) a first permission for allowing access points configured for determining which of the one or more security layers the user can enter on the AI application on the server IVL application on the server network device, (2) a second permission for allowing data actions: configured for allowing one or more actions the user is permitted to do with data obtained from selected IVL service access points on the AI application on the server IVL application on the server network device, including sending data, receiving data, retrieving data, adding data, editing data or viewing reports, and (3) a third permission for allowing data visibility configured for allowing what the user can see or not see for data obtained from selected IVL service access points on the AI application on the server IVL application on the server network device;

completing a setup process on the AI application on the server IVL application on the server network device and storing in one or more user profiles on a blockchain, permissions and security layer access information for the one or more users included in the first setup message, the one or more user profiles on the blockchain including a type of user designation comprising: a vendor, employee, manager, law enforcement, military or government user and permission management information for the one or more permissions and the one or more security layers for one or more users identified in the first setup message that are authorized to use the IVL services;

sending securely, a setup complete message from the AI application on the server IVL on the server network device via the communications network to the first IVL application on the first network device indicating completion of the setup process of the one or more permissions and the one or more security layers for the one or more one or more users identified in the first setup message that are authorized to use the IVL services;

receiving a request message on the AI application on the server IVL application on the server network device via the communications network from a second IVL application on a second network device for a user, the request message including a request from the user of the second network device for one or more of the services available via a plurality of different permissions and at a plurality of different security layers for the desired person including: (1) the first security layer including authorization for only summary IVL information for the desired person, or authorization for (2) the plurality of second advanced security layers including:

(a) Identification services including: a multi-layer identity verification layer comprising: a facial recognition sublayer, eye scan sublayer and biometric markers identification sublayer, (b) Location services including: a location tracking layer, proximity detection layer and a geofencing layer, and (c) Verification services including: a pattern recognition layer, event recording layer, secure data records layer, data analytics layer evidence chain of custody layer and law enforcement records layer, including the detailed IVL information for the desired person from the plurality of second advanced security layers;

determining in real-time on the AI application on the server IVL application on the server network device via the blockchain with the one or more permissions and which of one or more security layers are available for the user of the second network device to access and use the requested IVL services for the desired person;

accessing in real-time on the AI application on the server IVL application on the server network device the determined one or more security layers available to the user of the second network device with the one or more permissions determined from the blockchain providing: (1) only summary IVL information for the desired person from the first security layer, or (2) detailed IVL information for the desired person from the plurality of second advanced security layers;

sending securely one or more response messages in real-time from the AI application on the server IVL application on the server network device to the second IVL application on the second network device for the user via the communications network, including all requested IVL services information including summary only information or detailed information available to the user of the second network device, based on the determined one or more permissions and the determined one or more security layers available for the user of the second network device determined from the blockchain, for accessing and using in real-time the requested IVL services providing summary only information or detailed information available to the user of the second network device for the desired person.

22. A system for automatically providing identification, verification and location (IVL) services, comprising in combination:

one or more network devices each with one or more processors, one or more server network devices each with one or more processors;

a communications network;

for providing a server IVL application on a server network device with one or more processors, available to other network devices each with one or more processors via a communications network;

for providing an Artificial Intelligence (AI) application on the server IVL application configured for:

(1) for providing a plurality of AI methods for setting a plurality of different permissions at a plurality of different security layers including: (a) a first security layer configured for providing only summary IVL information for a desired person; and (b) a plurality of second advanced security layers configured for providing detailed IVL information for the desired person, (2) for providing a plurality of IVL services from plurality of second advanced security layers comprising: (a) Identification services including: a multi-layer identity verification layer comprising: a facial recognition sublayer, eye scan sublayer and biometric markers identification sublayer, (b) Location services including: a location tracking layer, proximity detection layer and a geofencing layer, and (c) Verification services including: a pattern recognition layer, event recording layer, secure data records layer, data analytics layer evidence chain of custody layer and law enforcement records layer, and (3) for providing a continuous feedback cycle using AI methods and machine learning to adapt behavior of the AI application based on user interactions and requests made by users for IVL services for desired persons and current behaviors of the desired persons;

for receiving securely, a first setup message on a server IVL application on the server network device via the communications network from a first IVL application on a first network device with one or more processors, the first setup message including user setup and permission management information for one or more permissions and one or more security layers for one or more users identified in the first setup message that are authorized to use the IVL services;

the one or more security layers including: (1) a first security layer configured for providing authorization for a user to obtain only summary IVL information for the desired person from the server IVL application on the server network device, and (2) a plurality of second advanced security layers configured for providing authorization for the user to obtain detailed IVL information for the desired person from the AI application on the server IVL application on the server network device from the plurality of second advanced security layers;

the one or more permissions including: (1) a first permission for allowing access points configured for determining which of the one or more security layers the user can enter on the AI application on the server IVL application on the server network device, (2) a second permission for allowing data actions: configured for allowing one or more actions the user is permitted to do with data obtained from selected IVL service access points on the AI application on the server IVL application on the server network device, including sending data, receiving data, retrieving data, adding data, editing data or viewing reports, and (3) a third permission for allowing data visibility configured for allowing what the user can see or not see for data obtained from selected IVL service access points on the AI application on the server IVL application on the server network device;

for completing a setup process on the AI application on the server IVL application on the server network device and storing in one or more user profiles on a blockchain, permissions and security layer access information for the one or more users included in the first setup message, the one or more user profiles on the blockchain including a type of user designation comprising: a vendor, employee, manager, law enforcement, military or government user and permission management information for the one or more permissions and the one or more security layers for one or more users identified in the first setup message that are authorized to use the IVL services;

for sending securely, a setup complete message from the AI application on the server IVL on the server network device via the communications network to the first IVL application on the first network device indicating completion of the setup process of the one or more permissions and the one or more security layers for the one or more one or more users identified in the first setup message that are authorized to use the IVL services;

for receiving a request message on the AI application on the server IVL application on the server network device via the communications network from a second IVL application on a second network device for a user, the request message including a request from the user of the second network device for one or more of the services available via a plurality of different permissions and at a plurality of different security layers for the desired person including: (1) the first security layer including authorization for only summary IVL information for the desired person, or authorization for (2) the plurality of second advanced security layers including:

(a) Identification services including: a multi-layer identity verification layer comprising: a facial recognition sublayer, eye scan sublayer and biometric markers identification sublayer, (b) Location services including: a location tracking layer, proximity detection layer and a geofencing layer, and (c) Verification services including: a pattern recognition layer, event recording layer, secure data records layer, data analytics layer evidence chain of custody layer and law enforcement records layer, including the detailed IVL information for the desired person from the plurality of second advanced security layers;

For determining in real-time on the AI application on the server IVL application on the server network device via the blockchain with the one or more permissions and which of one or more security layers are available for the user of the second network device to access and use the requested IVL services for the desired person;

for accessing in real-time on the AI application on the server IVL application on the server network device the determined one or more security layers available to the user of the second network device with the one or more permissions determined from the blockchain providing: (1) only summary IVL information for the desired person from the first security layer, or (2) detailed IVL information for the desired person from the plurality of second advanced security layers;

for sending securely one or more response messages in real-time from the AI application on the server IVL application on the server network device to the second IVL application on the second network device for the user via the communications network, including all requested IVL services information including summary only information or detailed information available to the user of the second network device, based on the determined one or more permissions and the determined one or more security layers available for the user of the second network device determined from the blockchain, for accessing and using in real-time the requested IVL services providing summary only information or detailed information available to the user of the second network device for the desired person, for receiving securely, the one or more response messages in real-time on the second IVL application on the second network device for the user from the AI application on the server IVL application on the server network device via the communications network, including all requested IVL service information available about the desired person sent to the user of the second network device, based on the determined one or more permissions and the determined one or more security layers available for the user of the second network device, to access and use in real-time the requested IVL services available to the user of the second network device; and for displaying for the user the one or more response messages in real-time on a display component on the second IVL application on the second network device including all requested IVL service information available about the desired person.

* * * * *